US012780723B2

(12) United States Patent
Jin et al.

(10) Patent No.: US 12,780,723 B2
(45) Date of Patent: Nov. 3, 2026

(54) FOLDABLE SUBSTRATES AND METHODS OF MAKING

(71) Applicant: Corning Incorporated, Corning, NY (US)

(72) Inventors: Yuhui Jin, Painted Post, NY (US); Paul Ewing Langenbacher, Ithaca, NY (US); Chengmingyue Li, Painted Post, NY (US); Katherine Anne Lindberg, Corning, NY (US); Jeffrey Glenn Lynn, Wellsboro, PA (US); ChuanChe Wang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 3 days.

(21) Appl. No.: 18/689,541

(22) PCT Filed: Sep. 7, 2022

(86) PCT No.: PCT/US2022/042770

§ 371 (c)(1),
(2) Date: Mar. 6, 2024

(87) PCT Pub. No.: WO2023/038982

PCT Pub. Date: Mar. 16, 2023

(65) Prior Publication Data

US 2025/0136497 A1 May 1, 2025

Related U.S. Application Data

(60) Provisional application No. 63/243,307, filed on Sep. 13, 2021.

(51) Int. Cl.
*C03C 15/00* (2006.01)
*B32B 3/30* (2006.01)

(52) U.S. Cl.
CPC .................................... *C03C 15/00* (2013.01)

(58) Field of Classification Search
CPC ... C03C 15/00; C03C 2218/355; C03C 3/091; C03C 3/097; C03C 2218/34;
(Continued)

(56) References Cited

U.S. PATENT DOCUMENTS 6,576,150 B1 6/2003 Weigert
6,625,371 B1 9/2003 Rogers et al.
(Continued)

FOREIGN PATENT DOCUMENTS

WO 2021/041857 A1 3/2021
WO 2021/041882 A1 3/2021
(Continued)

OTHER PUBLICATIONS

International Search Report and Written Opinion of the International Searching Authority; PCT/US2022/042770; dated Dec. 22, 2022; 10 pages; European Patent Office.

*Primary Examiner* — Megha M Gaitonde
(74) *Attorney, Agent, or Firm* — William Johnson; Yiqun Zhao; Ye Eun Park

(57) ABSTRACT

Foldable substrates comprise a first portion, a second portion, and a central portion positioned therebetween. The central portion comprises a first transition region comprising a first transition width and a first transition surface area extending between a first surface area of the first portion and a first central surface area of the central portion with a first average angle. In aspects, the first average angle is from about 167° to about 179°. In aspects, the first transition width is from about 150 micrometers to about 700 micrometers. Methods comprise disposing an etch mask over the first major surface of the foldable substrate before etching the foldable substrate. In aspects, the etch mask comprises a first polymer layer positioned between a first barrier layer and the first major surface. In aspects, the etch mask comprises a positive photoresist.

18 Claims, 22 Drawing Sheets

(58) Field of Classification Search
CPC ..... C03C 17/22; C03C 17/32; C03C 17/3405; C03C 27/00; C03C 21/002; B32B 2307/546; B32B 2457/20; B32B 3/30; B32B 17/10; B32B 27/36; G09F 9/301
USPC ................................ 428/156, 212, 213, 220
See application file for complete search history.

(56) References Cited

U.S. PATENT DOCUMENTS

| | | | |
|---|---|---|---|
| 8,253,138 | B2 | 8/2012 | Yamazaki et al. |
| 8,854,623 | B2 | 10/2014 | Fontaine et al. |
| 10,866,362 | B2 | 12/2020 | Lee et al. |
| 2007/0026324 | A1 | 2/2007 | Yoshida et al. |
| 2015/0110990 | A1 | 4/2015 | Chou et al. |
| 2017/0062102 | A1 | 3/2017 | Chang et al. |
| 2018/0217639 | A1* | 8/2018 | Jones ..................... H05K 1/028 |
| 2020/0292731 | A1* | 9/2020 | Park ...................... G06F 1/1641 |
| 2021/0108077 | A1 | 4/2021 | Berleue et al. |
| 2022/0291712 | A1 | 9/2022 | Baby et al. |
| 2023/0309368 | A1 | 9/2023 | Allan et al. |

FOREIGN PATENT DOCUMENTS

| | | | |
|---|---|---|---|
| WO | 2022/221128 | A1 | 10/2022 |
| WO | 2023/164197 | A2 | 8/2023 |

* cited by examiner

FOLDABLE SUBSTRATES AND METHODS OF MAKING

CROSS-REFERENCE TO RELATED APPLICATIONS

This application is a national stage entry of International Patent Application Serial No. PCT/US2022/042770, filed on Sep. 7, 2022, which in turn, claims the benefit of priority under 35 U.S.C. § 119 of U.S. Provisional Application Ser. No. 63/243,307 filed on Sep. 13, 2021, the contents of each of which are relied upon and incorporated herein by reference in their entireties.

FIELD

The present disclosure relates generally to foldable substrates and methods of making and, more particularly, to foldable substrates comprising a first central surface area recessed from a first major surface and methods of making foldable substrates.

BACKGROUND

Glass-based substrates are commonly used, for example, in display devices, for example, liquid crystal displays (LCDs), electrophoretic displays (EPD), organic light-emitting diode displays (OLEDs), plasma display panels (PDPs), or the like.

There is a desire to develop foldable versions of displays as well as foldable protective covers to mount on foldable displays. Foldable displays and covers should have good impact and puncture resistance. At the same time, foldable displays and covers should have small minimum bend radii (e.g., about 10 millimeters (mm) or less). However, plastic displays and covers with small minimum bend radii tend to have poor impact and/or puncture resistance. Furthermore, conventional wisdom suggests that ultra-thin glass-based sheets (e.g., about 75 micrometers (μm or microns) or less thick) with small minimum bend radii tend to have poor impact and/or puncture resistance. Furthermore, thicker glass-based sheets (e.g., greater than 125 micrometers) with good impact and/or puncture resistance tend to have relatively large minimum bend radii (e.g., about 30 millimeters or more). Consequently, there is a need to develop foldable apparatus that have low minimum bend radii and good impact and puncture resistance.

SUMMARY

There are set forth herein foldable apparatus comprising foldable substrates, foldable substrates, and methods of making foldable apparatus and foldable substrates comprising foldable substrates that comprise a first portion and a second portion. The portions can comprise glass-based and/or ceramic-based portions, which can provide good dimensional stability, reduced incidence of mechanical instabilities, good impact resistance, and/or good puncture resistance. The first portion and/or the second portion can comprise glass-based and/or ceramic-based portions comprising one or more compressive stress regions, which can further provide increased impact resistance and/or increased puncture resistance. By providing a substrate comprising a glass-based and/or ceramic-based substrate, the substrate can also provide increased impact resistance and/or puncture resistance while simultaneously facilitating good folding performance. In aspects, the substrate thickness can be sufficiently large (e.g., from about 80 micrometers (microns or μm) to about 2 millimeters) to further enhance impact resistance and puncture resistance. Providing foldable substrates comprising a central portion comprising a central thickness that is less than a substrate thickness (e.g., first thickness of the first portion and/or second thickness of the second portion) can enable a small parallel plate distance (e.g., about 10 millimeters or less) based on the reduced thickness in the central portion.

In aspects, the foldable apparatus and/or foldable substrates can comprise a plurality of recesses, for example, a first central surface area recessed from a first major surface by a first distance and a second central surface area recessed from a second major surface by a second distance. Providing a first recess opposite a second recess can provide the central thickness that is less than a substrate thickness. Further, providing a first recess opposite a second recess can reduce a maximum bend-induced strain of the foldable apparatus, for example, between a central portion and a first portion and/or second portion since the central portion comprising the central thickness can be closer to a neutral axis of the foldable apparatus and/or foldable substrates than if only a single recess was provided. Additionally, providing the first distance substantially equal to the second distance can reduce the incidence of mechanical instabilities in the central portion, for example, because the foldable substrate is symmetric about a plane comprising a midpoint in the substrate thickness and the central thickness. Moreover, providing a first recess opposite a second recess can reduce a bend-induced strain of a material positioned in the first recess and/or second recess compared to a single recess with a surface recessed by the sum of the first distance and the second distance. Providing a reduced bend-induced strain of a material positioned in the first recess and/or the second recess can enable the use of a wider range of materials because of the reduced strain requirements for the material. For example, stiffer and/or more rigid materials can be positioned in the first recess, which can improve impact resistance, puncture resistance, abrasion resistance, and/or scratch resistance of the foldable apparatus. Additionally, controlling properties of a first material positioned in a first recess and a second material positioned in a second recess can control the position of a neutral axis of the foldable apparatus and/or foldable substrates, which can reduce (e.g., mitigate, eliminate) the incidence of mechanical instabilities, apparatus fatigue, and/or apparatus failure.

In aspects, the foldable apparatus and/or foldable substrates can comprise a first transition region attaching the central portion to the first portion and/or a second transition region attaching the central portion to the second portion. Providing transition regions with smoothly and/or monotonically decreasing (e.g., continuously decreasing) thicknesses can reduce stress concentration in the transition regions and/or avoid optical distortions. Providing a sufficient length of the transition region(s) (e.g., about 0.15 mm or more or about 0.3 mm or more) can avoid optical distortions that may otherwise exist from a sharp change in thickness of the foldable substrate. Providing sufficient length of the transition region(s) (e.g., about 0.3 mm or more) can reduce visibility of the transition region, for example, as measured using fractional intensity and/or a contrast ratio. Providing a sufficiently small length of the transition regions (e.g., about 2 mm or less or about 1 mm or less) can reduce the amount of the foldable apparatus and/or foldable substrates having an intermediate thickness that may have reduced impact resistance and/or reduced puncture resistance. Providing an average transition angle of a first transition surface area of the first transition region relative to the first central surface area that is sufficiently large (e.g., about 167° or more or about 170° or more) can avoid optical distortions and/or reduce visibility of the transition region. Providing a sufficiently small average transition angle (e.g., about 179° or less or about 1760 or less) can reduce the amount of the foldable apparatus and/or the foldable substrates having an intermediate thickness that may have reduced impact resistance and/or reduced puncture resistance.

Methods of the aspects of the disclosure can enable formation of transition regions using an etch mask and an etchant. Providing an etch mask comprising a polymer layer at a peripheral portion of the etch mask can enable formation of transition regions with a transition width (e.g., about 0.15 mm or more or about 0.3 mm or more) and/or an average transition angle (e.g., about 167° or more or about 170° or more) that can be greater than comparative etch masks (see Examples AA-CC). Without wishing to be bound by theory, the polymer layer can be deflected away from the foldable substrate during etching to enable the etchant access to an additional portion of the foldable substrate that the polymer layer could otherwise be in contact with. While the etchant can contact the additional portion of the foldable substrate by deflection of the polymer layer, diffusion of the etchant to the additional portion is limited, which limits the extent of etching of the additional portion, producing a transition region. In aspects, the polymer layer can be formed on the surface of the foldable substrate using a first tape with spaces corresponding to the polymer layers, which can enable the reliable formation of smaller widths (e.g., about 700 μm) of the polymer layer as well as accurate positioning of the polymer layers. In aspects, the etch mask can be formed by placing a plurality of cuts in an assembly comprising a polymer layer disposed on a barrier layer and a backer layer, then removing portions of the assembly before disposing the assembly on the foldable substrate, which can enable reliable spacing of the polymer-based portions.

In aspects, methods can comprise using an etch mask having a gap between the foldable substrate and a peripheral portion of the etch mask, which can enable formation of transition regions with a transition width (e.g., about 0.15 mm or more or about 0.3 mm or more) and/or an average transition angle (e.g., about 167° or more or about 170° or more) that can be greater than comparative etch masks (see Examples AA-CC). Without wishing to be bound by theory, the gap can enable the etchant to contact a portion of the foldable substrate, but the diffusion of the etchant to the additional portion is limited, which limits the extent of etching of the additional portion, producing a transition region. In combination with the first polymer layer or the second polymer layer that can be deflected away from the foldable substrate during etching to enable the etchant access to an additional portion of the foldable substrate that the polymer layer could otherwise be in contact with, which enables a further reduced diffusion of the etchant and enabling longer transition regions. In aspects, the gap can be formed using at least two polymer layers. In aspects, the gap can be formed using at least two layers of a positive photoresist.

Some example aspects of the disclosure are described below with the understanding that any of the features of the various aspects may be used alone or in combination with one another.

Aspect 1. A foldable substrate comprising:

- a substrate thickness in a range from about 100 micrometers to about 2 millimeters defined between a first major surface and a second major surface opposite the first major surface;
- a first portion comprising the substrate thickness between a first surface area of the first major surface and a second surface area of the second major surface;
- a second portion comprising the substrate thickness between a third surface area of the first major surface and a fourth surface area of the second major surface; and
- a central portion comprising:
  - a central thickness in a range from about 25 micrometers to about 80 micrometers defined between a first central surface area and a second central surface area opposite the first central surface area, and the first central surface area recessed from the first major surface by a first distance;
  - a first transition region comprising a first transition surface area extending between the first surface area and the first central surface area with a first average angle relative to the first central surface area, and a thickness of the first transition region smoothly and monotonically decreases between the substrate thickness of the first portion and the central thickness of the central portion; and
  - a second transition region comprising a third transition surface area extending between the third surface area and the first central surface area with a third average angle relative to the first central surface area, and a thickness of the second transition region smoothly and monotonically decreases between the substrate thickness of the second portion and the central thickness of the central portion,
- wherein the first average angle is in a range from about 167° to about 179°.

Aspect 2. The foldable substrate of aspect 1, wherein the third average angle is substantially equal to the first average angle.

Aspect 3. The foldable substrate of any one of aspects 1-2, wherein the first average angle is in a range from about 170° to about 176°.

Aspect 4. The foldable substrate of any one of aspects 1-3, wherein the second central surface area recessed from the second major surface by a second distance, the first transition region comprises a second transition surface area extending between the second surface area and the second central surface area with a second average angle relative to the second central surface area, the second transition region comprises a fourth transition surface area extending between the fourth surface area and the second central surface area with a fourth average angle relative to the second central surface area, and the second average angle is in a range from about 167° to about 179°.

Aspect 5. The foldable substrate of aspect 4, wherein the fourth average angle is substantially equal to the second average angle.

Aspect 6. The foldable substrate of any one of aspects 4-5, wherein the second average angle is in a range from about 170° to about 176°.

Aspect 7. The foldable substrate of any one of aspects 1-3, wherein a first transition width of the first transition region is in a range from about 150 micrometers to about 700 micrometers.

Aspect 8. A foldable substrate comprising:

a substrate thickness in a range from about 100 micrometers to about 2 millimeters defined between a first major surface and a second major surface opposite the first major surface;

a first portion comprising the substrate thickness between a first surface area of the first major surface and a second surface area of the second major surface;

a second portion comprising the substrate thickness between a third surface area of the first major surface and a fourth surface area of the second major surface; and a central portion comprising:

a central thickness in a range from about 25 micrometers to about 80 micrometers defined between a first central surface area and a second central surface area opposite the first central surface area, and the first central surface area recessed from the first major surface by a first distance;

a first transition region comprising a first transition surface area extending between the first surface area and the first central surface area, and a thickness of the first transition region smoothly and monotonically decreases between the substrate thickness of the first portion and the central thickness of the central portion; and a second transition region comprising a third transition surface area extending between the third surface area and the first central surface area, and a thickness of the second transition region smoothly and monotonically decreases between the substrate thickness of the second portion and the central thickness of the central portion, wherein a first transition width of the first transition region is in a range from about 150 micrometers to about 700 micrometers.

Aspect 9. The foldable substrate of aspect 8, wherein the second central surface area is recessed from the second major surface by a second distance, the first transition region comprises a second transition surface area extending between the second surface area and the second central surface area, the second transition region comprises a fourth transition surface area extending between the fourth surface area and the second central surface area, and a second transition width of the second transition region is substantially equal to the first transition width.

Aspect 10. The foldable substrate of any one of aspects 7-9, wherein the first transition width is in a range from about 200 micrometers to about 500 micrometers.

Aspect 11. The foldable substrate of any one of aspects 1-10, wherein the foldable substrate comprises a maximum fractional intensity in a range from 1.0 to about 1.02 as measured using brightfield transmission.

Aspect 12. The foldable substrate of any one of aspects 1-10, wherein the foldable substrate comprises a contrast ratio defined as a difference between a maximum fractional intensity and a minimum fractional intensity divided by the sum of the maximum fractional intensity and the minimum fractional intensity is in a range from 0 to about 0.02 as measured using brightfield transmission.

Aspect 13. The foldable substrate of any one of aspects 1-10, wherein the foldable substrate comprises a maximum fractional intensity in a range from 1.0 to about 1.1 as measured using darkfield reflection.

Aspect 14. The foldable substrate of any one of aspects 1-10, wherein the foldable substrate comprises a contrast ratio defined as a difference between a maximum fractional intensity and a minimum fractional intensity divided by the sum of the maximum fractional intensity and the minimum fractional intensity is in a range from 0 to about 0.6 as measured using darkfield reflection.

Aspect 15. The foldable substrate of any one of aspects 1-10, wherein the substrate thickness is in a range from about 125 micrometers to about 200 micrometers.

Aspect 16. The foldable substrate of any one of aspects 1-15, wherein the central thickness is in a range from about 25 micrometers to about 60 micrometers.

Aspect 17. The foldable substrate of any one of aspects 1-16, wherein the foldable substrate comprises a glass-based substrate.

Aspect 18. The foldable substrate of any one of aspects 1-17, wherein the foldable substrate comprises a ceramic-based substrate.

Aspect 19. The foldable substrate of any one of aspects 1-18, wherein the second distance is from about 5% to about 20% of the substrate thickness.

Aspect 20. The foldable substrate of any one of aspects 1-19, wherein the first distance is substantially equal to the second distance.

Aspect 21. The foldable substrate of any one of aspects 1-20, wherein the first distance is about 20% to about 45% of the substrate thickness.

Aspect 22. The foldable substrate of any one of aspects 1-21, wherein the foldable substrate achieves a parallel plate distance of 10 millimeters.

Aspect 23. The foldable substrate of any one of aspects 1-22, wherein the foldable substrate comprises a minimum parallel plate distance in a range from about 2 millimeters to about 10 millimeters.

Aspect 24. A method of making a foldable substrate comprising a substrate thickness, the method comprising:

disposing an etch mask over a first major surface of the foldable substrate, the etch mask comprising:

a first portion comprising a first barrier layer at least partially adhered to the first major surface, a first polymer layer positioned between the first barrier layer and the first major surface at a first peripheral portion of the first portion, a first contact surface of the first polymer layer adhered to the first barrier layer, and a second contact surface of the first polymer layer facing the first major surface; and a second portion comprising a second barrier layer at least partially adhered to the first major surface, a second polymer layer positioned between the second barrier layer and the first major surface at a second peripheral portion of the second portion, a third contact surface of the second polymer layer adhered to the second barrier layer, a fourth contact surface of the second polymer layer facing the first major surface, and a minimum distance between the first peripheral portion and the second peripheral portion is in a range from about 1 millimeter to about 50 millimeters;

etching the foldable substrate by contacting a central region of a central portion of the foldable substrate between the first portion of the etch mask and the second portion of the etch mask, the etching removes a portion of the foldable substrate to form a first central surface area recessed from the first major surface by a first distance, the etching removes a portion of the foldable substrate to form a first transition surface area of a first transition region, and the etching removes a portion of the foldable substrate to form a third transition surface area of a second transition region; and removing the etch mask, wherein a first transition width of the first transition region is greater than or equal to a first width of the first polymer layer, a second transition width of the second transition region is greater than or equal to a second width of the second polymer layer, the central portion comprising the first transition region, the central region, and the second transition region, and the first width is in a range from about 100 micrometers to about 3 millimeters, and the second width is in a range from about 100 micrometers to about 3 millimeters.

Aspect 25. The method of aspect 24, wherein a thickness of the first transition region smoothly and monotonically decreases between the substrate thickness of the first portion and a central thickness of the central portion.

Aspect 26. The method of any one of aspects 24-25, wherein the first transition width is in a range from about 150 micrometers to about 1 millimeter, and the second transition width is in a range from about 150 micrometers to about 1 millimeter.

Aspect 27. The method of aspect 26, wherein the first transition width is in a range from about 150 micrometers to about 500 micrometers, and the second transition width is in a range from about 150 micrometers to about 500 micrometers.

Aspect 28. The method of any one of aspects 24-27, wherein the first transition region comprises a first transition surface area extending between the first major surface and the first central surface area with a first average angle relative to the first central surface area, the second transition region comprises a third transition surface area extending between the first major surface and the first central surface area with a third average angle relative to the first central surface area, and the first average angle is in a range from about 167° to about 179°.

Aspect 29. A method of making a foldable substrate comprising a substrate thickness, the method comprising:

disposing an etch mask over a first major surface of the foldable substrate, the etch mask comprising:

a first portion comprising a first barrier layer at least partially adhered to the first major surface, a first polymer layer positioned between the first barrier layer and the first major surface at a first peripheral portion of the first portion, the first polymer layer comprising a first width, a first contact surface of the first polymer layer adhered to the first barrier layer, and a second contact surface of the first polymer layer facing the first major surface; and a second portion comprising a second barrier layer at least partially adhered to the first major surface, a second polymer layer positioned between the second barrier layer and the first major surface at a second peripheral portion of the second portion, the second polymer layer comprising a second width, a third contact surface of the second polymer layer adhered to the second barrier layer, and a fourth contact surface of the second polymer layer facing the first major surface, and a minimum distance between the first peripheral portion and the second peripheral portion is in a range from about 1 millimeter to about 50 millimeters;

etching the foldable substrate by contacting a central region of a central portion of the foldable substrate between the first portion of the etch mask and the second portion of the etch mask, the etching removes a portion of the foldable substrate to form a first central surface area recessed from the first major surface by a first distance, the etching removes a portion of the foldable substrate to form a first transition surface area of a first transition region, and the etching removes a portion of the foldable substrate to form a third transition surface area of a second transition region; and removing the etch mask, wherein the first transition region comprises a first transition surface area extending between the first major surface and the first central surface area with a first average angle relative to the first central surface area, the second transition region comprises a third transition surface area extending between the first major surface and the first central surface area with a third average angle relative to the first central surface area, the central portion comprising the first transition region, the central region, and the second transition region, and the first average angle is in a range from about 167° to about 179°.

Aspect 30. The method of any one of aspects 28-29, wherein the third average angle is substantially equal to the first average angle.

Aspect 31. The method of any one of aspects 28-30, wherein the first average angle is in a range from about 170° to about 176°.

Aspect 32. The method of any one of aspects 24-31, wherein disposing the etch mask comprises:

disposing a first tape over the first major surface of the substrate;

creating a first space by removing a first section of the first tape comprising the first width;

disposing a first polymer sheet over the first major surface, a first portion of the first polymer sheet disposed in the first space, and a second portion of the first polymer sheet extending over the first tape;

removing the second portion of the first polymer sheet to form the first polymer layer;

removing the first tape; and then disposing the first barrier layer over the first major surface and the first polymer layer.

Aspect 33. The method of aspect 32, wherein disposing the etch mask further comprises:

creating a second space by removing a second section of the first tape comprising the second width;

disposing a second polymer layer over the first major surface, a third portion of the second polymer layer disposed in the second space, and a fourth portion of the second polymer layer extending over the first tape;

removing the fourth portion of the second polymer layer; and after removing the first tape, disposing the second barrier layer over the first major surface and the second polymer layer.

Aspect 34. The method of any one of aspects 24-33, wherein the first width is in a range from about 100 micrometers to about 700 micrometers, and the second width is in a range from about 100 micrometers to about 700 micrometers.

Aspect 35. The method of aspect 34, wherein the first width is in a range from about 100 micrometers to about 500 micrometers, and the second width is in a range from about 100 micrometers to about 500 micrometers.

Aspect 36. The method of any one of aspects 24-31, wherein disposing the etch mask comprises:

forming an assembly by disposing a polymer sheet on a barrier sheet and disposing the barrier sheet on a backer layer;

cutting through the polymer sheet and the barrier sheet at a first location and a second location, the first location and the second location are separated by the minimum distance;

cutting through the polymer sheet at a third location separated from the first location by the first width;

cutting through the polymer sheet at a fourth location separated from the second location by the second width;

removing a portion of the polymer sheet and the barrier sheet between the first location and the second location comprising the minimum distance to form the first barrier layer and the second barrier layer from the barrier sheet;

removing a portion of the polymer sheet extending from the third location to form the first polymer layer;

removing a portion of the polymer sheet extending from the fourth location to form the second polymer layer;

disposing the assembly on the first major surface; and removing the backer layer.

Aspect 37. The method of any one of aspects 24-36, further comprising:

before the etching, disposing a second etch mask over a second major surface of the foldable substrate, the second etch mask comprising:

a third portion comprising a third barrier layer at least partially adhered to the second major surface, a third polymer layer positioned between the third barrier layer and the second major surface at a third peripheral portion of the third portion, a fifth contact surface of the third polymer layer adhered to the third barrier layer, and a sixth contact surface of the third polymer layer facing the second major surface; and a fourth portion comprising a fourth barrier layer at least partially adhered to the second major surface, a fourth polymer layer positioned between the fourth barrier layer and the second major surface at a fourth peripheral portion of the fourth portion, a seventh contact surface of the fourth polymer layer adhered to the fourth barrier layer, and an eighth contact surface of the fourth polymer layer facing the second major surface, and a minimum distance between the third peripheral portion and the fourth peripheral portion is in a range from about 1 millimeter to about 50 millimeters;

the etching further comprises contacting the central region of the central portion of the foldable substrate between the third portion of the second etch mask and the fourth portion of the second etch mask, the etching removes a portion of the foldable substrate to form a second central surface area recessed from the second major surface by a second distance, the etching removes a portion of the foldable substrate to form a second transition surface area of the first transition region, and the etching removes a portion of the foldable substrate to form a fourth transition surface area of the second transition region; and after the etching, removing the second etch mask, wherein a third width of the third polymer layer is in a range from about 100 micrometers to about 3 millimeters, a fourth width of the fourth polymer layer is in a range from about 100 micrometers to about 3 millimeters.

Aspect 38. The method of aspect 37, wherein the third width is substantially equal to the first width, and the fourth width is substantially equal to the first width.

Aspect 39. The method of any one of aspects 37-38, wherein the first transition region comprises a second transition surface area extending between the second major surface and the second central surface area with a second average angle relative to the second central surface area, the second transition region comprises a fourth transition surface area extending between the second major surface and the second central surface area with a fourth average angle relative to the first central surface area, and the fourth average angle is in a range from about 167° to about 179°.

Aspect 40. The method of aspect 39, wherein a fourth average angle is substantially equal to the second average angle.

Aspect 41. The method of any one of aspects 39-40, wherein the third average angle is in a range from about 170° to about 176°.

Aspect 42. The method of any one of aspects 37-41, wherein a central thickness of the foldable substrate defined between the first central surface area and the second central surface area in a range from about 25 micrometers to about 80 micrometers.

Aspect 43. The method of any one of aspects 37-42, wherein the second distance is from about 5% to about 20% of the substrate thickness.

Aspect 44. The method of any one of aspects 37-43, wherein the first distance is substantially equal to the second distance.

Aspect 45. The method of any one of aspects 24-44, wherein:

the first etch mask further comprises a fifth polymer layer recessed from the first peripheral portion and positioned between the first polymer layer and the first major surface to form a first gap between the second contact surface of the first polymer layer and the first major surface, a ninth contact surface of the fifth polymer layer partially adhered to first barrier, and a tenth contact surface of the fifth polymer layer facing the first major surface; and the second etch mask further comprises a sixth polymer layer recessed from the second peripheral portion and positioned between the second polymer layer and the first major surface to form a second gap between the fourth contact surface of the second polymer layer and the first major surface, an eleventh contact surface of the sixth polymer layer partially adhered to second barrier, and a twelfth contact surface of the sixth polymer layer facing the first major surface.

Aspect 46. The method of aspect 45, wherein the first gap is substantially equal to a fifth thickness of the fifth polymer layer, the second gap is substantially equal to a sixth thickness of the sixth polymer layer, the fifth thickness is in a range from about 20 micrometers to about 200 micrometers, and the sixth thickness is in a range from about 20 micrometers to about 200 micrometers.

Aspect 47. The method of any one of aspects 45-46, wherein the fifth polymer layer is recessed from the first peripheral portion by from about 500 micrometers to about 2 millimeters.

Aspect 48. The method of any one of aspects 24-47, wherein the first barrier layer comprises a polymeric tape, and the second barrier layer comprises the polymeric tape.

Aspect 49. The method of aspect 48, wherein the polymeric tape comprises a polymeric layer comprising a polyimide and an adhesive film comprising a silicone.

Aspect 50. The method of any one of aspects 24-49, wherein the first polymer layer comprises poly(ethylene terephthalate), and the second polymer layer comprises poly(ethylene terephthalate).

Aspect 51. A method of making a foldable substrate comprising a substrate thickness, the method comprising:
- disposing an etch mask over a first major surface of the foldable substrate, the etch mask comprising:
  - disposing a first layer of a positive photoresist over the first major surface;
  - irradiating a first portion of the first layer comprising a first width; then
  - disposing a second layer of the positive photoresist over the first layer;
  - irradiating a second portion of the second layer comprising a second width, the second width is in a range from about 1 millimeter to about 50 millimeters, the second width less than the first width, and the second portion centered within the first portion; and
  - removing the second portion of the second layer and the first portion of the first layer to form a first portion of the etch mask and a second portion of the etch mask separated by a minimum distance equal to the second width;
- etching the foldable substrate by contacting a central region of a central portion of the foldable substrate between the first portion of the etch mask and the second portion of the etch mask, the etching removes a portion of the foldable substrate to form a first central surface area recessed from the first major surface by a first distance, the etching removes a portion of the foldable substrate to form a first transition surface area of a first transition region, and the etching removes a portion of the foldable substrate to form a third transition surface area of a second transition region; and
- removing the etch mask,
- wherein the first transition region comprises a first transition surface area extending between the first major surface and the first central surface area with a first average angle relative to the first central surface area, the central portion comprises the first transition region, the central region, and the second transition region, and the second transition region comprises a third transition surface area extending between the first major surface and the first central surface area with a third average angle relative to the first central surface area.

Aspect 52. The method of aspect 51, wherein a thickness of the first layer is in a range from about 20 micrometers to about 200 micrometers.

Aspect 53. The method of any one of aspects 51-52, wherein the second width is less than the first width by about 1 millimeter to about 4 millimeters.

Aspect 54. The method of any one of aspects 51-53, wherein the first average angle is in a range from about 167° to about 179°.

Aspect 55. The method of any one of aspects 51-54, wherein the third average angle is substantially equal to the first average angle.

Aspect 56. The method of any one of aspects 51-55, wherein the first average angle is in a range from about 170° to about 176°.

Aspect 57. The method of any one of aspects 51-56, wherein a first transition width of the first transition region is in a range from about 150 micrometers to about 700 micrometers.

Aspect 58. The method of aspect 57, wherein the first transition width is in a range from about 200 micrometers to about 500 micrometers.

Aspect 59. The method of any one of aspects 24-58, wherein the foldable substrate comprises a maximum fractional intensity in a range from 1.0 to about 1.02 as measured using brightfield transmission.

Aspect 60. The method of any one of aspects 24-58, wherein the foldable substrate comprises a contrast ratio defined as a difference between a maximum fractional intensity and a minimum fractional intensity divided by the sum of the maximum fractional intensity and the minimum fractional intensity is in a range from 0 to about 0.02 as measured using brightfield transmission.

Aspect 61. The method of any one of aspects 24-58, wherein the foldable substrate comprises a maximum fractional intensity in a range from 1.0 to about 1.1 as measured using darkfield reflection.

Aspect 62. The method of any one of aspects 24-58, wherein the foldable substrate comprises a contrast ratio defined as a difference between a maximum fractional intensity and a minimum fractional intensity divided by the sum of the maximum fractional intensity and the minimum fractional intensity is in a range from 0 to about 0.6 as measured using darkfield reflection.

Aspect 63. The method of any one of aspects 24-62, further comprising, before disposing the etch mask, chemically strengthening the foldable substrate to form an initial first compressive stress region extending from the first major surface to an initial first depth of compression from the first major surface and an initial second compressive stress region extending from the second major surface to an initial second depth of compression from the second major surface.

Aspect 64. The method of aspect 63, wherein the initial first depth of compression is less than the first distance.

Aspect 65. The method of any one of aspects 63-64, wherein the initial first depth of compression divided by the substrate thickness is in a range from about 10% to about 20%.

Aspect 66. The method of any one of aspects 63-65, wherein, before the chemically strengthening, the foldable substrate is substantially unstrengthened.

Aspect 67. The method of any one of aspects 24-66, further comprising, after removing the etch mask, further chemically strengthening the foldable substrate.

Aspect 68. The method of any one of aspects 24-67, wherein the first distance is about 20% to about 45% of the substrate thickness.

Aspect 69. The method of any one of aspects 24-68, wherein the substrate thickness is in a range from about 125 micrometers to about 200 micrometers.

Aspect 70. The method of any one of aspects 24-69, wherein the foldable substrate comprises a glass-based substrate.

Aspect 71. The method of any one of aspects 24-69, wherein the foldable substrate comprises a ceramic-based substrate.

Aspect 72. The method of any one of aspects 24-71, wherein the foldable substrate achieves a parallel plate distance of 10 millimeters.

Aspect 73. The method of any one of aspects 24-72, wherein the foldable substrate comprises a minimum parallel plate distance in a range from about 2 millimeters to about 10 millimeters.

Aspect 74. The method of any one of aspects 24-73, wherein the etchant comprises an acid.

Aspect 75. The method of aspect 74, wherein the acid comprises hydrofluoric acid.

BRIEF DESCRIPTION OF THE DRAWINGS

The above and other features and advantages of aspects of the present disclosure are better understood when the following detailed description is read with reference to the accompanying drawings, in which.

Figure 1:
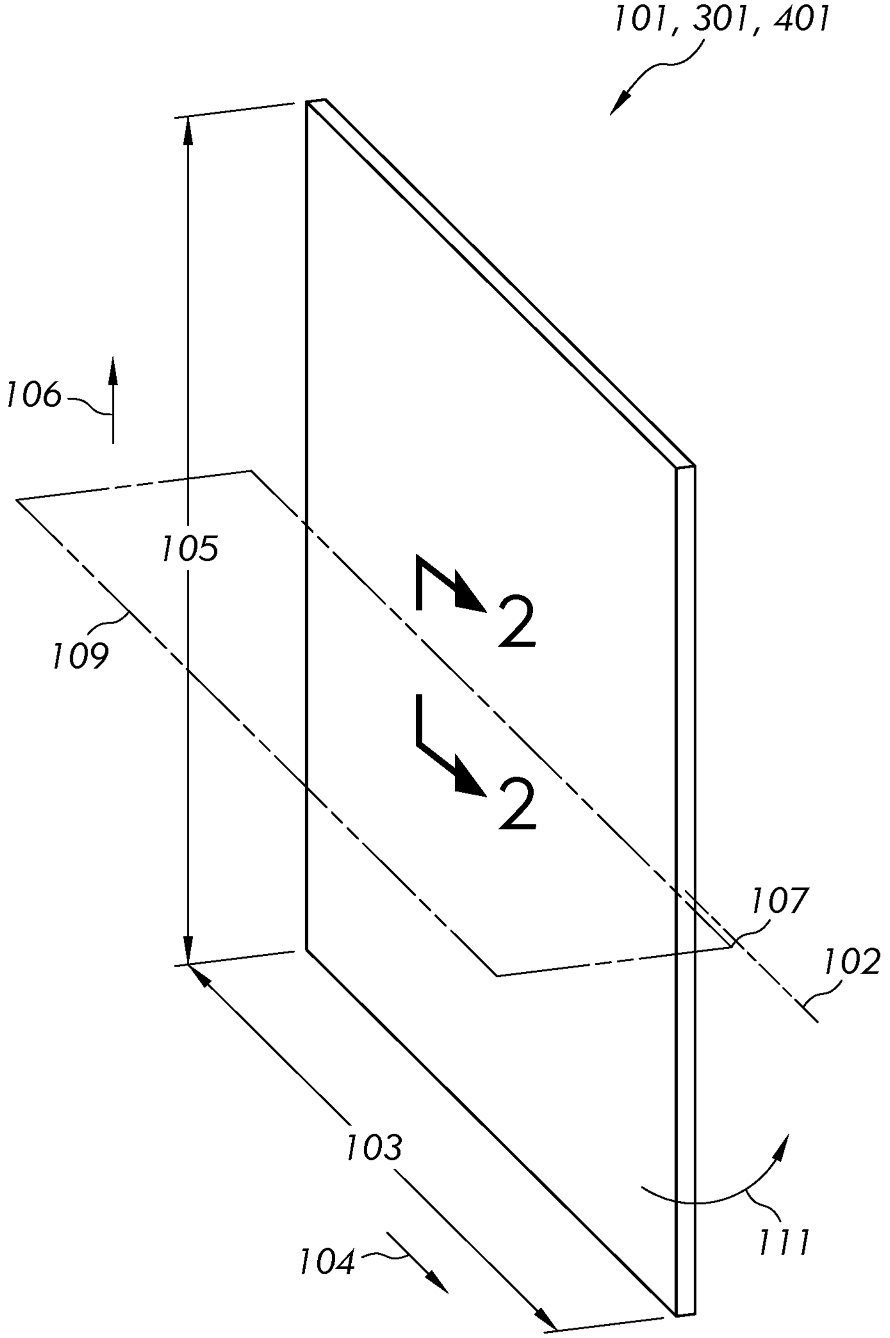
FIG. 1 is a schematic view of an example foldable apparatus in a flat configuration according to aspects, wherein a schematic view of the folded configuration may appear as shown in FIG. 5.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Aspects will now be described more fully hereinafter with reference to the accompanying drawings in which example aspects are shown. Whenever possible, the same reference numerals are used throughout the drawings to refer to the same or like parts.

FIGS. 1-4 and 6-7 illustrate views of foldable apparatus 101, 301, 401, 501, and 701 comprising a foldable substrate 201 in accordance with aspects of the disclosure. Unless otherwise noted, a discussion of features of aspects of one foldable apparatus can apply equally to corresponding features of any aspects of the disclosure. For example, identical part numbers throughout the disclosure can indicate that, in some aspects, the identified features are identical to one another and that the discussion of the identified feature of one aspect, unless otherwise noted, can apply equally to the identified feature of any of the other aspects of the disclosure.

Figure 2:
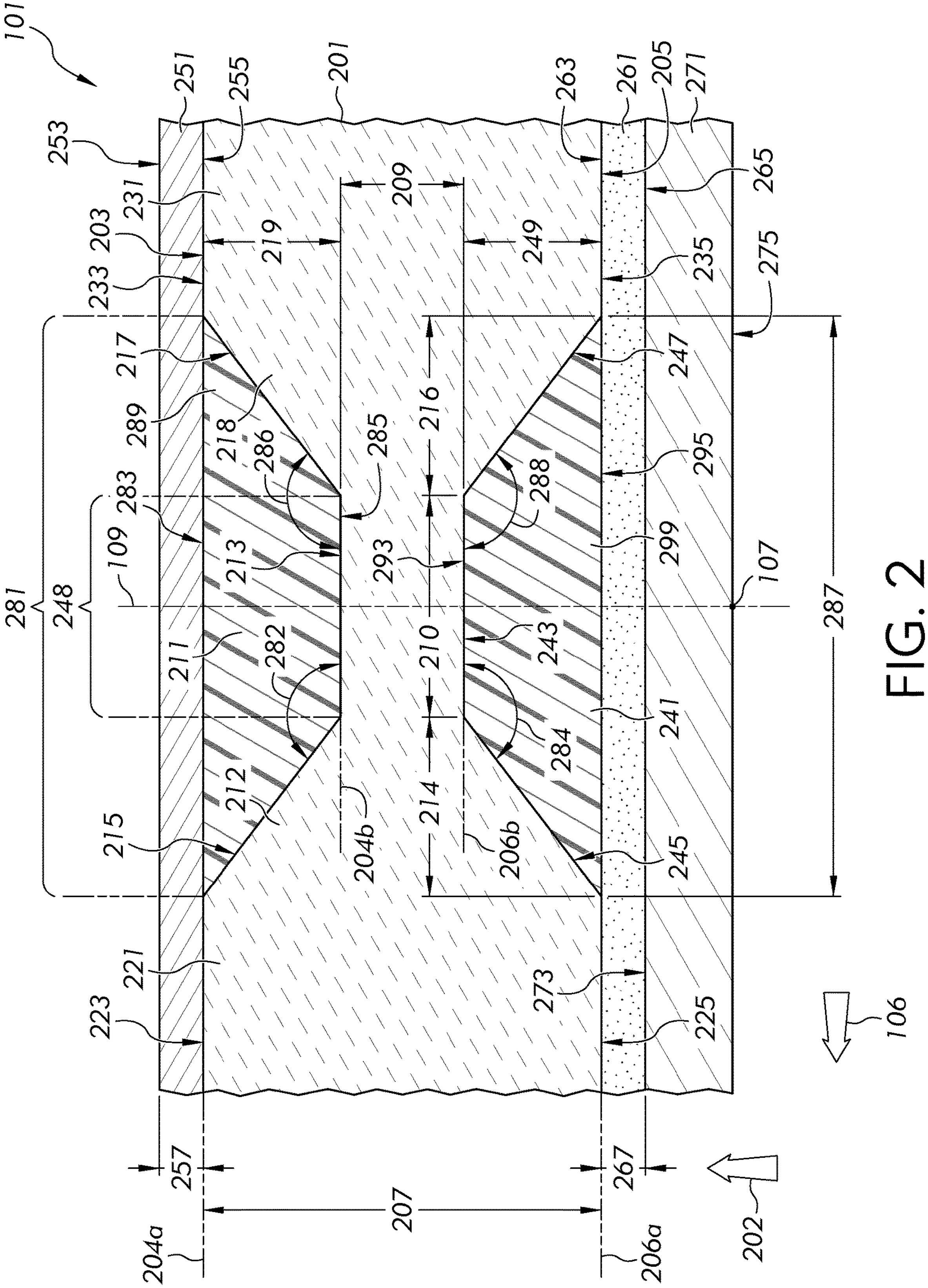
FIGS. 2-4 are cross-sectional views of the foldable apparatus along line 2-2 of FIG. 1 according to aspects.
Figure 3:
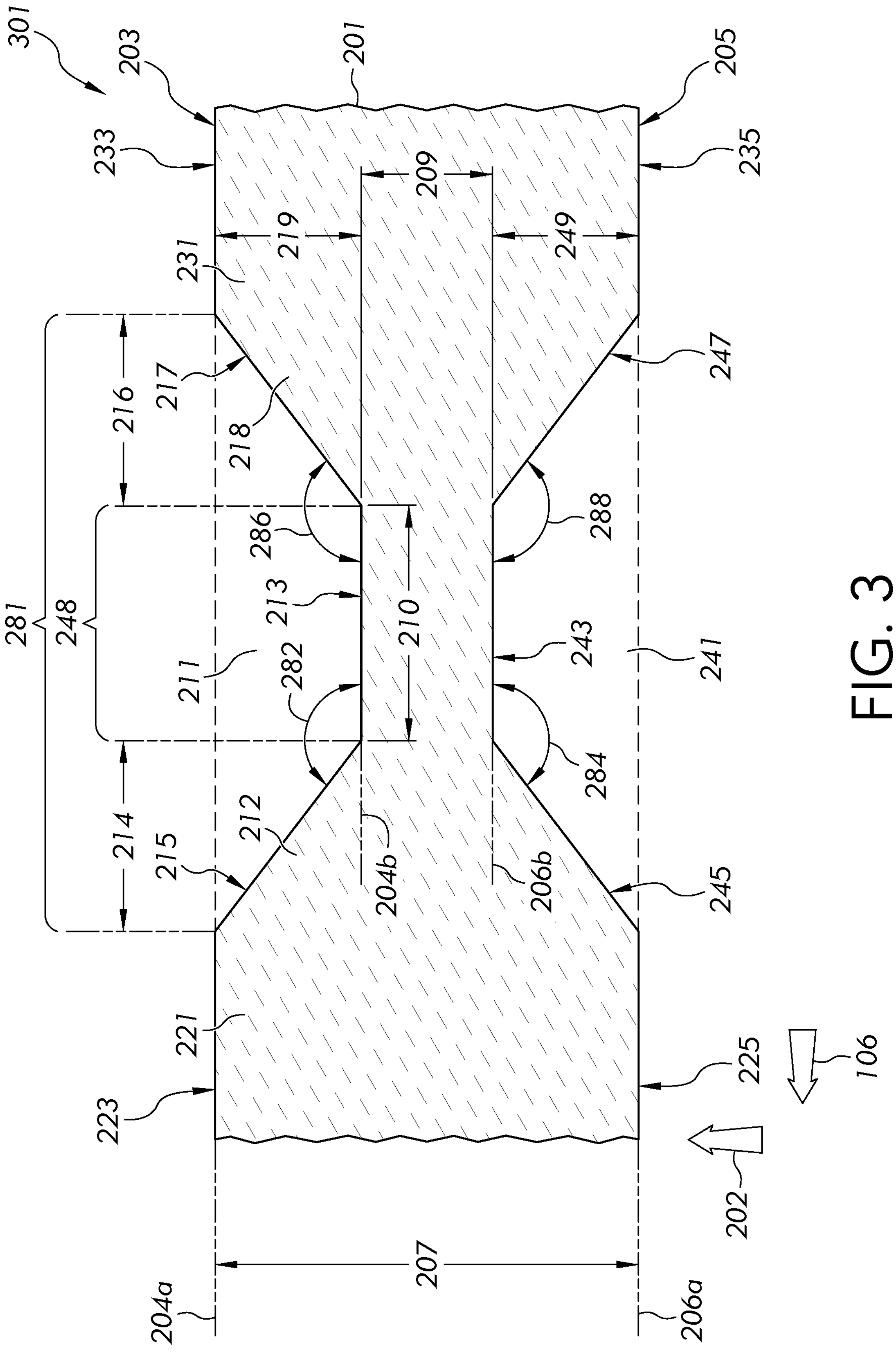
Figure 4:
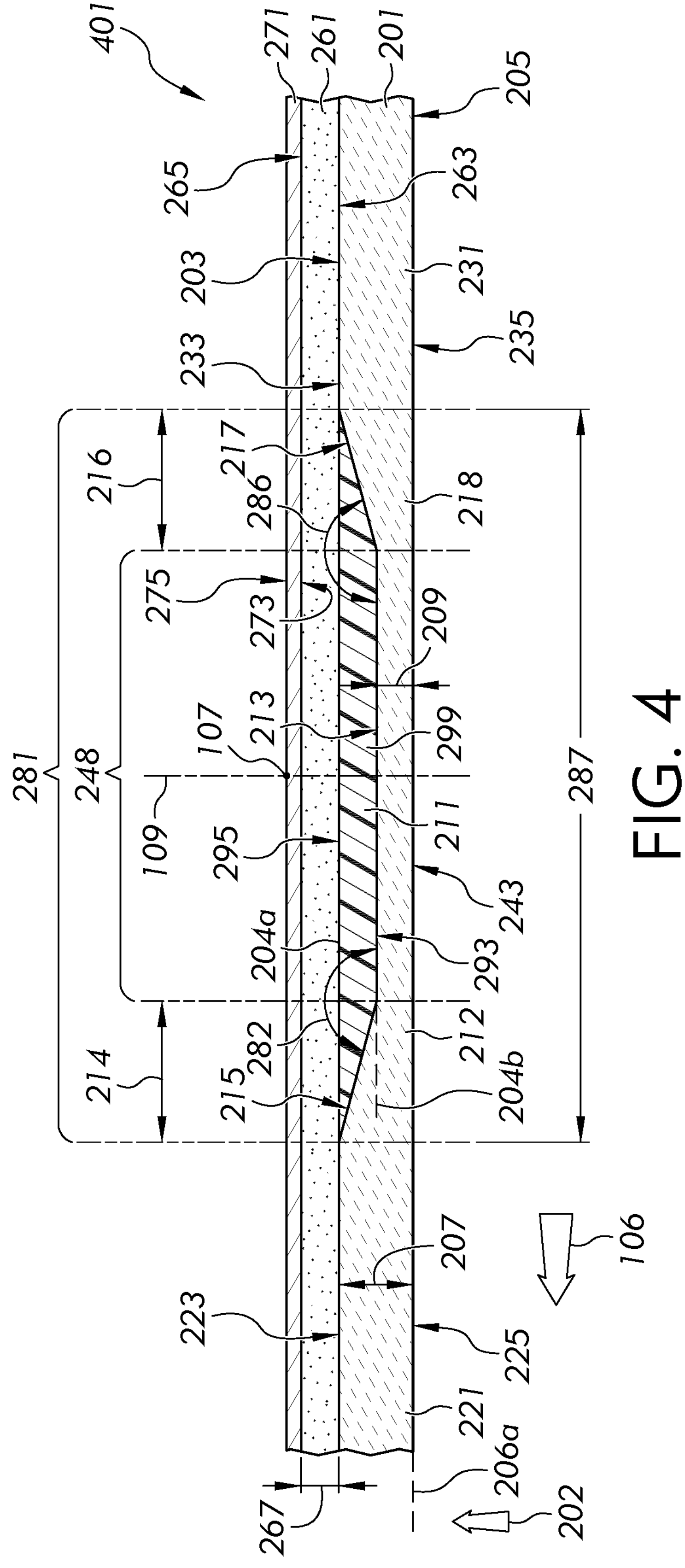
Figure 6:
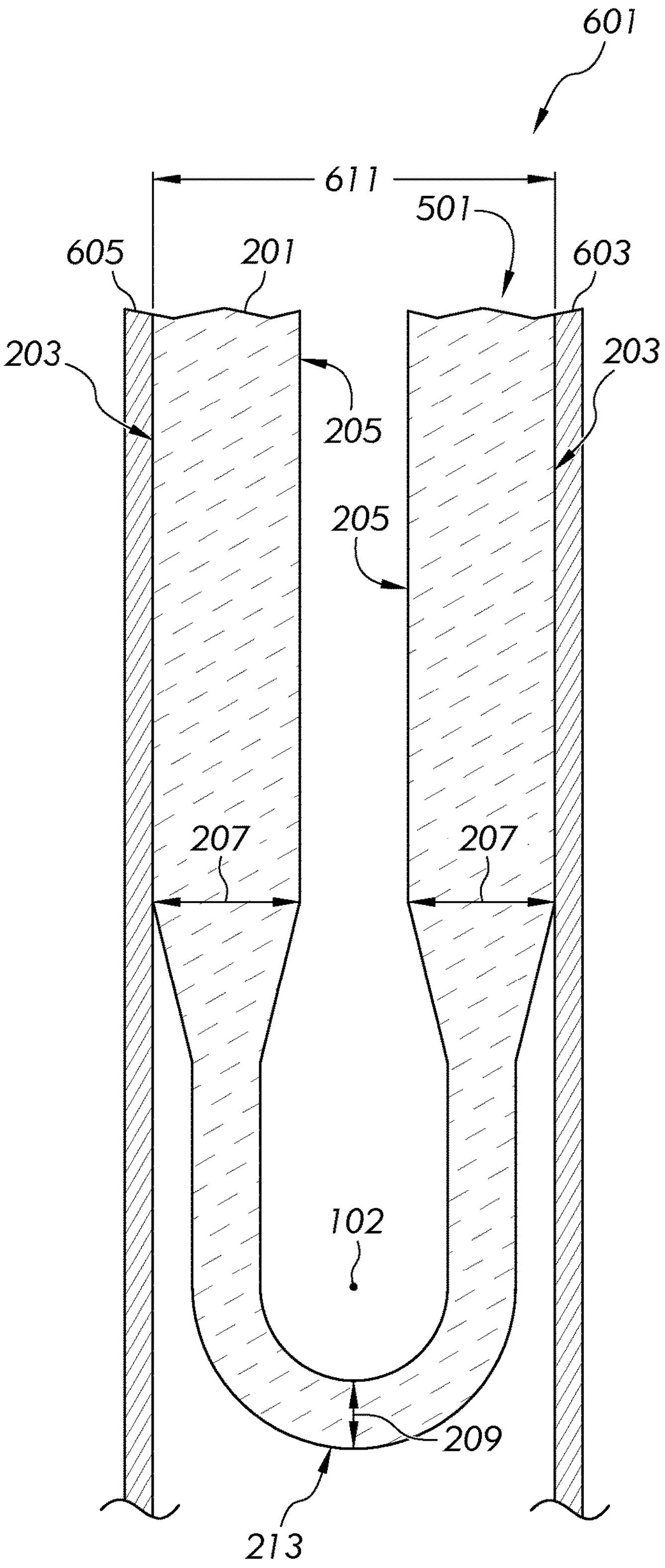
FIG. 6 is a cross-sectional view of a testing apparatus to determine the minimum parallel plate distance of an example foldable substrate along line 7-7 of FIG. 5.
Figure 7:
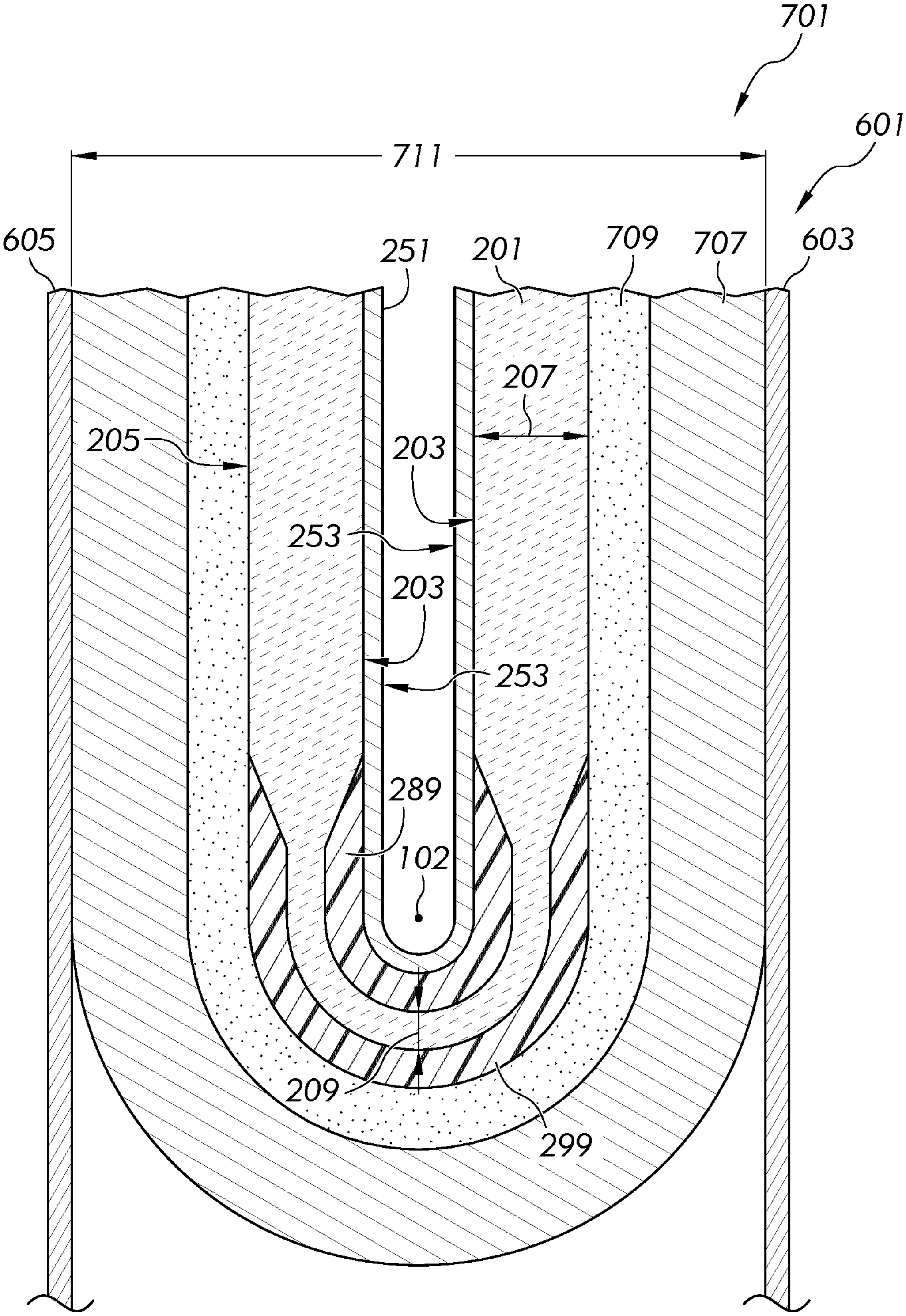
FIG. 7 is a cross-sectional views of another testing apparatus to determine the minimum parallel plate distance of an example modified foldable apparatus along line 7-7 of FIG. 5.

FIGS. 2-4 schematically illustrate example aspects of foldable apparatus 101, 301, and 401 comprising the foldable substrate 201 in accordance with aspects of the disclosure in an unfolded (e.g., flat) configuration while FIGS. 6-7 illustrates an example aspect of a foldable apparatus 501 and 701 comprising the foldable substrate 201 in accordance with aspects of the disclosure in a folded configuration.

The foldable apparatus 101, 301, and 401 comprise a first portion 221, a second portion 231, and a central portion 281 positioned between the first portion 221 and the second portion 231. In aspects, as shown in FIGS. 2 and 4, the foldable apparatus 101 can comprise a release liner 271 although other substrates (e.g., a glass-based substrate and/or a ceramic-based substrate discussed throughout the application) may be used in further aspects rather than with the illustrated release liner 271. In aspects, as shown in FIGS. 2 and 7, the foldable apparatus 101 and 701 can comprise a coating 251. In aspects, as shown in FIGS. 2 and 4, the foldable apparatus 101 can comprise an adhesive layer 261. In aspects, as shown in FIGS. 2 and 7, foldable apparatus 101 and 701 can comprise a polymer-based portion 289 and/or 299. As shown in FIGS. 2-4, the foldable substrate 201 can comprise a first recess 211. In aspects, as shown in FIGS. 2-3, the foldable substrate 201 can further comprise a second recess 241. It is to be understood that any of the foldable apparatus of the disclosure can comprise a second substrate (e.g., a glass-based substrate and/or a ceramic-based substrate), a release liner 271, a display device, a coating 251, an adhesive layer 261, and/or a polymer-based portion 289 and/or 299.

Figure 5:
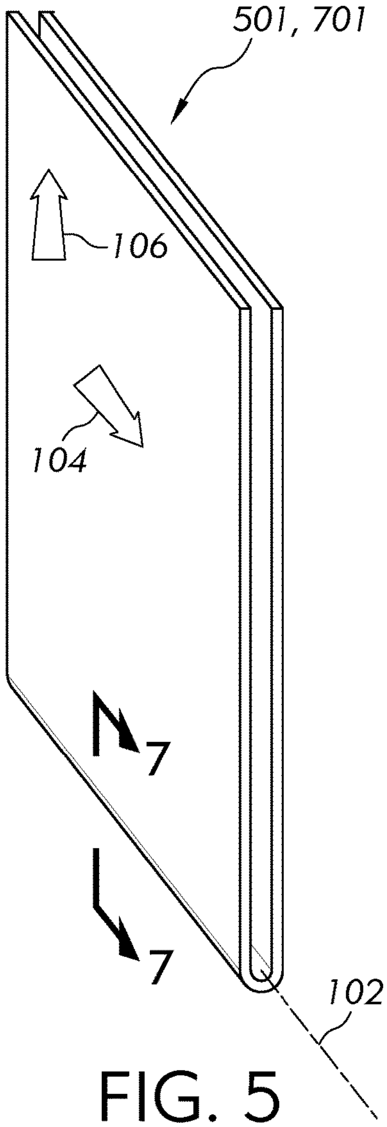
FIG. 5 is a schematic view of example foldable apparatus of aspects of the disclosure in a folded configuration wherein a schematic view of the flat configuration may appear as shown in FIG. 1.

Throughout the disclosure, with reference to FIG. 1, the width 103 of the foldable apparatus 101, 301, 401, 501, and/or 701 is considered the dimension of the foldable apparatus taken between opposed edges of the foldable apparatus in a direction 104 of a fold axis 102 of the foldable apparatus, wherein the direction 104 also comprises the direction of the width 103. Furthermore, throughout the disclosure, the length 105 of the foldable apparatus 101, 301, 401, 501, and/or 701 is considered the dimension of the foldable apparatus 101, 301, 401, 501, and/or 701 taken between opposed edges of the foldable apparatus 101, 301, 401, 501, and/or 701 in a direction 106 perpendicular to the fold axis 102 of the foldable apparatus 101, 301, 401, 501, and/or 701. In aspects, as shown in FIGS. 1-2, the foldable apparatus of any aspects of the disclosure can comprise a fold plane 109 that includes the fold axis 102 when the foldable apparatus is in the flat configuration (e.g., see FIG. 2). In further aspects, as shown in FIG. 2, the fold plane 109 can extend along the fold axis 102 and in a direction of the substrate thickness 207 when the foldable apparatus is in the flat configuration (e.g., see FIG. 2). The fold plane 109 may comprise a central axis 107 of the foldable apparatus. In aspects, the foldable apparatus can be folded in a direction 111 (e.g., see FIG. 1) about the fold axis 102 extending in the direction 104 of the width 103 to form a folded configuration (e.g., see FIGS. 5-7). As shown, the foldable apparatus may include a single fold axis to allow the foldable apparatus to comprise a bifold wherein, for example, the foldable apparatus may be folded in half. In further aspects, the foldable apparatus may include two or more fold axes with each fold axis including a corresponding central portion similar or identical to the central portion 281 discussed herein. For example, providing two fold axes can allow the foldable apparatus to comprise a trifold wherein, for example, the foldable apparatus may be folded with the first portion 221, the second portion 231, and a third portion similar or identical to the first portion or second portion with the central portion 281 and another central portion similar to or identical to the central portion positioned between the first portion and the second portion and between the second portion and the third portion, respectively.

The foldable substrate 201 can comprise a glass-based substrate and/or a ceramic-based substrate having a pencil hardness of 8H or more, for example, 9H or more. As used herein, pencil hardness is measured using ASTM D 3363-20 with standard lead graded pencils. Providing a glass-based foldable substrate and/or a ceramic-based foldable substrate can enhance puncture resistance and/or impact resistance.

In aspects, the foldable substrate 201 can comprise a glass-based substrate. As used herein, "glass-based" includes both glasses and glass-ceramics, wherein glass-ceramics have one or more crystalline phases and an amorphous, residual glass phase. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion exchange of larger ions for smaller ions in the surface of the substrate, as discussed below. However, other strengthening methods, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In aspects, glass-based material can comprise an alkali-containing glass or an alkali-free glass, either of which may be free of lithia or not. In aspects, the glass material can be alkali-free and/or comprise a low content of alkali metals (e.g., $R_2O$ of about 10 mol % or less, wherein $R_2O$ comprises $Li_2O$ $Na_2O$, $K_2O$, or the more expansive list provided below). In one or more aspects, a glass-based material may comprise, in mole percent (mol %): $SiO_2$ in a range from about 40 mol % to about 80%, $Al_2O_3$ in a range from about 5 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali-metal oxide, for example, $Li_2O$, $Na_2O$, $K_2O$, $Rb_2O$, and $Cs_2O$. As used herein, RO can refer to MgO, CaO, SrO, BaO, and ZnO. In aspects, a glass-based substrate may optionally further comprise in a range from 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. "Glass-ceramics" include materials produced through controlled crystallization of glass. In aspects, glass-ceramics have about 1% to about 99% crystallinity. Examples of suitable glass-ceramics may include $Li_2O$—$Al_2O_3$—$SiO_2$ system (i.e., LAS-System) glass-ceramics, MgO—$Al_2O_3$—$SiO_2$ system (i.e., MAS-System) glass-ceramics, $ZnO \times Al_2O_3 \times nSiO_2$ (i.e., ZAS system), and/or glass-ceramics that include a predominant crystal phase including β-quartz solid solution, β-spodumene, cordierite, petalite, and/or lithium disilicate. The glass-ceramic substrates may be strengthened using the chemical strengthening processes. In one or more aspects, MAS-System glass-ceramic substrates may be strengthened in $Li_2SO_4$ molten salt, whereby an exchange of $2Li^+$ for $Mg^{2+}$ can occur.

In aspects, the foldable substrate 201 can comprise a ceramic-based substrate. As used herein, "ceramic-based" includes both ceramics and glass-ceramics, wherein glass-ceramics have one or more crystalline phases and an amorphous, residual glass phase. Ceramic-based materials may be strengthened (e.g., chemically strengthened). In aspects, a ceramic-based material can be formed by heating a glass-based material to form ceramic (e.g., crystalline) portions. In further aspects, ceramic-based materials may comprise one or more nucleating agents that can facilitate the formation of crystalline phase(s). In aspects, ceramic-based materials can comprise one or more oxides, nitrides, oxynitrides, carbides, borides, and/or silicides. Example aspects of ceramic oxides include zirconia ($ZrO_2$), zircon ($ZrSiO_4$), an alkali-metal oxide (e.g., sodium oxide ($Na_2O$)), an alkali earth metal oxide (e.g., magnesium oxide (MgO)), titania ($TiO_2$), hafnium oxide ($Hf_2O$), yttrium oxide ($Y_2O_3$), iron oxides, beryllium oxides, vanadium oxide ($VO_2$), fused quartz, mullite (a mineral comprising a combination of aluminum oxide and silicon dioxide), and spinel ($MgAl_2O_4$). Example aspects of ceramic nitrides include silicon nitride ($Si_3N_4$), aluminum nitride (AlN), gallium nitride (GaN), beryllium nitride ($Be_3N_2$), boron nitride (BN), tungsten nitride (WN), vanadium nitride, alkali earth metal nitrides (e.g., magnesium nitride ($Mg_3N_2$)), nickel nitride, and tantalum nitride. Example aspects of oxynitride ceramics include silicon oxynitride, aluminum oxynitride, and a SiAlON (a combination of alumina and silicon nitride and can have a chemical formula, for example, $Si_{12-m-n}Al_{m+n}O_nN_{16-n}$, $Si_{6-n}Al_nO_nN_{8-n}$, or $Si_{2-n}Al_nO_{1+n}N_{2-n}$, where m, n, and the resulting subscripts are all non-negative integers). Example aspects of carbides and carbon-containing ceramics include silicon carbide (SiC), tungsten carbide (WC), an iron carbide, boron carbide ($B_4C$), alkali-metal carbides (e.g., lithium carbide ($Li_4C_3$)), alkali earth metal carbides (e.g., magnesium carbide ($Mg_2C_3$)), and graphite. Example aspects of borides include chromium boride ($CrB_2$), molybdenum boride ($Mo_2B_5$), tungsten boride ($W_2B_5$), iron boride, titanium boride, zirconium boride ($ZrB_2$), hafnium boride ($HfB_2$), vanadium boride ($VB_2$), Niobium boride ($NbB_2$), and lanthanum boride ($LaB_6$). Example aspects of silicides include molybdenum disilicide ($MoSi_2$), tungsten disilicide ($WSi_2$), titanium disilicide ($TiSi_2$), nickel silicide (NiSi), alkali earth silicide (e.g., sodium silicide (NaSi)), alkali-metal silicide (e.g., magnesium silicide ($Mg_2Si$)), hafnium disilicide ($HfSi_2$), and platinum silicide (PtSi).

Throughout the disclosure, a tensile strength, ultimate elongation (e.g., strain at failure), and yield point of a polymeric material (e.g., adhesive, polymer-based portion) is determined using ASTM D638 using a tensile testing machine, for example, an Instron 3400 or Instron 6800, at 23° C. and 50% relative humidity with a type I dogbone shaped sample. Throughout the disclosure, an elastic modulus (e.g., Young's modulus) and/or a Poisson's ratio is measured using ISO 527-1:2019. In aspects, the foldable substrate 201 can comprise an elastic modulus of about 1 GigaPascal (GPa) or more, about 3 GPa or more, about 5 GPa or more, about 10 GPa or more, about 100 GPa or less, about 80 GPa or less, about 60 GPa or less, or about 20 GPa or less. In aspects, the foldable substrate 201 can comprise an elastic modulus in a range from about 1 GPa to about 100 GPa, from about 1 GPa to about 80 GPa, from about 3 GPa to about 80 GPa, from about 3 GPa to about 60 GPa, from about 5 GPa to about 60 GPa, from about 5 GPa to about 20 GPa, from about 10 GPa to about 20 GPa, or any range or subrange therebetween. In further aspects, the foldable substrate 201 can comprise a glass-based material or a ceramic-based material comprising an elastic modulus in a range from about 10 GPa to about 100 GPa, from about 40 GPa to about 100 GPa, from about 60 GPa to about 100 GPa, from about 60 GPa to about 80 GPa, from about 80 GPa to about 100 GPa, or any range or subrange therebetween.

In aspects, the foldable substrate 201 can be optically transparent. As used herein, "optically transparent" or "optically clear" means an average transmittance of 70% or more in the wavelength range of 400 nm to 700 nm through a 1.0 mm thick piece of a material. In aspects, an "optically transparent material" or an "optically clear material" may have an average transmittance of 75% or more, 80% or more, 85% or more, or 90% or more, 92% or more, 94% or more, 96% or more in the wavelength range of 400 nm to 700 nm through a 1.0 mm thick piece of the material. The average transmittance in the wavelength range of 400 nm to 700 nm is calculated by measuring the transmittance of whole number wavelengths from about 400 nm to about 700 nm and averaging the measurements.

As shown in FIGS. 2-4, the foldable apparatus 101, 301, and 401 comprise the foldable substrate 201 comprising a first major surface 203 and a second major surface 205 opposite the first major surface 203. As shown in FIGS. 2-4, the first major surface 203 can extend along a first plane 204*a*. The second major surface 205 can extend along a second plane 206*a*. In aspects, as shown, the second plane 206*a* can be parallel to the first plane 204*a*. As used herein, a substrate thickness 207 can be defined between the first major surface 203 and the second major surface 205 as a distance between the first plane 204*a* and the second plane 206*a*. In aspects, the substrate thickness 207 can be about 10 micrometers (μm) or more, about 25 μm or more, about 40 μm or more, about 60 μm or more, about 80 μm or more, about 100 μm or more, about 125 μm or more, about 150 μm or more, about 2 millimeters (mm) or less, about 1 mm or less, about 800 μm or less, about 500 μm or less, about 300 μm or less, about 200 μm or less, about 180 μm or less, or about 160 μm or less. In aspects, the substrate thickness 207 can be in a range from about 10 μm to about 2 mm, from about 25 μm to about 2 mm, from about 40 μm to about 2 mm, from about 60 μm to about 2 mm, from about 80 μm to about 2 mm, from about 100 μm to about 2 mm, from about 100 μm to about 1 mm, from about 100 μm to about 800 μm, from about 100 μm to about 500 μm, from about 125 μm to about 500 μm, from about 125 μm to about 300 μm, from about 125 μm to about 200 μm, from about 150 μm to about 200 μm, from about 150 μm to about 160 μm, or any range or subrange therebetween.

As shown in FIGS. 2-4, the first portion 221 of the foldable substrate 201 can comprise a first surface area 223 and a second surface area 225 opposite the first surface area 223. The first portion 221 will now be described with reference to the foldable apparatus 101 of FIG. 2 with the understanding that such description of the first portion 221, unless otherwise stated, can also apply to any aspects of the disclosure, for example, the foldable apparatus 301, 401, 501, and/or 701 illustrated in FIGS. 3-4 and 6-7. In aspects, as shown, the first surface area 223 can comprise a planar surface, and/or the second surface area 225 of the first portion 221 can comprise a planar surface. In further aspects, as shown, the second surface area 225 can be parallel to the first surface area 223. In aspects, as shown, the first major surface 203 can comprise the first surface area 223 and the second major surface 205 can comprise the second surface area 225. In further aspects, the first surface area 223 can extend along the first plane 204*a*. In further aspects, the second surface area 225 can extend along the second plane 206*a*. In aspects, the substrate thickness 207 can correspond to the distance between the first surface area 223 of the first portion 221 and the second surface area 225 of the first portion 221. In aspects, the substrate thickness 207 can be substantially uniform across the first surface area 223. In aspects, a first thickness defined between the first surface area 223 and the second surface area 225 can be within one or more of the ranges discussed above with regards to the substrate thickness 207. In further aspects, the first thickness can comprise the substrate thickness 207. In further aspects, the first thickness of the first portion 221 may be substantially uniform between the first surface area 223 and the second surface area 225 across its corresponding length (i.e., in the direction 106 of the length 105 of the foldable apparatus) and/or its corresponding width (i.e., in the direction 104 of the width 103 of the foldable apparatus).

As shown in FIGS. 2-4, the second portion 231 of the foldable substrate 201 can comprise a third surface area 233 and a fourth surface area 235 opposite the third surface area 233. The second portion 231 will now be described with reference to the foldable apparatus 101 of FIG. 2 with the understanding that such description of the second portion 231, unless otherwise stated, can also apply to any aspects of the disclosure, for example, the foldable apparatus 301, 401, 501, and/or 701 illustrated in FIGS. 3-4 and 6-7. In aspects, as shown, the third surface area 233 of the second portion 231 can comprise a planar surface, and/or the fourth surface area 235 of the second portion 231 can comprise a planar surface. In further aspects, the third surface area 233 of the second portion 231 can be in a common plane with the first surface area 223 of the first portion 221. In further aspects, as shown, the fourth surface area 235 can be parallel to the third surface area 233. In further aspects, the fourth surface area 235 of the second portion 231 can be in a common plane with the second surface area 225 of the first portion 221. A second thickness can be defined between the third surface area 233 of the second portion 231 and the fourth surface area 235 of the second portion 231. In aspects, the second thickness can be within the range discussed above with regards to the substrate thickness 207. In further aspects, the second thickness can comprise the substrate thickness 207. In further aspects, as shown, the second thickness can be substantially equal to the substrate thickness 207 (e.g., first thickness). In aspects, the second thickness of the second portion 231 may be substantially uniform between the third surface area 233 and the fourth surface area 235.

As shown in FIGS. 2-4, the foldable substrate 201 can comprise a central portion 281 positioned between the first portion 221 and the second portion 231. In aspects, the central portion 281 can comprise a first central surface area 213 and a second central surface area 243 opposite the first central surface area 213. As shown, the first central surface area 213 of the central portion 281 can be positioned between the first surface area 223 and the third surface area 233. In further aspects, the first central surface area 213 can correspond to a central region 248 of the central portion 281. In further aspects, as shown, the first central surface area 213 can extend along a third plane 204*b* when the foldable apparatus 101, 301, and/or 401 is in a flat configuration. A first recess 211 can be defined between the first central surface area 213 (e.g., third plane 204*b*) and the first plane 204*a*.

In aspects, the third plane 204*b* can be substantially parallel to the first plane 204*a* and/or the second plane 206*a*. In further aspects, as shown in FIGS. 2-3, the first central surface area 213 can be recessed from the first major surface 203 by a first distance 219. In further aspects, the first distance 219 that the first central surface area 213 is recessed from the first plane 204*a* can be about 1 μm or more, about 5 μm or more, about 10 μm or more, about 25 μm or more, about 40 μm or more, about 80 μm or more, about 100 μm or more, about 125 μm or more, about 150 μm or more, about 1 mm or less, about 800 μm or less, about 500 μm or less, about 300 μm or less, about 200 μm or less, about 180 μm or less, or about 160 μm or less. In further aspects, the first distance 219 can be in a range from about 1 μm to about 1 mm, from about 1 μm to about 800 μm, from about 5 μm to about 800 μm, from about 5 μm to about 500 μm, from about 10 μm to about 500 μm, from about 10 μm to about 300 μm, from about 25 μm to about 300 μm, from about 25 μm to about 200 μm, from about 40 μm to about 200 μm, from about 80 μm to about 200 μm, from about 80 μm to about 200 μm, from about 100 μm to about 200 μm, from about 125 μm to about 200 μm, from about 125 μm to about 180 μm, from about 125 μm to about 160 μm, from about 125 μm to about 150 μm, or any range or subrange therebetween. In further aspects, the first distance 219 that the first central surface area 213 is recessed from the first plane 204*a* as a percentage of the substrate thickness 207 can be about 1% or more, about 5% or more, about 10% or more, about 15% or more, about 20% or more, about 25% or more, about 75% or less, about 60% or less, about 50% or less, about 40% or less, about 35% or less, or about 30% or less. In further aspects, the first distance 219 as a percentage of the substrate thickness 207 can be in a range from about 1% to about 75%, from about 1% to about 60%, from about 5% to about 60%, from about 5% to about 50%, from about 10% to about 50%, from about 10% to about 45%, from about 15% to about 45%, from about 20% to about 45%, from about 20% to about 35%, from about 20% to about 30%, from about 25% to about 30%, or any range or subrange therebetween.

As shown in FIGS. 2-4, the second central surface area 243 of the central portion 281 can be positioned between the second surface area 225 and the fourth surface area 235. In further aspects, as shown in FIGS. 2-3, the second central surface area 243 can extend along a fourth plane 206*b* when the foldable apparatus 101 and/or 301 is in a flat configuration. In further aspects, as shown in FIGS. 2-3, a second recess 241 can be defined between the second central surface area 243 (e.g., fourth plane 206*b*) and the second plane 206*a*. In aspects, as shown in FIG. 4, the second central surface area 243 can extend along the second plane 206*a*.

In aspects, as shown in FIGS. 2-3, the second central surface area 243 can be recessed from the second major surface 205 by a second distance 249. In further aspects, the second distance 249 can be within one or more of the ranges discussed above for the first distance 219. In further aspects, the first distance can be greater than the second distance. In even further aspects, the second distance 249 that the second central surface area 243 is recessed from the second plane 206*a* as a percentage of the substrate thickness 207 can be about 1% or more, about 2% or more, about 5% or more, about 10% or more, about 12% or more, about 30% or less, about 25% or less, about 20% or less, about 18% or less, or about 15% or less. In even further aspects, the second distance 249 as a percentage of the substrate thickness 207 can be in a range from about 1% to about 30%, from about 1% to about 25%, from about 2% to about 25%, from about 5% to about 25%, from about 5% to about 20%, from about 10% to about 20%, from about 10% to about 18%, from about 12% to about 18%, from about 12% to about 15%, or any range or subrange therebetween. In further aspects, as shown in FIG. 2, the first distance 219 can be substantially equal to the second distance 249. Providing the first distance substantially equal to the second distance can further reduce the incidence of mechanical instabilities in the central portion, for example, because the foldable substrate is symmetric about a plane comprising a midpoint in the substrate thickness and the central thickness. In further aspects, as shown in FIG. 4, the second central surface area 243 can be coplanar with the second surface area 225 and/or the fourth surface area 235, for example, forming a planar second major surface 205 extending along the second plane 206*a*.

A central thickness 209 can be defined between the first central surface area 213 and the second central surface area 243, which can be measured as the distance between the third plane 204*b* and the fourth plane 206*b*. In aspects, the central thickness 209 can be about 1 μm or more, about 5 μm or more, about 10 μm or more, about 25 μm or more, about 40 μm or more, about 100 μm or less, about 80 μm or less, about 60 μm or less, or about 50 μm or less. In aspects, the central thickness 209 can be in a range from about 1 μm to about 100 μm, from about 5 μm to about 100 μm, from about 10 μm to about 100 μm, from about 10 μm to about 80 μm, from about 25 μm to about 80 μm, from about 25 μm to about 60 μm, from about 40 μm to about 60 μm, or any range or subrange therebetween. In aspects, the central thickness 209 as a percentage of the substrate thickness 207 can be about 0.5% or more, about 1% or more, about 2% or more, about 5% or more, about 6% or more, about 20% or less, about 13% or less, about 10% or less, or about 8% or less. In aspects, the central thickness 209 as a percentage of the substrate thickness 207 can be in a range from about 0.5% to about 20%, from about 0.5% to about 13%, from about 1% to about 13%, from about 1% to about 10%, from about 2% to about 10%, from about 2% to about 8%, from about 5% to about 8%, from about 6% to about 8%, or any range or subrange therebetween. In aspects, the central region 248 of the central portion 281 can correspond to a region comprising the central thickness 209. By providing the first central surface area 213 of the central portion 281 extending along the third plane 204*b* parallel to the second central surface area 243 of the central portion 281 extending along the fourth plane 206*b*, a uniform central thickness 209 may extend across the central portion 281 that can provide enhanced folding performance at a predetermined thickness for the central thickness 209. A uniform central thickness 209 across the central portion 281 can improve folding performance by preventing stress concentrations that would occur if a portion of the central portion 281 was thinner than the rest of the central portion 281.

In aspects, as shown in FIGS. 2-4, the central portion 281 of the foldable substrate 201 can comprise a first transition region 212 comprising a first transition surface area 215 extending between the first surface area 223 and the first central surface area 213. In further aspects, as shown, a width (e.g., first transition width 214) of the first transition region 212 can be measured as the minimum distance in a direction 106 of the length 105 (see FIG. 1) between a portion of the first central surface area 213 extending along the third plane 204*b* and a portion of the first surface area 223. In even further aspects, the first transition width 214 of the first transition region 212 can be about 0.15 mm or more, about 0.2 mm or more, about 0.3 mm or more, about 0.4 mm or more, about 0.5 mm or more, about 0.6 mm or more, about 0.7 mm or more, about 0.8 mm or more, about 0.9 mm or more, about 2 mm or less, about 1.8 mm or less, about 1.5 mm or less, about 1.2 mm or less, about 1 mm or less, about 0.8 mm or less, about 0.7 mm or less, or about 0.5 mm or less. In even further aspects, the first transition width 214 of the first transition region 212 can be in a range from about 0.15 mm to about 2 mm, from about 0.2 mm to about 2 mm, from about 0.3 mm to about 2 mm, from about 0.4 mm to about 2 mm, about 0.5 mm to about 2 mm, from about 0.5 mm to about 1.8 mm, from about 0.6 mm to about 1.8 mm, from about 0.6 mm to about 1.5 mm, from about 0.7 mm to about 1.5 mm, from about 0.7 mm to about 1.2 mm, from about 0.8 mm to about 1.2 mm, from about 0.8 mm to about 1 mm, from about 0.9 mm to about 1 mm, or any range or subrange therebetween. In even further aspects, the first transition width 214 of the first transition region 212 can be in a range from about 0.5 mm to about 1.8 mm, from about 0.5 mm to about 1.5 mm, from about 0.5 mm to about 1.2 mm, from about 0.5 mm to about 1 mm, from about 0.6 mm to about 1 mm, from about 0.7 mm to about 1 mm, or any range or subrange therebetween. In even further aspects, the first transition width 214 of the first transition region 212 can be in a range from about 0.15 mm to about 1.8 mm, from about 0.15 mm to about 1.5 mm, from about 0.15 mm to about 1.2 mm, from about 0.15 mm to about 1 mm, from about 0.15 mm to about 0.7 mm, from about 0.15 mm to about 0.7 mm, from about 0.2 mm to about 0.5 mm, from about 0.3 mm to about 0.5 mm, from about 0.4 mm to about 0.5 mm, or any range or subrange therebetween. Reducing a width of the first transition region and/or the second transition region can reduce a total chemical strengthening induced stress exerted on the central portion by the corresponding transition regions such that a strain of the first central surface area and/or the second central surface area is less than a critical buckling strain (e.g., onset of mechanical instabilities).

In aspects, as shown in FIGS. 2-3, the first transition region 212 can comprise a second transition surface area 245 extending between the second surface area 225 and the second central surface area 243. In further aspects, a width of the second transition surface area 245 can be measured as the minimum distance in a direction 106 of the length 105 (see FIG. 1) between a portion of the second central surface area 243 extending along the fourth plane 206*b* and a portion of the second surface area 225. In even further aspects, the width of the second transition surface area 245 can be substantially equal to (e.g., equal to) the first transition width 214 of the first transition region 212. In aspects, as shown in FIG. 4, the portion of the first transition region 212 extending between the second surface area 225 and the second central surface area 243 can be coplanar with one or both surface areas.

In aspects, as shown in FIGS. 2-4, a thickness of the first transition region 212 can decrease between the substrate thickness 207 of the first portion 221 and the central thickness 209 of the central portion 281. In further aspects, as shown, a thickness of the first transition region 212 can smoothly decrease, monotonically decrease, and/or smoothly and monotonically decrease between the substrate thickness 207 of the first portion 221 and the central thickness 209 of the central portion 281. As used herein, a thickness decreases smoothly if changes in the cross-sectional area are smooth (e.g., gradual) rather than abrupt (e.g., step) changes in thickness. As used herein, a thickness decreases monotonically in a direction if the thickness decreases for a portion and for the rest of the time either stays the same, decreases, or a combination thereof (i.e., the thickness decreases but never increases in the direction). Providing a smooth shape of the first transition region and/or the second transition region can reduce optical distortions. Providing a monotonically decreasing thickness of the first transition region and/or the second transition region can reduce an incidence of mechanical instabilities and/or decrease a visibility of the transition region.

In aspects, as shown in FIGS. 2-4, the first transition surface area 215 can comprise a linearly inclined surface extending between the first central surface area 213 and the first surface area 223. In aspects, although not shown, the first transition surface area can comprise a concave up shape, for example, with a local slope of the first transition surface area smoothly transitioning to a slope of the first central surface area 213 while a local slope of the first transition surface area is substantially different from a slope of the first surface area 223. In aspects, although not shown, the first transition surface area can comprise a sigmoid shape. In aspects, although not shown, a local slope of the first transition surface area can be greater at a midpoint of the first transition surface area than where the first transition surface area meets the first central surface area 213 and where the first transition surface area meets the first surface area 223. In aspects, although not shown, the first transition surface area can comprise a convex up shape, for example, with a local slope of the first transition surface area smoothly transitioning to a slope of the first surface area 223 while a local slope of the first transition surface area is substantially different from a slope of the first central surface area 213. In aspects, the second transition surface area can comprise one of the shapes or properties discussed above in this paragraph for the first transition surface area. For example, as shown in FIG. 2, the second transition surface area 245 can comprise a linearly inclined surface extending between the second central surface area 243 and the second surface area 225.

In aspects, as shown in FIGS. 2-4, a thickness of the first transition region 212 can decrease at a constant rate (e.g., linearly change) from the substrate thickness 207 to the central thickness 209. In aspects, although not shown, a thickness of the first transition region can decrease slower where the first transition surface area meets the first central surface area 213 than at a midpoint of the first transition region and/or than where the first transition surface area meets the first surface area 223 (e.g., first portion 221). In aspects, although not shown, a thickness of the first transition region can decrease faster where the first transition surface area meets the first central surface area 213 than at a midpoint of the first transition region and/or than where the first transition surface area meets the first surface area 223. Providing a non-uniform slope of a surface area of the first transition region and/or the second transition region can reduce an amount of the corresponding transition region comprising intermediate thicknesses, for example, comprising a chemical strengthening induced expansion strain less than a portion of the corresponding transition region closer to the first central surface area and/or the second central surface area and/or than the first central surface area and/or the second central surface area.

Throughout the disclosure, an average angle of a transition surface area relative to a central surface area is measured as an angle between a transition surface area and a central surface area. An angle is calculated for a location on the corresponding transition surface area relative to the corresponding central surface area with the location of the corresponding central surface area approximated as a plane fitted from measurements at 20 locations evenly spaced over the corresponding central surface area in the direction 106 of the length 105. The angle measured is an external angle for the foldable substrate, meaning that it extends from the plane fitted to the corresponding central surface area to the location on the corresponding transition surface area without passing through the material of the foldable substrate other than an incidental amount at the endpoints. The average angle is calculated from 10 locations on the corresponding transition surface area that are located in a region comprising 80% of a distance that the corresponding central surface area is recessed from the corresponding major surface with the region centered at the midpoint between the corresponding central surface area and the corresponding major surface in the direction 202 of the thickness (e.g., substrate thickness 207, central thickness 209).

In aspects, as shown in FIGS. 2-4, the first transition surface area 215 of the first transition region 212 extends between the first surface area 223 and the first central surface area 213 with a first average angle 282 relative to the first central surface area 213. As described above, the first average angle 282 is an external angle because it does not pass through the material of the foldable substrate 201 other than an incidental amount at the endpoints. In further aspects, the first average angle 282 can be about 167° or more, about 170° or more, about 171° or more, about 172° or more, about 179° or less, about 176° or less, about 175° or less, about 174° or less, or about 173° or less. In further aspects, the first average angle 282 can be in a range from about 167° to about 179°, from about 167° to about 176°, from about 170° to about 176°, from about 170° to about 175°, from about 171° to about 175°, from about 171° to about 174°, from about 172° to about 174°, from about 172° to about 173°, or any range or subrange therebetween. For example, a first transition surface comprising a linear (e.g., planar) surface area with a first transition width of 500 μm and height (i.e., a difference between the first central surface area 213 and the first major surface 203 corresponding to the first distance 219) of 30 μm corresponds to a first average angle of about 176.6°.

In aspects, as shown in FIGS. 2-4, the third transition surface area 217 of the second transition region 218 extends between the third surface area 233 and the first central surface area 213 with a third average angle 286 relative to the first central surface area 213. In further aspects, the third average angle 286 can be within one or more of the ranges discussed above for the first average angle 282. In further aspects, the first average angle 282 can be substantially equal to the third average angle 286.

In aspects, as shown in FIGS. 2-4, the central portion 281 of the foldable substrate 201 can comprise a second transition region 218 comprising a third transition surface area 217 extending between the third surface area 233 and the first central surface area 213. In further aspects, as shown, a width (e.g., second transition width 216) of the second transition region 218 can be measured as the minimum distance in a direction 106 of the length 105 (see FIG. 1) between a portion of the first central surface area 213 extending along the third plane 204*b* and a portion of the third surface area 233. In even further aspects, the second transition width 216 of the second transition region 218 can be within one or more of the ranges discussed above for the first transition width 214. In still further aspects, the second transition width 216 of the second transition region 218 can be substantially equal to (e.g., equal to) the first transition width 214.

In aspects, as shown in FIGS. 2-3, the second transition region 218 can comprise a fourth transition surface area 247 extending between the fourth surface area 235 and the second central surface area 243. In further aspects, a width of the fourth transition surface area 247 can be measured as the minimum distance in a direction 106 of the length 105 (see FIG. 1) between a portion of the second central surface area 243 extending along the fourth plane 206*b* and a portion of the fourth surface area 235. In even further aspects, the width of the fourth transition surface area 247 can be substantially equal to (e.g., equal to) the second transition width 216. In aspects, as shown in FIGS. 2-3, a thickness of the second transition region 218 can decrease between the substrate thickness 207 of the second portion 231 and the central thickness 209 of the central portion 281. In further aspects, as shown, a thickness of the first transition region 212 can smoothly decrease, monotonically decrease, or smoothly and monotonically decrease between the substrate thickness 207 of the second portion 231 and the central thickness 209 of the central portion 281. In aspects, as shown in FIG. 4, the portion of the second transition region 218 extending between the fourth surface area 235 and the second central surface area 243 can be coplanar with one or both surface areas.

In aspects, as shown in FIGS. 2-4, the third transition surface area 217 can comprise a linearly inclined surface extending between the first central surface area 213 and the third surface area 233. In aspects, the third transition surface area 217 and/or the fourth transition surface area 247 can comprise one of the shapes or properties discussed above with reference to the first transition surface area. In aspects, the fourth transition surface area 247 can comprise one of the shapes or properties discussed above in this paragraph for the first transition surface area. For example, as shown in FIGS. 2-4, the fourth transition surface area 247 can comprise a linearly inclined surface extending between the second central surface area 243 and the fourth surface area 235. In aspects, as shown in FIGS. 2-4, a thickness of the second transition region 218 can decrease at a constant rate (e.g., linearly change) from the substrate thickness 207 to the central thickness 209. In aspects, although not shown, a thickness of the second transition region can decrease slower where the third transition surface area meets the first central surface area 213 than at a midpoint of the second transition region and/or than where the third transition surface area meets the third surface area 233 (e.g., first portion 221). In aspects, although not shown, a thickness of the second transition region can decrease faster where the third transition surface area meets the first central surface area 213 than at a midpoint of the second transition region and/or than where the third transition surface area meets the third surface area 233.

In aspects, as shown in FIGS. 2-3, the second transition surface area 245 of the first transition region 212 extends between the second surface area 225 and the second central surface area 243 with a second average angle 284 relative to the second central surface area 243. In further aspects, the second average angle 284 can be about 167° or more, about 170° or more, about 171° or more, about 172° or more, about 179° or less, about 176° or less, about 175° or less, about 174° or less, or about 173° or less. In further aspects, the second average angle 284 can be in a range from about 167° to about 179°, from about 167° to about 176°, from about 170° to about 176°, from about 170° to about 175°, from about 171° to about 175°, from about 171° to about 174°, from about 172° to about 174°, from about 172° to about 173°, or any range or subrange therebetween. In further aspects, the first average angle 282 can be substantially equal to the second average angle 284. Providing an average angle within one of the above-mentioned ranges can provide reduced visibility of the transition region.

In aspects, as shown in FIGS. 2-3, the fourth transition surface area 247 of the second transition region 218 extends between the fourth surface area 235 and the second central surface area 243 with a fourth average angle 288 relative to the second central surface area 243. In further aspects, the fourth average angle 288 can be within one or more of the ranges discussed above for the second average angle 284. In further aspects, the second average angle 284 can be substantially equal to the fourth average angle 288. In further aspects, the first average angle 282 and/or the third average angle 286 can be substantially equal to the fourth average angle 288.

As used herein, if a first layer and/or component is described as "disposed over" a second layer and/or component, other layers may or may not be present between the first layer and/or component and the second layer and/or component. Furthermore, as used herein, "disposed over" does not refer to a relative position with reference to gravity. For example, a first layer and/or component can be considered "disposed over" a second layer and/or component, for example, when the first layer and/or component is positioned underneath, above, or to one side of a second layer and/or component. As used herein, a first layer and/or component described as "bonded to" a second layer and/or component means that the layers and/or components are bonded to each other, either by direct contact and/or bonding between the two layers and/or components or via an adhesive layer. As used herein, a first layer and/or component described as "contacting" or "in contact with" a second layer and/or components refers to direct contact and includes the situations where the layers and/or components are bonded to each other.

As shown in FIGS. 2 and 4, the foldable apparatus 101 can comprise an adhesive layer 261. As shown, the adhesive layer 261 can comprise a first contact surface 263 and a second contact surface 265 that can be opposite the first contact surface 263. In aspects, as shown in FIGS. 2 and 4, the second contact surface 265 of the adhesive layer 261 can comprise a planar surface. In aspects, as shown in FIGS. 2 and 4, the first contact surface 263 of the adhesive layer 261 can comprise a planar surface. An adhesive thickness 267 of the adhesive layer 261 can be defined as a minimum distance between the first contact surface 263 and the second contact surface 265. In aspects, the adhesive thickness 267 of the adhesive layer 261 can be about 1 μm or more, about 5 μm or more, about 10 μm or more, about 100 μm or less, about 60 μm or less, about 30 μm or less, or about 20 μm or less. In aspects, the adhesive thickness 267 of the adhesive layer 261 can be in a range from about 1 μm to about 100 μm, from about 5 μm to about 100 μm, from about 5 μm to about 60 μm, from about 5 μm to about 30 μm, from about 10 μm to about 30 μm, from about 10 μm to about 20 μm, or any range or subrange therebetween.

In aspects, as shown in FIGS. 2 and 4, the second contact surface 265 of the adhesive layer 261 can face and/or contact the first major surface 273 of a release liner 271 (described below). In aspects, as shown in FIG. 2, the first contact surface 263 of the adhesive layer 261 can face and/or contact the second surface area 225 of the first portion 221. In aspects, as shown in FIG. 2, the first contact surface 263 of the adhesive layer 261 can face and/or contact the fourth surface area 235 of the second portion 231. In aspects, as shown in FIG. 2, the first contact surface 263 of the adhesive layer 261 can face the second central surface area 243 of the central portion 281. In aspects, as shown in FIG. 4, the first contact surface 263 of the adhesive layer 261 can face and/or contact the first surface area 223 of the first portion 221. In aspects, as shown in FIG. 4, the first contact surface 263 of the adhesive layer 261 can face and/or contact the third surface area 233 of the second portion 231. In aspects, as shown in FIG. 4, the first contact surface 263 of the adhesive layer 261 can face the first central surface area 213 of the central portion 281. In aspects, as shown in FIG. 2, the first contact surface 263 of the adhesive layer 261 can face the second central surface area 243 of the central portion 281. In further aspects, although not shown, the first contact surface 263 of the adhesive layer 261 can contact the second central surface area 243 of the central portion 281, for example by filling the region (e.g., second recess 241) indicated as occupied by the second polymer-based portion 299 in FIG. 2. In aspects, although not shown, the second recess may not be totally filled, for example, to leave room for electronic devices and/or mechanical devices. In aspects, although not shown, the foldable substrate 201 of FIG. 4 can be configured with the adhesive layer 261 contacting the second major surface 205 rather than the first major surface 203 while the polymer-based portion 299 or a coating 251 in place of the polymer-based portion 299 can be positioned at least partially in the recess 211.

In aspects, the adhesive layer 261 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of polyolefins include low molecular weight polyethylene (LDPE), high molecular weight polyethylene (HDPE), ultrahigh molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene). In further aspects, the adhesive layer 261 can comprise an optically clear adhesive. In even further aspects, the optically clear adhesive can comprise one or more optically transparent polymers: an acrylic (e.g., polymethylmethacrylate (PMMA)), an epoxy, silicone, and/or a polyurethane. Examples of epoxies include bisphenol-based epoxy resins, novolac-based epoxies, cycloaliphatic-based epoxies, and glycidylamine-based epoxies. In even further aspects, the optically clear adhesive can comprise, but is not limited to, acrylic adhesives, for example, 3M 8212 adhesive, or an optically transparent liquid adhesive, for example, a LOCTITE optically transparent liquid adhesive. Exemplary aspects of optically clear adhesives comprise transparent acrylics, epoxies, silicones, and polyurethanes. For example, the optically transparent liquid adhesive could comprise one or more of LOCTITE AD 8650, LOCTITE AA 3922, LOCTITE EA E-05MR, LOCTITE UK U-09LV, which are all available from Henkel.

In aspects, the adhesive layer 261 can comprise an elastic modulus of about 0.001 MegaPascals (MPa) or more, about 0.01 MPa or more, about 0.1 MPa or more, about 1 MPa or less, about 0.5 MPa or less, about 0.1 MPa or less, or about 0.05 MPa or less. In aspects, the adhesive layer 261 can comprise an elastic modulus in a range from about 0.001 MPa to about 1 MPa, from about 0.01 MPa to about 1 MPa, from about 0.01 MPa to about 0.5 MPa, from about 0.05 MPa to about 0.5 MPa, from about 0.1 MPa to about 0.5 MPa, from about 0.001 MPa to about 0.5 MPa, from about 0.001 MPa to about 0.01 MPa, or any range or subrange therebetween. In aspects, the adhesive layer can comprise an elastic modulus within one or more of the ranges discussed below for the elastic modulus of the polymer-based portions 289 and/or 299.

As shown in FIGS. 2 and 4, the polymer-based portion 289 and/or 299 of the foldable apparatus 101 can be positioned between the first portion 221 and the second portion 231. In aspects, as shown, the polymer-based portion can comprise a first polymer-based portion 289 at least partially positioned in and/or filling the first recess 211. In aspects, as shown in FIG. 2, the polymer-based portion can comprise a second polymer-based portion 299 at least partially positioned in and/or filling the second recess 241. In aspects, as shown in FIG. 4, the polymer-based portion can comprise a second polymer-based portion 299 at least partially positioned in and/or filling the first recess 211. In aspects, although not shown, the second recess may not be totally filled, for example, to leave room for electronic devices and/or mechanical devices.

As shown in FIG. 2, the first polymer-based portion 289 can comprise a fourth contact surface 285 opposite the third contact surface 283. In aspects, as shown, the third contact surface 283 can comprise a planar surface, for example, substantially coplanar (e.g., extend along a common plane, first plane 204*a*) with the first surface area 223 and the third surface area 233. In aspects, as shown in FIG. 2, the fourth major surface 255 of the coating 251 can face and/or contact the third contact surface 283 of the polymer-based portion 289. In aspects, the fourth contact surface 285 can comprise a planar surface, for example, substantially coplanar (e.g., extend along a common plane, third plane 204*b*) with the first central surface area 213. In further aspects, the fourth contact surface 285 can contact the first central surface area 213, the first transition surface area 215, and/or the third transition surface area 217.

As shown in FIGS. 2 and 4, the second polymer-based portion 299 can comprise a fourth contact surface 295 opposite the third contact surface 293. In further aspects, as shown in FIG. 2, the third contact surface 293 can contact the second central surface area 243, the second transition surface area 245, and/or the fourth transition surface area 247. In aspects, as shown in FIG. 2, the third contact surface 293 can comprise a planar surface, for example, being substantially coplanar (e.g., extend along a common plane with the fourth plane 206*b*) with the second central surface area 243. In aspects, as shown in FIG. 2, the fourth contact surface 295 can comprise a planar surface, for example, being substantially coplanar (e.g., extend along a common plane with the second plane 206*a*) with the second surface area 225 and the fourth surface area 235.

In aspects, as shown in FIG. 4, the third contact surface 293 can contact the first central surface area 213, the first transition surface area 215, and/or the third transition surface area 217. In aspects, as shown in FIG. 4, the third contact surface 293 can comprise a planar surface, for example, being substantially coplanar (e.g., extend along a common plane with the third plane 204*b*) with the first central surface area 213. In aspects, as shown, the third contact surface 293 can comprise a planar surface, for example, substantially coplanar (e.g., extend along a common plane with the third plane 204*b*) with the first central surface area 213. In aspects, as shown in FIG. 4, the fourth contact surface 295 can be coplanar (e.g., extend along a common plane with the first plane 204*a*) with the first surface area 223 and the third surface area 233. In aspects, as shown in FIGS. 2 and 4, the first contact surface 263 of the adhesive layer 261 can face and/or contact the fourth contact surface 295 of the polymer-based portion 299.

In aspects, the polymer-based portion 289 and/or 299 comprises a polymer (e.g., optically transparent polymer). In further aspects, the polymer-based portion 289 and/or 299 can comprise one or more of an optically transparent: an acrylic (e.g., polymethylmethacrylate (PMMA)), an epoxy, a silicone, and/or a polyurethane. Examples of epoxies include bisphenol-based epoxy resins, novolac-based epoxies, cycloaliphatic-based epoxies, and glycidylamine-based epoxies. In further aspects, the polymer-based portion 289 and/or 299 comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of polyolefins include low molecular weight polyethylene (LDPE), high molecular weight polyethylene (HDPE), ultra-high molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene), for example, comprising one or more of polystyrene, polydichlorophosphazene, and poly(5-ethylidene-2-norbornene). In aspects, the polymer-based portion can comprise a sol-gel material. Example aspects of polyurethanes comprise thermoset polyurethanes, for example, Dispurez 102 available from Incorez and thermoplastic polyurethanes, for example, KrystalFlex PE505 available from Huntsman. In even further aspects, the second portion can comprise an ethylene acid copolymer. An exemplary aspect of an ethylene acid copolymer includes SURLYN available from Dow (e.g., Surlyn PC-2000, Surlyn 8940, Surlyn 8150). An additional exemplary aspect for the second portion comprises Eleglass w802-GL044 available from Axalta with from 1 wt % to 2 wt % cross-linker. In aspects, the polymer-based portion 289 and/or 299 can further comprise nanoparticles, for example, carbon black, carbon nanotubes, silica nanoparticles, or nanoparticles comprising a polymer. In aspects, the polymer-based portion can further comprise fibers to form a polymer-fiber composite.

In aspects, the polymer-based portion 289 and/or 299 can comprise a coefficient of thermal expansion (CTE). As used herein, a coefficient of thermal expansion is measured in accordance with ASTM E289-17 using a Picoscale Michelson Interferometer between −20° C. and 40° C. In aspects, the polymer-based portion 289 and/or 299 can comprise particles of one or more of copper oxide, beta-quartz, a tungstate, a vanadate, a pyrophosphate, and/or a nickel-titanium alloy. In aspects, the polymer-based portion 289 and/or 299 can comprise a CTE of about $-20\times10^{-7}$ 1/° C. or more, about $-10\times10^{-7}$ 1/° C. or more, about $-5\times10^{-7}$ 1/° C. or more, about $-2\times10^{-7}$ 1/° C. or more, about $10\times10^{-7}$ 1/° C. or less, about $5\times10^{-7}$ 1/° C. or less, about $2\times10^{-7}$ 1/° C. or less, about $1\times10^{-7}$ 1/° C. or less, or 0.1/° C. or less. In aspects, the polymer-based portion 289 and/or 299 can comprise a CTE in a range from about $-20\times10^{-7}$ 1/° C. to about $10\times10^{-7}$ 1/° C., from about $-20\times10^{-7}$ 1/° C. to about $5\times10^{-7}$ 1/° C., from about $-10\times10^{-7}$ 1/° C. to about $-5\times10^{-7}$ 1/° C., from about $-10\times10^{-7}$ 1/° C. to about $2\times10^{-7}$ 1/° C., from about $-10\times10^{-7}$ 1/° C. to 0.1/° C., from about $-5\times10^{-7}$ 1/° C. to 0.1/° C., from about $-2\times10^{-7}$ 1/° C. to about 0.1/° C., or any range or subrange therebetween. By providing a polymer-based portion comprising a low (e.g., negative) coefficient of thermal expansion, warp caused by volume changes during curing of the polymer-based portion can be mitigated.

In aspects, the polymer-based portion 289 and/or 299 can comprise an elastic modulus of about 0.001 MegaPascals (MPa) or more, about 0.001 MP or more, about 1 MPa or more, about 10 MPa or more, about 20 MPa or more, about 100 MPa or more, about 200 MPa or more, about 1,000 MPa or more, about 5,000 MPa or less, about 3,000 MPa or less, about 1,000 MPa or less, about 500 MPa or less, or about 200 MPa or less. In aspects, the polymer-based portion 289 and/or 299 can comprise an elastic modulus in a range from about 0.001 MPa to about 5,000 MPa, from about 0.01 MPa to about 3,000 MPa, from about 0.01 MPa to about 1,000 MPa, from about 0.01 MPa to about 500 MPa, from about 0.01 MPa to about 200 MPa, from about 1 MPa to about 200 MPa, from about 10 MPa to about 200 MPa, from about 100 MPa to about 200 MPa, or any range or subrange therebetween. In aspects, the polymer-based portion 289 and/or 299 can comprise an elastic modulus in a range from about 1 MPa to about 5,000 MPa, from about 10 MPa to about 5,000 MPa, from about 10 MPa to about 1,000 MPa, from about 20 MPa to about 1,000 MPa, from about 20 MPa to about 200 MPa, or any range or subrange therebetween. In aspects, the elastic modulus of the polymer-based portion 289 and/or 299 can be in a range from about 1 GPa to about 20 GPa, from about 1 GPa to about 18 GPa, from about 1 GPa to about 10 GPa, from about 1 GPa to about 5 GPa, from about 1 GPa to about 3 GPa, or any range or subrange therebetween. By providing a polymer-based portion 289 and/or 299 with an elastic modulus in a range from about 0.001 MPa to about 5,000 MPa (e.g., in a range from about 10 MPa to about 3 GPa), folding of the foldable apparatus without failure can be facilitated. In aspects, the adhesive layer 261 comprises an elastic modulus greater than the elastic modulus of the polymer-based portion 289 and/or 299, which arrangement provides improved performance in puncture resistance. In aspects, the elastic modulus of the polymer-based portion 289 and/or 299 can be less than the elastic modulus of the foldable substrate 201. In aspects, the adhesive layer 261 may comprise an elastic modulus within the ranges listed above in this paragraph. In further aspects, the adhesive layer 261 may comprise substantially the same elastic modulus as the elastic modulus of the polymer-based portion 289 and/or 299. In further aspects, the elastic modulus of the adhesive layer 261 can be in a range from about 1 GPa to about 20 GPa, from about 1 GPa to about 18 GPa, from about 1 GPa to about 10 GPa, from about 1 GPa to about 5 GPa, from about 1 GPa to about 3 GPa, or any range or subrange therebetween. In aspects, the elastic modulus of the polymer-based portion 289 and/or 299 can be less than the elastic modulus of the foldable substrate 201.

In aspects, as shown in FIG. 2, a coating 251 can be disposed over the first major surface 203 of the foldable substrate 201. In further aspects, the coating 251 can be disposed over the first portion 221, the second portion 231, and the central portion 281. In aspects, the coating 251 can comprise a third major surface 253 and a fourth major surface 255 opposite the third major surface 253. In further aspects, the coating 251 (e.g., fourth major surface 255) can contact the foldable substrate 201 (e.g., first major surface 203). In further aspects, at least a part of the coating 251 can be positioned in the first recess 211. In even further aspects, the coating 251 can fill the first recess 211. In further aspects, the coating 251 can comprise a coating thickness 257 defined between the third major surface 253 and the fourth major surface 255. In further aspects, the coating thickness 257 can be about 0.1 μm or more, about 1 μm or more, about 5 μm or more, about 10 μm or more, about 15 μm or more, about 20 μm or more, about 25 μm or more, about 40 μm or more, about 50 μm or more, about 60 μm or more, about 70 μm or more, about 80 μm or more, about 90 μm or more, about 200 μm or less, about 100 μm or less, or about 50 μm or less, about 30 μm or less, about 25 μm or less, about 20 μm or less, about 20 μm or less, about 15 μm or less, or about 10 μm or less. In aspects, the coating thickness 257 can be in a range from about 0.1 μm to about 200 μm, from about 1 μm to about 200 μm, from about 10 μm to about 200 μm, from about 50 μm to about 200 μm, from about 0.1 μm to about 100 μm, from about 1 μm to about 100 μm, from about 10 μm to about 100 μm, from about 20 μm to about 100 μm, from about 30 μm to about 100 μm, from about 40 μm to about 100 μm, from about 50 μm to about 100 μm, from about 60 μm to about 100 μm, from about 70 μm to about 100 μm, from about 80 μm to about 100 μm, from about 90 μm to about 100 μm, from about 0.1 μm to about 50 μm, from about 1 μm to about 50 μm, from about 10 μm to about 50 μm, or any range or subrange therebetween. In further aspects, the coating thickness 257 can be in a range from about 0.1 μm to about 50 μm, from about 0.1 μm to about 30 μm, from about 0.1 μm to about 25 μm, from about 0.1 μm to about 20 μm, from about 0.1 μm to about 15 μm, from about 0.1 μm to about 10 μm, from about 1 μm to about 30 μm, from about 1 μm to about 25 μm, from about 1 μm to about 20 μm, from about 1 μm to about 15 μm, from about 1 μm to about 10 μm, from about 5 μm to about 30 μm, from about 5 μm to about 25 μm, from about 5 μm to about 20 μm, from about 5 μm to about 15 μm, from about 5 μm to about 10 μm, from about 10 μm to about 30 μm, from about 10 μm to about 25 μm, from about 10 μm to about 20 μm, from about 10 μm to about 15 μm, from about 15 μm to about 30 μm, from about 15 μm to about 25 μm, from about 15 μm to about 20 μm, from about 20 μm to about 30 μm, from about 20 μm to about 25 μm, or any range or subrange therebetween.

In aspects, the coating 251 can comprise a polymeric hard coating. In further aspects, the polymeric hard coating can comprise one or more of an ethylene-acid copolymer, a polyurethane-based polymer, an acrylate resin, and a mercapto-ester resin. Example aspects of ethylene-acid copolymers include ethylene-acrylic acid copolymers, ethylene-methacrylic acid copolymers, and ethylene-acrylic-methacrylic acid terpolymers (e.g., Nucrel, manufactured by DuPont), ionomers of ethylene acid copolymers (e.g., Surlyn, manufactured by DuPont), and ethylene-acrylic acid copolymer amine dispersions (e.g., Aquacer, manufactured by BYK). Example aspects of polyurethane-based polymers include aqueous modified polyurethane dispersions (e.g., Eleglas®, manufactured by Axalta). Example aspects of acrylate resins that can be UV curable include acrylate resins (e.g., Uvekol® resin, manufactured by Allinex), cyanoacrylate adhesives (e.g., Permabond® UV620, manufactured by Krayden), and UV radical acrylic resins (e.g., Ultrabond windshield repair resin, for example, Ultrabond (45CPS)). Example aspects of mercapto-ester resins include mercapto-ester triallyl isocyanurates (e.g., Norland optical adhesive NOA 61). In further aspects, the polymeric hard coating can comprise ethylene-acrylic acid copolymers and ethylene-methacrylic acid copolymers, which may be ionomerized to form ionomer resins through neutralization of the carboxylic acid residue with typically alkali-metal ions, for example, sodium and potassium, and also zinc. Such ethylene-acrylic acid and ethylene-methacrylic acid ionomers may be dispersed in water and coated onto the substrate to form an ionomer coating. Alternatively, such acid copolymers may be neutralized with ammonia which, after coating and drying liberates the ammonia to reform the acid copolymer as the coating. By providing a coating comprising a polymeric coating, the foldable apparatus can comprise low energy fracture.

In aspects, the coating can comprise a polymeric hard coating comprising an optically transparent polymeric hard-coat layer. Suitable materials for an optically transparent polymeric hard-coat layer include but are not limited to a cured acrylate resin material, an inorganic-organic hybrid polymeric material, an aliphatic or aromatic hexafunctional urethane acrylate, a siloxane-based hybrid material, and a nanocomposite material, for example, an epoxy and urethane material with nanosilicate. In aspects, an optically transparent polymeric hard-coat layer may consist essentially of one or more of these materials. In aspects, an optically transparent polymeric hard-coat layer may consist of one or more of these materials. As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. More specifically, suitable materials for an optically transparent polymeric (OTP) hard-coat layer include, but are not limited to, a polyimide, a polyethylene terephthalate (PET), a polycarbonate (PC), a poly methyl methacrylate (PMMA), organic polymer materials, inorganic-organic hybrid polymeric materials, and aliphatic or aromatic hexafunctional urethane acrylates. In aspects, an OTP hard-coat layer may consist essentially of an organic polymer material, an inorganic-organic hybrid polymeric material, or aliphatic or aromatic hexafunctional urethane acrylate. In aspects, an OTP hard-coat layer may consist of a polyimide, an organic polymer material, an inorganic-organic hybrid polymeric material, or aliphatic or aromatic hexafunctional urethane acrylate. In aspects, an OTP hard-coat layer may include a nanocomposite material. In aspects, an OTP hard-coat layer may include a nano-silicate at least one of epoxy and urethane materials. Suitable compositions for such an OTP hard-coat layer are described in U.S. Pat. Pub. No. 2015/0110990, which is hereby incorporated by reference in its entirety by reference thereto. As used herein, "organic polymer material" means a polymeric material comprising monomers with only organic components. In aspects, an OTP hard-coat layer may comprise an organic polymer material manufactured by Gunze Limited and having a hardness of 9H, for example Gunze's "Highly Durable Transparent Film." As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. In aspects, the inorganic-organic hybrid polymeric material may include polymerized monomers comprising an inorganic silicon-based group, for example, a silsesquioxane polymer. A silsesquioxane polymer may be, for example, an alkyl-silsesquioxane, an aryl-silsesquioxane, or an aryl alkyl-silsesquioxane having the following chemical structure: $(RSiO_{1.5})_n$, where R is an organic group for example, but not limited to, methyl or phenyl. In aspects, an OTP hard-coat layer may comprise a silsesquioxane polymer combined with an organic matrix, for example, SILPLUS manufactured by Nippon Steel Chemical Co., Ltd. In aspects, an OTP hard-coat layer may comprise 90 wt % to 95 wt % aromatic hexafunctional urethane acrylate (e.g., PU662NT (Aromatic hexafunctional urethane acrylate) manufactured by Miwon Specialty Chemical Co.) and 10 wt % to 5 wt % photo-initiator (e.g., Darocur 1173 manufactured by Ciba Specialty Chemicals Corporation) with a hardness of 8H or more. In aspects, an OTP hard-coat layer composed of an aliphatic or aromatic hexafunctional urethane acrylate may be formed as a stand-alone layer by spin-coating the layer on a polyethylene terephthalate (PET) substrate, curing the urethane acrylate, and removing the urethane acrylate layer from the PET substrate. In aspects, an OTP hard-coat layer may be an aliphatic or aromatic hexafunctional urethane acrylate material layer having a thickness within one or more of the thickness ranges discussed above for the coating thickness 257.

In aspects, the coating 251, if provided, may also comprise one or more of an easy-to-clean coating, a low-friction coating, an oleophobic coating, a diamond-like coating, a scratch-resistant coating, or an abrasion-resistant coating. A scratch-resistant coating may comprise an oxynitride, for example, aluminum oxynitride or silicon oxynitride with a thickness of about 500 micrometers or more. In such aspects, the abrasion-resistant layer may comprise the same material as the scratch-resistant layer. In aspects, a low friction coating may comprise a highly fluorinated silane coupling agent, for example, an alkyl fluorosilane with oxymethyl groups pendant on the silicon atom. In such aspects, an easy-to-clean coating may comprise the same material as the low friction coating. In other aspects, the easy-to-clean coating may comprise a protonatable group, for example an amine, for example, an alkyl aminosilane with oxymethyl groups pendant on the silicon atom. In such aspects, the oleophobic coating may comprise the same material as the easy-to-clean coating. In aspects, a diamond-like coating comprises carbon and may be created by applying a high voltage potential in the presence of a hydrocarbon plasma.

Providing a first recess opposite a second recess can reduce a bend-induced strain of a material positioned in the first recess and/or second recess compared to a single recess with a surface recessed by the sum of the first distance and the second distance. Providing a reduced bend-induced strain of a material positioned in the first recess and/or the second recess can enable the use of a wider range of materials because of the reduced strain requirements for the material. For example, stiffer and/or more rigid materials (e.g., coating 251, first polymer-based portion 289) can be positioned in the first recess, which can improve impact resistance, puncture resistance, abrasion resistance, and/or scratch resistance of the foldable apparatus. Additionally, controlling properties of a first material (e.g., coating 251, first polymer-based portion 289) positioned in a first recess and a second material positioned in a second recess can control the position of a neutral axis of the foldable apparatus and/or foldable substrates, which can reduce (e.g., mitigate, eliminate) the incidence of mechanical instabilities, apparatus fatigue, and/or apparatus failure. Providing a first recess opposite a second recess can reduce the strain encountered by the polymer-based portion or other material (e.g., adhesive layer) in the recess (e.g., from 0% to 50% reduction). Consequently, requirements for a strain at yield of the polymer-based portion can be relaxed. In aspects, a strain at yield of the polymer-based portion and/or adhesive layer can be about 3% or more, about 4% or more, about 5% or more, about 6% or more, about 7% or more, about 500% or less, about 100% or less, about 50% or less, about 20% or less, about 15% or less, about 10% or less, about 9% or less, or about 8% or less. In aspects, the strain at yield of the polymer-based portion and/or adhesive layer can be in a range from about 1% to about 500%, from about 1% to about 100%, from about 2% to about 100%, from about 2% to about 50%, from about 3% to about 50%, from about 3% to about 20%, from about 4% to about 20%, from about 4% to about 15%, from about 5% to about 15%, from about 5% to about 10%, from about 5% to about 9%, from about 6% to about 9%, from about 6% to about 8%, from about 7% to about 8% or any range or subrange therebetween.

In aspects, as shown in FIGS. 2 and 4, the foldable apparatus 101 can comprise the release liner 271 although other substrates (e.g., glass-based substrate and/or ceramic-based substrate discussed throughout the application) may be used in further aspects rather than the illustrated release liner 271. In further aspects, as shown, the release liner 271, or another substrate, can be disposed over the adhesive layer 261. In even further aspects, as shown, the release liner 271, or another substrate, can directly contact the second contact surface 265 of the adhesive layer 261. The release liner 271, or another substrate, can comprise a first major surface 273 and a second major surface 275 opposite the first major surface 273. As shown, the release liner 271, or another substrate, can be disposed on the adhesive layer 261 by attaching the second contact surface 265 of the adhesive layer 261 to the first major surface 273 of the release liner 271, or another substrate. In aspects, as shown, the first major surface 273 of the release liner 271, or another substrate, can comprise a planar surface. In aspects, as shown, the second major surface 275 of the release liner 271, or another substrate, can comprise a planar surface. A substrate comprising the release liner 271 can comprise a paper and/or a polymer. Exemplary aspects of paper comprise kraft paper, machine-finished paper, poly-coated paper (e.g., polymer-coated, glassine paper, siliconized paper), or clay-coated paper. Exemplary aspects of polymers comprise polyesters (e.g., polyethylene terephthalate (PET)) and polyolefins (e.g., low-density polyethylene (LDPE), high-density polyethylene (HDPE), polypropylene (PP)).

Aspects of the disclosure can comprise a consumer electronic product. The consumer electronic product can comprise a front surface, a back surface, and side surfaces. The consumer electronic product can further comprise electrical components at least partially within the housing. The electrical components can comprise a controller, a memory, and a display. The display can be at or adjacent to the front surface of the housing. The display can comprise liquid crystal display (LCD), an electrophoretic displays (EPD), an organic light-emitting diode (OLED) display, or a plasma display panel (PDP). The consumer electronic product can comprise a cover substrate disposed over the display. In aspects, at least one of a portion of the housing or the cover substrate comprises the foldable apparatus discussed throughout the disclosure. The consumer electronic product can comprise a portable electronic device, for example, a smartphone, a tablet, a wearable device, or a laptop.

Figure 8:
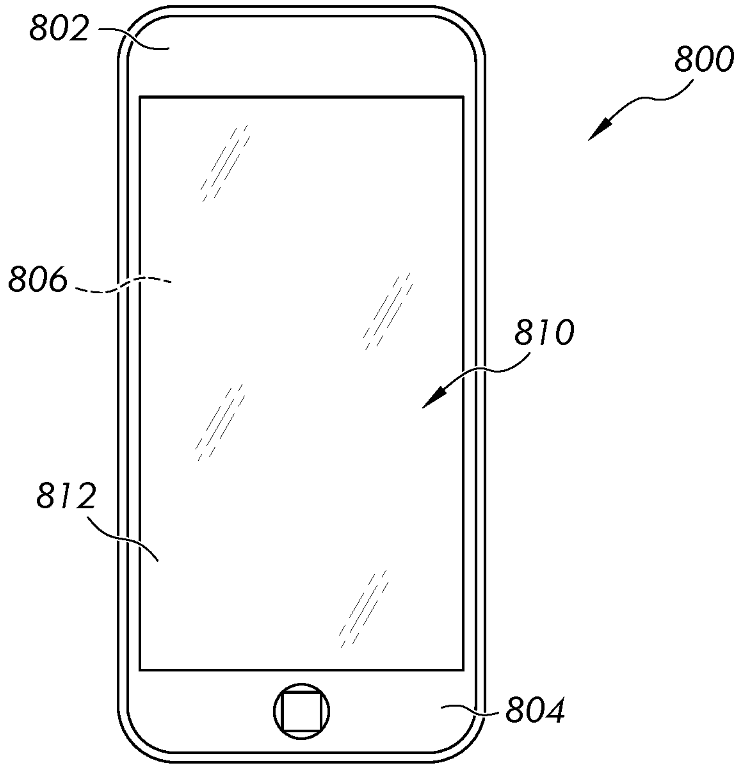
FIG. 8 is a schematic plan view of an example consumer electronic device according to aspects.
Figure 9:
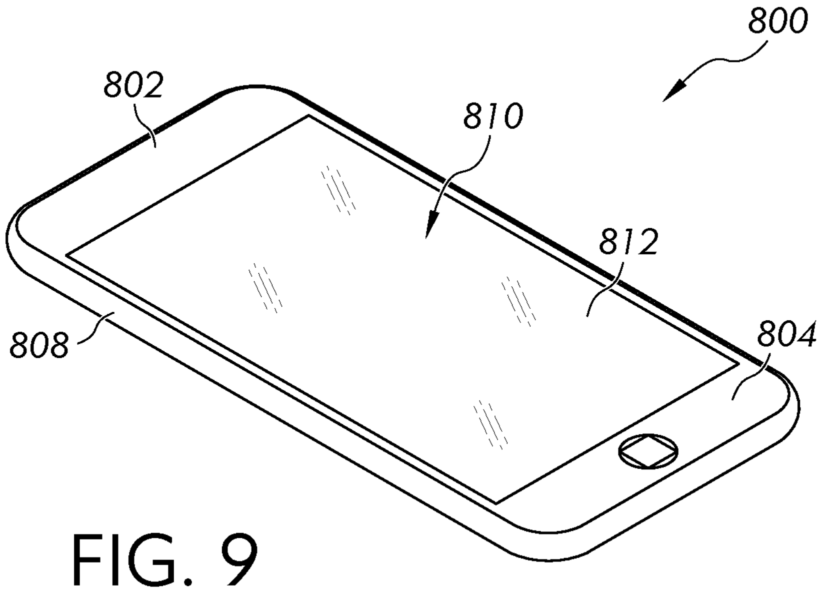
FIG. 9 is a schematic perspective view of the example consumer electronic device of FIG. 8.

The foldable apparatus disclosed herein may be incorporated into another article, for example, an article with a display (or display articles) (e.g., consumer electronics, including mobile phones, tablets, computers, navigation systems, wearable devices (e.g., watches), and the like), architectural articles, transportation articles (e.g., automotive, trains, aircraft, sea craft, etc.), appliance articles, or any article that may benefit from some transparency, scratch-resistance, abrasion resistance or a combination thereof. An exemplary article incorporating any of the foldable apparatus disclosed herein is shown in FIGS. 8-9. Specifically, FIGS. 8-9 show a consumer electronic device 800 including a housing 802 having front 804, back 806, and side surfaces 808. Although not shown, the consumer electronic device can comprise electrical components that are at least partially inside or entirely within the housing. For example, electrical components include at least a controller, a memory, and a display. As shown in FIGS. 8-9, the display 810 can be at or adjacent to the front surface of the housing 802. The consumer electronic device can comprise a cover substrate 812 at or over the front surface of the housing 802 such that it is over the display 810. In aspects, at least one of the cover substrate 812 or a portion of housing 802 may include any of the foldable apparatus disclosed herein, for example, the foldable substrate.

In aspects, the foldable substrate 201 can comprise a glass-based substrate and/or a ceramic-based substrate, and the first portion 221, the second portion 231, and/or the central portion 281 can comprise one or more compressive stress regions. In aspects, a compressive stress region may be created by chemically strengthening. Chemically strengthening may comprise an ion exchange process, where ions in a surface layer are replaced by—or exchanged with—larger ions having the same valence or oxidation state. Methods of chemically strengthening will be discussed later. Without wishing to be bound by theory, chemically strengthening the first portion 221, the second portion 231, and/or the central portion 281 can enable good impact and/or puncture resistance (e.g., resists failure for a pen drop height of about 15 centimeters (cm) or more, about 20 cm or more, about 50 cm or more). Without wishing to be bound by theory, chemically strengthening the first portion 221, the second portion 231, and/or the central portion 281 can enable small (e.g., smaller than about 10 mm or less) bend radii because the compressive stress from the chemical strengthening can counteract the bend-induced tensile stress on the outermost surface of the substrate. A compressive stress region may extend into a portion of the first portion and/or the second portion for a depth called the depth of compression. As used herein, depth of compression means the depth at which the stress in the chemically strengthened substrates and/or portions described herein changes from compressive stress to tensile stress. Depth of compression may be measured by a surface stress meter or a scattered light polariscope (SCALP, wherein values reported herein were made using SCALP-5 made by Glasstress Co., Estonia) depending on the ion exchange treatment and the thickness of the article being measured. Where the stress in the substrate and/or portion is generated by exchanging potassium ions into the substrate, a surface stress meter, for example, the FSM-6000 (Orihara Industrial Co., Ltd. (Japan)), is used to measure depth of compression. Unless specified otherwise, compressive stress (including surface CS) is measured by surface stress meter (FSM) using commercially available instruments, for example the FSM-6000, manufactured by Orihara. Surface stress measurements rely upon the accurate measurement of the stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Where the stress is generated by exchanging sodium ions into the substrate, and the article being measured is thicker than about 400 μm, SCALP is used to measure the depth of compression and central tension (CT). Where the stress in the substrate and/or portion is generated by exchanging both potassium and sodium ions into the substrate and/or portion, and the article being measured is thicker than about 400 μm, the depth of compression and CT are measured by SCALP. Without wishing to be bound by theory, the exchange depth of sodium may indicate the depth of compression while the exchange depth of potassium ions may indicate a change in the magnitude of the compressive stress (but not the change in stress from compressive to tensile). The refracted near-field (RNF; the RNF method is described in U.S. Pat. No. 8,854,623, entitled "Systems and methods for measuring a profile characteristic of a glass sample", which is incorporated herein by reference in its entirety) method also may be used to derive a graphical representation of the stress profile. When the RNF method is utilized to derive a graphical representation of the stress profile, the maximum central tension value provided by SCALP is utilized in the RNF method. The graphical representation of the stress profile derived by RNF is force balanced and calibrated to the maximum central tension value provided by a SCALP measurement. As used herein, "depth of layer" (DOL) means the depth that the ions have exchanged into the substrate and/or portion (e.g., sodium, potassium). Through the disclosure, when the maximum central tension cannot be measured directly by SCALP (as when the article being measured is thinner than about 400 μm) the maximum central tension can be approximated by a product of a maximum compressive stress and a depth of compression divided by the difference between the thickness of the substrate and twice the depth of compression, wherein the compressive stress and depth of compression are measured by FSM.

In aspects, the first portion 221 comprising the glass-based portion and/or ceramic-based portion may comprise a first compressive stress region at the first surface area 223 that can extend to a first depth of compression from the first surface area 223. In aspects, the first portion 221 comprising a first glass-based and/or ceramic-based portion may comprise a second compressive stress region at the second surface area 225 that can extend to a second depth of compression from the second surface area 225. In aspects, the first depth of compression and/or the second depth of compression as a percentage of the substrate thickness 207 can be about 1% or more, about 5% or more, about 10% or more, about 30% or less, about 25% or less, or about 20% or less. In aspects, the first depth of compression and/or the second depth of compression as a percentage of the substrate thickness 207 can be in a range from about 1% to about 30%, from about 5% to about 30%, from about 5% to about 25%, from about 5% to about 20%, from about 10% to about 30%, from about 10% to about 25%, from about 10% to about 20%, or any range or subrange therebetween. In further aspects, the first depth of compression and/or the second depth of compression as a percentage of the substrate thickness 207 can be about 10% or less, for example, from about 1% to about 10%, from about 1% to about 8%, from about 3% to about 8%, from about 5% to about 8%, or any range or subrange therebetween. In further aspects, the first depth of compression can be substantially equal to the second depth of compression. In aspects, the first depth of compression and/or the second depth of compression can be about 1 μm or more, about 10 μm or more, about 30 μm or more, about 50 μm or more, about 200 μm or less, about 150 μm or less, about 100 μm or less, or about 60 μm or less. In aspects, the first depth of compression and/or the second depth of compression can be in a range from about 1 μm to about 200 μm, from about 1 μm to about 150 μm, from about 10 μm to about 150 μm, from about 10 μm to about 100 μm, from about 30 μm to about 100 μm, from about 30 μm to about 60 μm, from about 50 μm to about 60 μm, or any range or subrange therebetween. By providing a first portion comprising a first glass-based and/or ceramic-based portion comprising a first depth of compression and/or a second depth of compression in a range from about 1% to about 30% of the first thickness, good impact and/or puncture resistance can be enabled.

In aspects, the first compressive stress region can comprise a maximum first compressive stress. In aspects, the second compressive stress region can comprise a maximum second compressive stress. In further aspects, the maximum first compressive stress and/or the maximum second compressive stress can be about 100 MegaPascals (MPa) or more, about 300 MPa or more, about 500 MPa or more, about 600 MPa or more, about 700 MPa or more, about 1,500 MPa or less, about 1,200 MPa or less, about 1,000 MPa or less, or about 800 MPa or less. In further aspects, the maximum first compressive stress and/or the maximum second compressive stress can be in a range from about 100 MPa to about 1,500 MPa, from about 100 MPa to about 1,200 MPa, from about 300 MPa to about 1,200 MPa, from about 300 MPa to about 1,000 MPa, from about 500 MPa to about 1,000 MPa, from about 600 MPa to about 1,000 MPa, from about 600 MPa to about 1,000 MPa, from about 700 MPa to about 1,000 MPa, from about 700 MPa to about 800 MPa, from about 500 MPa to about 800 MPa, or any range or subrange therebetween. By providing a maximum first compressive stress and/or a maximum second compressive stress in a range from about 100 MPa to about 1,500 MPa, good impact and/or puncture resistance can be enabled.

In aspects, the first portion 221 can comprise a first depth of layer of one or more alkali-metal ions associated with the first compressive stress region. In aspects, the first portion 221 can comprise a second depth of layer of one or more alkali-metal ions associated with the second compressive stress region and the second depth of compression. As used herein, the one or more alkali-metal ions of a depth of layer of one or more alkali-metal ions can include sodium, potassium, rubidium, cesium, and/or francium. In aspects, the one or more alkali ions of the first depth of layer of the one or more alkali ions and/or the second depth of layer of the one or more alkali ions comprises potassium. In aspects, the first depth of layer and/or the second depth of layer as a percentage of the substrate thickness 207 can be about 1% or more, about 5% or more, about 10% or more, about 40% or less, about 35% or less, about 30% or less, about 25% or less, or about 20% or less. In aspects, the first depth of layer and/or the second depth of layer as a percentage of the substrate thickness 207 can be in a range from about 1% to about 40%, from about 1% to about 35%, from about 1% to about 30%, from about 1% to about 25%, from about 1% to about 20%, from about 5% to about 30%, from about 5% to about 25%, from about 5% to about 20%, from about 10% to about 30%, from about 10% to about 25%, from about 10% to about 20%, or any range or subrange therebetween. In further aspects, the first depth of layer of the one or more alkali-metal ions and/or the second depth of layer of the one or more alkali-metal ions as a percentage of the substrate thickness 207 can be about 10% or less, for example, from about 1% to about 10%, from about 1% to about 8%, from about 3% to about 8%, from about 5% to about 8%, or any range or subrange therebetween. In aspects, the first depth of layer of the one or more alkali-metal ions and/or the second depth of layer of the one or more alkali-metal ions can be about 1 μm or more, about 10 μm or more, about 30 μm or more, about 50 μm or more, about 200 μm or less, about 150 μm or less, about 100 μm or less, or about 60 μm or less. In aspects, the first depth of layer of the one or more alkali-metal ions and/or the second depth of layer of the one or more alkali-metal ions can be in a range from about 1 μm to about 200 μm, from about 1 μm to about 150 μm, from about 10 μm to about 150 μm, from about 10 μm to about 100 μm, from about 30 μm to about 100 μm, from about 30 μm to about 60 μm, from about 50 μm to about 60 μm, or any range or subrange therebetween.

In aspects, the first portion 221 may comprise a first tensile stress region. In aspects, the first tensile stress region can be positioned between the first compressive stress region and the second compressive stress region. In aspects, the first tensile stress region can comprise a maximum first tensile stress. In further aspects, the maximum first tensile stress can be about 10 MPa or more, about 20 MPa or more, about 30 MPa or more, about 100 MPa or less, about 80 MPa or less, or about 60 MPa or less. In further aspects, the maximum first tensile stress can be in a range from about 10 MPa to about 100 MPa, from about 10 MPa to about 80 MPa, from about 10 MPa to about 60 MPa, from about 20 MPa to about 100 MPa, from about 20 MPa to about 80 MPa, from about 20 MPa to about 60 MPa, from about 30 MPa to about 100 MPa, from about 30 MPa to about 80 MPa, from about 30 MPa to about 60 MPa, or any range or subrange therebetween. Providing a maximum first tensile stress in a range from about 10 MPa to about 100 MPa can enable good impact and/or puncture resistance while providing low energy fractures, as discussed below.

In aspects, the second portion 231 comprising a second glass-based and/or ceramic-based portion may comprise a third compressive stress region at the third surface area 233 that can extend to a third depth of compression from the third surface area 233. In aspects, the second portion 231 comprising a second glass-based and/or ceramic-based portion may comprise a fourth compressive stress region at the fourth surface area 235 that can extend to a fourth depth of compression from the fourth surface area 235. In aspects, the third depth of compression and/or the fourth depth of compression as a percentage of the substrate thickness 207 can be about 1% or more, about 5% or more, about 10% or more, about 30% or less, about 25% or less, or about 20% or less. In aspects, the third depth of compression and/or the fourth depth of compression as a percentage of the substrate thickness 207 can be within one or more of the ranges discussed above for the first depth of compression and/or the second depth of compression as a percentage of the substrate thickness 207. In further aspects, the third depth of compression can be substantially equal to the fourth depth of compression. In aspects, the third depth of compression and/or the fourth depth of compression can be within one or more of the ranges discussed above for the first depth of compression and/or the second depth of compression. By providing a second portion comprising a glass-based and/or ceramic-based portion comprising a third depth of compression and/or a fourth depth of compression in a range from about 1% to about 30% of the substrate thickness, good impact and/or puncture resistance can be enabled.

In aspects, the third compressive stress region can comprise a maximum third compressive stress. In aspects, the fourth compressive stress region can comprise a maximum fourth compressive stress. In further aspects, the maximum third compressive stress and/or the maximum fourth compressive stress can be within one or more of the ranges discussed above for the maximum first compressive stress and/or the maximum second compressive stress. By providing a maximum third compressive stress and/or a maximum fourth compressive stress in a range from about 100 MPa to about 1,500 MPa, good impact and/or puncture resistance can be enabled.

In aspects, the second portion 231 can comprise a third depth of layer of one or more alkali-metal ions associated with the third compressive stress region and the third depth of compression. In aspects, the second portion 231 can comprise a fourth depth of layer of one or more alkali-metal ions associated with the fourth compressive stress region and the fourth depth of compression. In aspects, the one or more alkali ions of the third depth of layer of the one or more alkali ions and/or the fourth depth of layer of the one or more alkali ions comprises potassium. In aspects, the third depth of layer and/or the fourth depth of layer as a percentage of the substrate thickness 207 can be within one or more of the ranges discussed above for the first depth of layer and/or the second depth of layer as a percentage of the substrate thickness 207. In aspects, the third depth of layer of the one or more alkali-metal ions and/or the fourth depth of layer of the one or more alkali-metal ions can be the first depth of layer and/or the second depth of layer.

In aspects, the second portion 231 may comprise a second tensile stress region. In aspects, the second tensile stress region can be positioned between the third compressive stress region and the fourth compressive stress region. In aspects, the second tensile stress region can comprise a maximum second tensile stress. In further aspects, the maximum second tensile stress can be within one or more of the ranges discussed above for the maximum first tensile stress. In aspects, the maximum first tensile stress can be substantially equal to the maximum second tensile stress. Providing a maximum second tensile stress in a range from about 10 MPa to about 100 MPa can enable good impact and/or puncture resistance while providing low energy fractures, as discussed below.

In aspects, the first depth of compression can be substantially equal to the third depth of compression. In aspects, the second depth of compression can be substantially equal to the fourth depth of compression. In aspects, the maximum first compressive stress can be substantially equal to the maximum third compressive stress. In aspects, the maximum second compressive stress can be substantially equal to the maximum fourth compressive stress. In aspects, the first depth of layer of one or more alkali-metal ions can be substantially equal to the third depth of layer of one or more alkali-metal ions. In aspects, the second depth of layer of one or more alkali-metal ions can be substantially equal to the fourth depth of layer of one or more alkali-metal ions.

In aspects, the central portion 281 can comprise a first central compressive stress region at the first central surface area 213 that can extend to a first central depth of compression from the first central surface area 213. In aspects, the central portion 281 can comprise a second central compressive stress region at the second central surface area 243 that can extend to a second central depth of compression from the second central surface area 243. In further aspects, the first central compressive stress region and/or the second compressive stress region can be within the central region 248 of the central portion 281 (e.g., coextensive with the first central surface area 213 and/or the second central surface area 243). In further aspects, the first central depth of compression and/or the second central depth of compression as a percentage of the central thickness 209 can be within one or more of the ranges discussed above for the first depth of compression and/or the second depth of compression as a percentage of the substrate thickness 207. In further aspects, the first central depth of compression and/or the second central depth of compression as a percentage of the central thickness 209 can be about 10% or more, for example, from about 10% to about 30%, from about 10% to about 25%, from about 15% to about 25%, from about 15% to about 20%, or any range or subrange therebetween. In further aspects, the first central depth of compression can be substantially equal to the second central depth of compression. In aspects, the first central depth of compression and/or the second central depth of compression can be within one or more of the ranges discussed above for the first depth of compression and/or the second depth of compression. By providing a central portion comprising a glass-based and/or ceramic-based portion comprising a first central depth of compression and/or a second central depth of compression in a range from about 1% to about 30% of the central thickness, good impact and/or puncture resistance can be enabled.

In aspects, the first central compressive stress region can comprise a maximum first central compressive stress. In aspects, the second central compressive stress region can comprise a maximum second central compressive stress. In further aspects, the maximum first central compressive stress and/or the maximum second central compressive stress can be within one or more of the ranges discussed above for the maximum first compressive stress and/or the maximum second compressive stress. By providing a maximum first central compressive stress and/or a maximum second central compressive stress in a range from about 100 MPa to about 1,500 MPa, good impact and/or puncture resistance can be enabled.

In aspects, the central portion 281 can comprise a first central depth of layer of one or more alkali-metal ions associated with the first central compressive stress region and the first central depth of compression. In aspects, the central portion 281 can comprise a second central depth of layer of one or more alkali-metal ions associated with the second central compressive stress region and the second central depth of compression. In aspects, the one or more alkali ions of the first central depth of layer of the one or more alkali ions and/or the second central depth of layer of the one or more alkali ions comprises potassium. In aspects, the first central depth of layer and/or the second central depth of layer as a percentage of the central thickness 209 can be within one or more of the ranges discussed above for the first depth of layer and/or the second depth of layer as a percentage of the substrate thickness 207. In aspects, the first central depth of layer of the one or more alkali-metal ions and/or the second central depth of layer of the one or more alkali-metal ions can be within one or more of the ranges discussed above for the first depth of layer and/or the second depth of layer. In aspects, the first depth of compression and/or the third depth of compression can be greater than the first central depth of compression. In aspects, the second depth of compression and/or the fourth depth of compression can be greater than the second central depth of compression. In aspects, the first depth of layer and/or the third depth of layer can be greater than the first central depth of layer. In aspects, the second depth of layer and/or the fourth depth of layer can be greater than the second central depth of layer.

In aspects, the central portion 281 may comprise a central tensile stress region. In aspects, the central tensile stress region can be positioned between the first central compressive stress region and the second central compressive stress region. In aspects, the central tensile stress region can comprise a maximum central tensile stress. In further aspects, the maximum central tensile stress can be about 125 MPa or more, about 150 MPa or more, about 200 MPa or more, about 375 MPa or less, about 300 MPa or less, or about 250 MPa or less. In further aspects, the maximum central tensile stress can be in a range from about 125 MPa to about 375 MPa, from about 125 MPa to about 300 MPa, from about 125 MPa to about 250 MPa, from about 150 MPa to about 375 MPa, from about 150 MPa to about 300 MPa, from about 150 MPa to about 250 MPa, from about 200 MPa to about 375 MPa, from about 200 MPa to about 300 MPa, from about 200 MPa to about 250 MPa, or any range or subrange therebetween. Providing a maximum central tensile stress in a range from about 125 MPa to about 375 MPa can enable low minimum bend radii.

In aspects, the first transition region 212 can comprise a first transition compressive stress region at the first transition surface area 215 that can extend to a first transition depth of compression from the first transition surface area 215. In aspects, the first transition region 212 can comprise a second transition compressive stress region at the second transition surface area 245 that can extend to a second transition depth of compression from the second transition surface area 245. In further aspects, the first transition depth of compression can be substantially equal to the second transition depth of compression. In aspects, the first transition depth of compression and/or the second transition depth of compression can be within one or more of the ranges discussed above for the first depth of compression and/or the second depth of compression. In aspects, the first transition compressive stress region can comprise a maximum first transition compressive stress. In aspects, the second transition compressive stress region can comprise a maximum second transition compressive stress. In further aspects, the maximum first transition compressive stress and/or the maximum second transition compressive stress can be within one or more of the ranges discussed above for the maximum first compressive stress and/or the maximum second compressive stress.

In aspects, the first transition region 212 can comprise a first transition depth of layer of one or more alkali-metal ions associated with the first transition compressive stress region and the first depth of compression. In aspects, the first transition region 212 can comprise a second transition depth of layer of one or more alkali-metal ions associated with the second transition compressive stress region and the second depth of compression. In aspects, the one or more alkali ions of the first transition depth of layer of the one or more alkali ions and/or the second transition depth of layer of the one or more alkali ions comprises potassium. In aspects, the first transition depth of layer of the one or more alkali-metal ions and/or the second transition depth of layer of the one or more alkali-metal ions can be within one or more of the ranges discussed above for the first depth of layer and/or the second depth of layer. In aspects, the first transition region 212 may comprise a first transition tensile stress region. In aspects, the first transition tensile stress region can be positioned between the first transition compressive stress region and the second transition compressive stress region. In aspects, the first transition tensile stress region can comprise a maximum first transition tensile stress. In further aspects, the maximum first transition tensile stress can be within one or more of the ranges discussed above for the maximum central tensile stress.

In aspects, the second transition region 218 can comprise a third transition compressive stress region at the third transition surface area 217 that can extend to a third transition depth of compression from the third transition surface area 217. In aspects, the second transition region 218 can comprise a fourth transition compressive stress region at the fourth transition surface area 247 that can extend to a fourth transition depth of compression from the fourth transition surface area 247. In further aspects, the third transition depth of compression can be substantially equal to the fourth transition depth of compression. In aspects, the third transition depth of compression and/or the fourth transition depth of compression can be within one or more of the ranges discussed above for the first depth of compression and/or the second depth of compression.

In aspects, the third transition compressive stress region can comprise a maximum third transition compressive stress. In aspects, the fourth transition compressive stress region can comprise a maximum fourth transition compressive stress. In further aspects, the maximum third transition compressive stress and/or the maximum fourth transition compressive stress can be within one or more of the ranges discussed above for the maximum first compressive stress and/or the maximum second compressive stress.

In aspects, the second transition region 218 can comprise a third transition depth of layer of one or more alkali-metal ions associated with the third transition compressive stress region and the third depth of compression. In aspects, the second transition region 218 can comprise a fourth transition depth of layer of one or more alkali-metal ions associated with the fourth transition compressive stress region and the fourth depth of compression. In aspects, the one or more alkali ions of the third transition depth of layer of the one or more alkali ions and/or the fourth transition depth of layer of the one or more alkali ions comprises potassium. In aspects, the third transition depth of layer of the one or more alkali-metal ions and/or the fourth transition depth of layer of the one or more alkali-metal ions can be within one or more of the ranges discussed above for the first depth of layer and/or the second depth of layer.

In aspects, the second transition region 218 may comprise a second transition tensile stress region. In aspects, the second transition tensile stress region can be positioned between the third transition compressive stress region and the fourth transition compressive stress region. In aspects, the third transition tensile stress region can comprise a maximum second transition tensile stress. In further aspects, the maximum second transition tensile stress can be within one or more of the ranges discussed above for the maximum central tensile stress.

In aspects, the maximum first transition tensile stress can be greater than or equal to the maximum central tensile stress. In further aspects, the maximum first transition tensile stress can be less than or equal to the maximum first tensile stress of the first tensile stress region. In further aspects, the maximum first tensile stress of the first tensile stress region can be greater than or equal to the maximum central tensile stress. In aspects, the maximum second transition tensile stress can be greater than or equal to the maximum central tensile stress. In further aspects, the maximum second transition tensile stress can be less than or equal to the maximum second tensile stress of the second tensile stress region. In further aspects, the maximum second tensile stress of the second tensile stress region can be greater than or equal to the maximum central tensile stress. Providing a maximum first transition tensile stress and/or a maximum second transition tensile stress greater than or equal to a maximum central tensile stress can reduce the incidence of mechanical instabilities (e.g., of the central portion).

In aspects, the first depth of compression as a percentage of the substrate thickness can be greater than or equal to the first central depth of compression as a percentage of the central thickness. In even further aspects, the third depth of compression as a percentage of the substrate thickness can be greater than or equal to the first central depth of compression as a percentage of the central thickness. In aspects, the second depth of compression as a percentage of the substrate thickness can be greater than or equal to the second central depth of compression as a percentage of the central thickness. In further aspects, the fourth depth of compression as a percentage of the substrate thickness can be greater than or equal to the second central depth of compression as a percentage of the central thickness.

In aspects, the first depth of layer as a percentage of the substrate thickness can be greater than or equal to the first central depth of layer as a percentage of the central thickness. In even further aspects, the third depth of layer as a percentage of the substrate thickness can be greater than or equal to the first central depth of layer as a percentage of the central thickness. In aspects, the second depth of layer as a percentage of the substrate thickness can be greater than or equal to the second central depth of layer as a percentage of the central thickness. In further aspects, the fourth depth of layer as a percentage of the substrate thickness can be greater than or equal to the second central depth of layer as a percentage of the central thickness.

In aspects, the polymer-based portion 289 and/or 299 can be optically clear. The polymer-based portion 289 and/or 299 can comprise a first index of refraction. The first refractive index may be a function of a wavelength of light passing through the optically clear adhesive. For light of a first wavelength, a refractive index of a material is defined as the ratio between the speed of light in a vacuum and the speed of light in the corresponding material. Without wishing to be bound by theory, a refractive index of the optically clear adhesive can be determined using a ratio of a sine of a first angle to a sine of a second angle, where light of the first wavelength is incident from air on a surface of the optically clear adhesive at the first angle and refracts at the surface of the optically clear adhesive to propagate light within the optically clear adhesive at a second angle. The first angle and the second angle are both measured relative to a direction normal to a surface of the optically clear adhesive. As used herein, the refractive index is measured in accordance with ASTM E1967-19, where the first wavelength comprises 589 nm. In aspects, the first refractive index of the polymer-based portion 289 and/or 299 may be about 1 or more, about 1.3 or more, about 1.4 or more, about 1.45 or more, about 1.49 or more, about 3 or less, about 2 or less, or about 1.7 or less, about 1.6 or less, or about 1.55 or less. In aspects, the first refractive index of the polymer-based portion 289 and/or 299 can be in a range from about 1 to about 3, from about 1 to about 2 from about 1 to about 1.7, from about 1.3 to about 1.7, from about 1.4 to about 1.7, from about 1.4 to about 1.6, from about 1.45 to about 1.55, from about 1.49 to about 1.55, or any range or subrange therebetween.

In aspects, the foldable substrate 201 can comprise a second index of refraction. In aspects, the second refractive index of the foldable substrate 201 may be about 1 or more, about 1.3 or more, about 1.4 or more, about 1.45 or more, about 1.49 or more, about 3 or less, about 2 or less, or about 1.7 or less, about 1.6 or less, or about 1.55 or less. In aspects, the second refractive index of the foldable substrate 201 can be in a range from about 1 to about 3, from about 1 to about 2 from about 1 to about 1.7, from about 1.3 to about 1.7, from about 1.4 to about 1.7, from about 1.4 to about 1.6, from about 1.45 to about 1.55, from about 1.49 to about 1.55, or any range or subrange therebetween. In aspects, a differential equal to the absolute value of the difference between the second index of refraction of the foldable substrate 201 and the first index of refraction of the polymer-based portion 289 and/or 299 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the second index of refraction of the foldable substrate 201 may be greater than the first index of refraction of the polymer-based portion 289 and/or 299. In aspects, the second index of refraction of the foldable substrate 201 may be less than the first index of refraction of the polymer-based portion 289 and/or 299.

In aspects, the adhesive layer 261 can comprise a third index of refraction. In aspects, the third index of refraction of the adhesive layer 261 can be within one or more of the ranges discussed above with regards to the first index of refraction of the polymer-based portion 289 and/or 299. In aspects, a differential equal to the absolute value of the difference between the third index of refraction of the adhesive layer 261 and the first index of refraction of the polymer-based portion 289 and/or 299 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the third index of refraction of the adhesive layer 261 may be greater than the first index of refraction of the polymer-based portion 289 and/or 299. In aspects, the third index of refraction of the adhesive layer 261 may be less than the first index of refraction of the polymer-based portion 289 and/or 299.

In aspects, a differential equal to the absolute value of the difference between the third index of refraction of the adhesive layer 261 and the second index of refraction of the foldable substrate 201 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the third index of refraction of the adhesive layer 261 may be greater than the second index of refraction of the foldable substrate 201. In aspects, the third index of refraction of the adhesive layer 261 may be less than the second index of refraction of the foldable substrate 201.

In aspects, the coating 251 can comprise a fourth index of refraction. In aspects, the fourth index of refraction of the coating 251 can be within one or more of the ranges discussed above with regards to the first index of refraction of the polymer-based portion 289 and/or 299. In aspects, a differential equal to the absolute value of the difference between the fourth index of refraction of the coating 251 and the first index of refraction of the polymer-based portion 289 and/or 299 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the fourth index of refraction of the coating 251 may be greater than the first index of refraction of the polymer-based portion 289 and/or 299. In aspects, the fourth index of refraction of the coating 251 may be less than the first index of refraction of the polymer-based portion 289 and/or 299.

In aspects, a differential equal to the absolute value of the difference between the fourth index of refraction of the coating 251 and the second index of refraction of the foldable substrate 201 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the fourth index of refraction of the coating 251 may be greater than the second index of refraction of the foldable substrate 201. In aspects, the fourth index of refraction of the coating 251 may be less than the second index of refraction of the foldable substrate 201.

In aspects, a differential equal to the absolute value of the difference between the fourth index of refraction of the coating 251 and the third index of refraction of the adhesive layer 261 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the fourth index of refraction of the coating 251 may be greater than the third index of refraction of the adhesive layer 261. In aspects, the fourth index of refraction of the coating 251 may be less than the third index of refraction of the adhesive layer 261.

FIGS. 6-7 schematically illustrate aspects of a foldable apparatus 501 and/or 701 in accordance with aspects of the disclosure in a folded configuration. As shown in FIG. 6, the foldable apparatus 501 is folded such that the second major surface 205 of the foldable substrate 201 is on the inside of the folded foldable apparatus 501. In this case, for example, a display would be located on the side of the second major surface 205, and a viewer would view the display from the side of the first major surface 203. As shown in FIG. 7, the foldable apparatus 101 shown in FIG. 1 is folded to form folded foldable apparatus 701 such that the first major surface 203 of the foldable substrate 201 is on the inside of the folded foldable apparatus 701. In FIG. 7, a user would view a display device in place of the PET sheet 707 through the foldable substrate 201 and, thus, would be positioned on the side of the first major surface 203. In aspects, as shown in FIG. 7, the foldable apparatus 701 can comprise a coating 251 disposed over the foldable apparatus 701 (e.g., second major surface 205). In further aspects, a user would view a display device in place of the PET sheet 707 through the coating 251. In aspects, as shown in FIG. 7, the polymer-based portion 289 and/or 299 can be disposed over the foldable substrate 201. In further aspects, although not shown, an additional substrate (e.g., glass-based substrate and/or ceramic-based substrate in place of release liner 271 or PET sheet 707), and the additional substrate can be disposed over a display device.

As used herein, “foldable” includes complete folding, partial folding, bending, flexing, or multiple capabilities. As used herein, the terms “fail,” “failure” and the like refer to breakage, destruction, delamination, or crack propagation. Likewise, a foldable apparatus achieves a parallel plate distance of “X,” or has a parallel plate distance of “X,” or comprises a parallel plate distance of “X” if it resists failure when the foldable apparatus is held at a parallel plate distance of “X” for 24 hours at about 85° C. and about 85% relative humidity.

As used herein, the “parallel plate distance” of a foldable apparatus and/or foldable substrate is measured with the following test configuration and process using a parallel plate apparatus 601 (see FIGS. 6-7) that comprises a pair of parallel rigid stainless-steel plates 603, 605 comprising a first rigid stainless-steel plate 603 and a second rigid stainless-steel plate 605. When measuring the “parallel plate distance” for the foldable substrate 201 (e.g., the foldable apparatus 301 shown in FIG. 3 consisting of foldable substrate 201), the foldable substrate 201 is placed between the pair of plates 603 and 605 such that the first major surface 203 is in contact with the pair of plates 603 and 605, as shown in FIG. 6. When measuring the “parallel plate distance” for a foldable apparatus resembling the foldable apparatus 101 shown in FIG. 2, the adhesive layer 261 is removed and is replaced by a test adhesive layer 709 comprises a thickness of 50 μm. Further, the test is conducted with a 100 μm thick sheet 707 of polyethylene terephthalate (PET) rather than with the release liner 271 of FIG. 2. Thus, during the test to determine the “parallel plate distance” of a configuration of a foldable apparatus, the foldable apparatus 701 is produced by using the 100 μm thick sheet 707 of polyethylene terephthalate (PET) rather than with the release liner 271 of FIG. 2.

When preparing the foldable apparatus 701, the 100 μm thick sheet 707 of polyethylene terephthalate (PET) is attached to the test adhesive layer 709 in an identical manner that the release liner 271 is attached to the second contact surface 265 of the adhesive layer 261 as shown in FIG. 2. To test the foldable apparatus 701 of FIG. 7, the test adhesive layer 709 and the PET sheet 707 can likewise be installed as shown in the configuration of FIG. 7 to conduct the test on the foldable apparatus 701. The foldable apparatus 701 is placed between the pair of parallel rigid stainless-steel plates 603 and 605 such that the foldable substrate 201 will be on the inside of the bend, similar to the configuration shown in FIG. 7. Similarly, foldable apparatus 401 shown in FIG. 4 would be prepared for testing by replacing the adhesive layer 261 and the release liner 271 with the test adhesive layer 709 and the 100 μm thick sheet 707 of PET. For determining a “parallel plate distance”, the distance between the parallel plates is reduced at a rate of 50 μm/second until the parallel plate distance 611 or 711 is equal to the “parallel plate distance” to be tested. Then, the parallel plates are held at the “parallel plate distance” to be tested for 24 hours at about 85° C. and about 85% relative humidity. As used herein, the “minimum parallel plate distance” is the smallest parallel plate distance that the foldable apparatus can withstand without failure under the conditions and configuration described above.

In aspects, the foldable apparatus 101, 301, 401, 501, and/or 701 and/or foldable substrate 201 can achieve a parallel plate distance of 100 mm or less, 50 mm or less, 20 mm or less, 10 mm or less, 5 mm or less, or 3 mm or less. In further aspects, the foldable apparatus 101, 301, 401, 501, and/or 701 and/or foldable substrate 201 can achieve a parallel plate distance of 50 millimeters (mm), or 20 mm, or 10 mm, of 5 mm, or 3 mm. In aspects, the foldable apparatus 101, 301, 401, 501, and/or 701 and/or foldable substrate 201 can comprise a minimum parallel plate distance of about 40 mm or less, about 20 mm or less, about 10 mm or less, about 5 mm or less, about 3 mm or less, about 1 mm or less, about 1 mm or more, about 3 mm or more, about 5 mm or more, or about 10 mm or more. In aspects, the foldable apparatus 101, 301, 401, 501, and/or 701 and/or foldable substrate 201 can comprise a minimum parallel plate distance in a range from about 1 mm to about 40 mm, from about 1 mm to about 20 mm, from about 1 mm to about 10 mm, from about 1 mm to about 5 mm, from about 1 mm to about 3 mm. In aspects, the foldable apparatus 101, 301, 401, 501, and/or 701 and/or foldable substrate 201 can achieve a minimum parallel plate distance in a range from about 2 mm to about 40 mm, from about 2 mm to about 20 mm, from about 2 mm to about 10 mm, from about 3 mm to about 10 mm, from about 3 mm to about 5 mm, from about 5 mm to about 10 mm, or any range or subrange therebetween.

A width 287 of the central portion 281 of the foldable substrate 201 is defined between the first portion 221 and the second portion 231 in the direction 106 of the length 105. In aspects, the width 287 of the central portion 281 of the foldable substrate 201 can extend from the first portion 221 to the second portion 231. A width 210 of the first central surface area 213 and the second central surface area 243 of the foldable substrate 201 is defined between the first transition region 212 and the second transition region 218, for example, as the portion comprising the central thickness 209, in the direction 106 of the length 105. In aspects, the width 287 of the central portion 281 of the foldable substrate 201 and/or the width 210 of the first central surface area 213 of the foldable substrate 201 can be about 1.4 times or more, about 1.6 times or more, about 2 times or more, about 2.2 times or more, about 3 times or less, or about 2.5 times or less the minimum parallel plate distance. In aspects, the width 287 of the central portion 281 of the foldable substrate 201 and/or the width 210 of the first central surface area 213 of the foldable substrate 201 as a multiple of the minimum parallel plate distance can be in a range from about 1.4 times to about 3 times, from about 1.6 times to about 3 times, from about 1.6 times to about 2.5 times, from about 2 times to about 2.5 times, from about 2.2 times to about 2.5 times, from about 2.2 times to about 3 times, or any range or subrange therebetween. Without wishing to be bound by theory, the length of a bent portion in a circular configuration between parallel plates can be about 1.6 times the parallel plate distance 611 or 711. Without wishing to be bound by theory, the length of a bend portion in an elliptical configuration between parallel plates can be about 2.2 times the parallel plate distance 611 or 711. In aspects, the width 287 of the central portion 281 of the foldable substrate 201 and/or the width 210 of the first central surface area 213 of the foldable substrate 201 can be about 1 mm or more, about 3 mm or more, about 5 mm or more, about 8 mm or more, about 10 mm or more, about 15 mm or more, about 20 mm or more, about 100 mm or less, about 60 mm or less, about 50 mm or less, about 40 mm or less, about 35 mm or less, about 30 mm or less, or about 25 mm or less. In aspects, the width 287 of the central portion 281 of the foldable substrate 201 and/or the width 210 of the first central surface area 213 of the foldable substrate 201 can be in a range from about 1 mm to about 100 mm, from about 3 mm to about 100 mm, from about 3 mm to about 60 mm, from about 5 mm to about 60 mm, from about 5 mm to about 50 mm, from about 8 mm to about 50 mm, from about 8 mm to about 40 mm, from about 10 mm to about 40 mm, from about 10 mm to about 35 mm, from about 15 mm to about 35 mm, from about 15 mm to about 30 mm, from about 20 mm to about 30 mm, from about 20 mm to about 25 mm, or any range of subrange therebetween. In aspects, the width 287 of the central portion 281 of the foldable substrate 201 and/or the width 210 of the first central surface area 213 of the foldable substrate 201 can be about 2.8 mm or more, about 6 mm or more, about 9 mm or more, about 60 mm or less, about 40 mm, or less, or about 24 mm or less. In aspects, the width 287 of the central portion 281 of the foldable substrate 201 and/or the width 210 of the first central surface area 213 of the foldable substrate 201 can be in a range from about 2.8 mm to about 60 mm, from about 2.8 mm to about 40 mm, from about 2.8 mm to about 24 mm, from about 6 mm to about 60 mm, from about 6 mm to about 40 mm, from about 6 mm to about 24 mm, from about 9 mm to about 60 mm, from about 9 mm to about 40 mm, from about 9 mm to about 24 mm, or any range of subrange therebetween. By providing a width within the above-noted ranges for the central portion (e.g., between the first portion and the second portion), folding of the foldable apparatus without failure can be facilitated.

The foldable apparatus 101, 301, 401, 501, and/or 701 may have an impact resistance defined by the capability of a region of the foldable apparatus (e.g., a region comprising the first portion 221, a region comprising the second portion 231, a region comprising the polymer-based portion 289 and/or 299 and/or central portion 281) to avoid failure at a pen drop height (e.g., 5 centimeters (cm) or more, 10 centimeters or more, 20 cm or more), when measured according to the "Pen Drop Test." As used herein, the "Pen Drop Test" is conducted such that samples of foldable apparatus are tested with the load (i.e., from a pen dropped from a certain height) imparted to an outer major surface (e.g., first major surface 203 of the foldable substrate 201 for foldable apparatus 101 or 301 shown in FIGS. 2-3, second major surface 205 of the foldable substrate 201 for foldable apparatus 301 or 401 shown in FIGS. 3-4) with the foldable apparatus configured as in the parallel plate test with 100 μm thick sheet 707 of PET attached to the test adhesive layer 709 having a thickness of 50 μm instead of the release liner 271 shown in FIG. 2. As such, the PET layer in the Pen Drop Test is meant to simulate a foldable electronic display device (e.g., an OLED device). During testing, the foldable apparatus bonded to the PET layer is placed on an aluminum plate (6063 aluminum alloy, as polished to a surface roughness with 400 grit paper) with the PET layer in contact with the aluminum plate. No tape is used on the side of the sample resting on the aluminum plate.

A tube is used for the Pen Drop Test to guide a pen to an outer surface of the foldable apparatus. For the foldable apparatus 101, 301, 401, 501, and/or 701 in FIGS. 2-4 and 6-7, the pen is guided to the outer major surface (e.g., first major surface 203 of the foldable substrate 201 for foldable apparatus 101 or 301 shown in FIGS. 2-3, second major surface 205 of the foldable substrate 201 for foldable apparatus 301 or 401 shown in FIGS. 3-4), and the tube is placed in contact with the second major surface 205 of the foldable substrate 201 so that the longitudinal axis of the tube is substantially perpendicular to the outer major surface with the longitudinal axis of the tube extending in the direction of gravity. The tube has an outside diameter of 1 inch (2.54 cm), an inside diameter of nine-sixteenths of an inch (1.4 cm), and a length of 90 cm. An acrylonitrile butadiene (ABS) shim is employed to hold the pen at a predetermined height for each test. After each drop, the tube is relocated relative to the sample to guide the pen to a different impact location on the sample. The pen employed in Pen Drop Test is a BIC Easy Glide Pen, Fine, having a tungsten carbide ballpoint tip of 0.7 mm (0.68 mm) diameter, and a weight of 5.73 grams (g) including the cap (4.68 g without the cap).

For the Pen Drop Test, the pen is dropped with the cap attached to the top end (i.e., the end opposite the tip) so that the ballpoint can interact with the test sample. In a drop sequence according to the Pen Drop Test, one pen drop is conducted at an initial height of 1 cm, followed by successive drops in 0.5 cm increments up to 20 cm, and then after 20 cm, 2 cm increments until failure of the test sample. After each drop is conducted, the presence of any observable fracture, failure, or other evidence of damage to the sample is recorded along with the particular pen drop height. Using the Pen Drop Test, multiple samples can be tested according to the same drop sequence to generate a population with improved statistical accuracy. For the Pen Drop Test, the pen is to be changed to a new pen after every 5 drops, and for each new sample tested. In addition, all pen drops are conducted at random locations on the sample at or near the center of the sample, with no pen drops near or on the edge of the samples.

For purposes of the Pen Drop Test, "failure" means the formation of a visible mechanical defect in a laminate. The mechanical defect may be a crack or plastic deformation (e.g., surface indentation). The crack may be a surface crack or a through crack. The crack may be formed on an interior or exterior surface of a laminate. The crack may extend through all or a portion of the foldable substrate 201 and/or coating. A visible mechanical defect has a minimum dimension of 0.2 mm or more.

In aspects, the foldable apparatus can resist failure for a pen drop in a region comprising the first portion 221 or the second portion 231 at a pen drop height of 10 centimeters (cm), 12 cm, 14 cm, 16 cm, or 20 cm. In aspects, a maximum pen drop height that the foldable apparatus can withstand without failure over a region comprising the first portion 221 or the second portion 231 may be about 10 cm or more, about 12 cm or more, about 14 cm or more, about 16 cm or more, about 40 cm or less, or about 30 cm or less, about 20 cm or less, about 18 cm or less. In aspects, a maximum pen drop height that the foldable apparatus can withstand without failure over a region comprising the first portion 221 or the second portion 231 can be in a range from about 10 cm to about 40 cm, from about 12 cm to about 40 cm, from about 12 cm to about 30 cm, from about 14 cm to about 30 cm, from about 14 cm to about 20 cm, from about 16 cm to about 20 cm, from about 18 cm to about 20 cm, or any range or subrange therebetween.

In aspects, the foldable apparatus can resist failure for a pen drop in a region (e.g., central portion 281) comprising the polymer-based portion 289 and/or 299 between the first portion 221 and the second portion 231 at a pen drop height of 1 cm, 2 cm, 3 cm, 4 cm, 5 cm, or more. In aspects, a maximum pen drop height that the foldable apparatus can withstand without failure over a region comprising the polymer-based portion 289 and/or 299 between the first portion 221 and the second portion 231 may be about 1 cm or more, about 2 cm or more, about 3 cm or more, about 4 cm or more, about 20 cm or less, about 10 cm or less, about 8 cm or less, or about 6 cm or less. In aspects, a maximum pen drop height that the foldable apparatus can withstand without failure over a region comprising the polymer-based portion 289 and/or 299 between the first portion 221 and the second portion 231 can be in a range from about 1 cm to about 20 cm, from about 2 cm to about 20 cm, from about 2 cm to about 10 cm, from about 3 cm to about 10 cm, from about 3 cm to about 8 cm, from about 4 cm to about 8 cm, from about 4 cm to about 6 cm, or any range or subrange therebetween. In aspects, a maximum pen drop height that the foldable apparatus can withstand without failure of a region comprising the polymer-based portion 289 and/or 299 between the first portion 221 and the second portion 231 can be in a range from about 1 cm to about 10 cm, from about 1 cm to about 8 cm, from about 1 cm to about 5 cm, from about 2 cm to about 5 cm, from about 3 cm to about 5 cm, from about 4 cm to about 5 cm, or any range or subrange therebetween.

Figure 36:
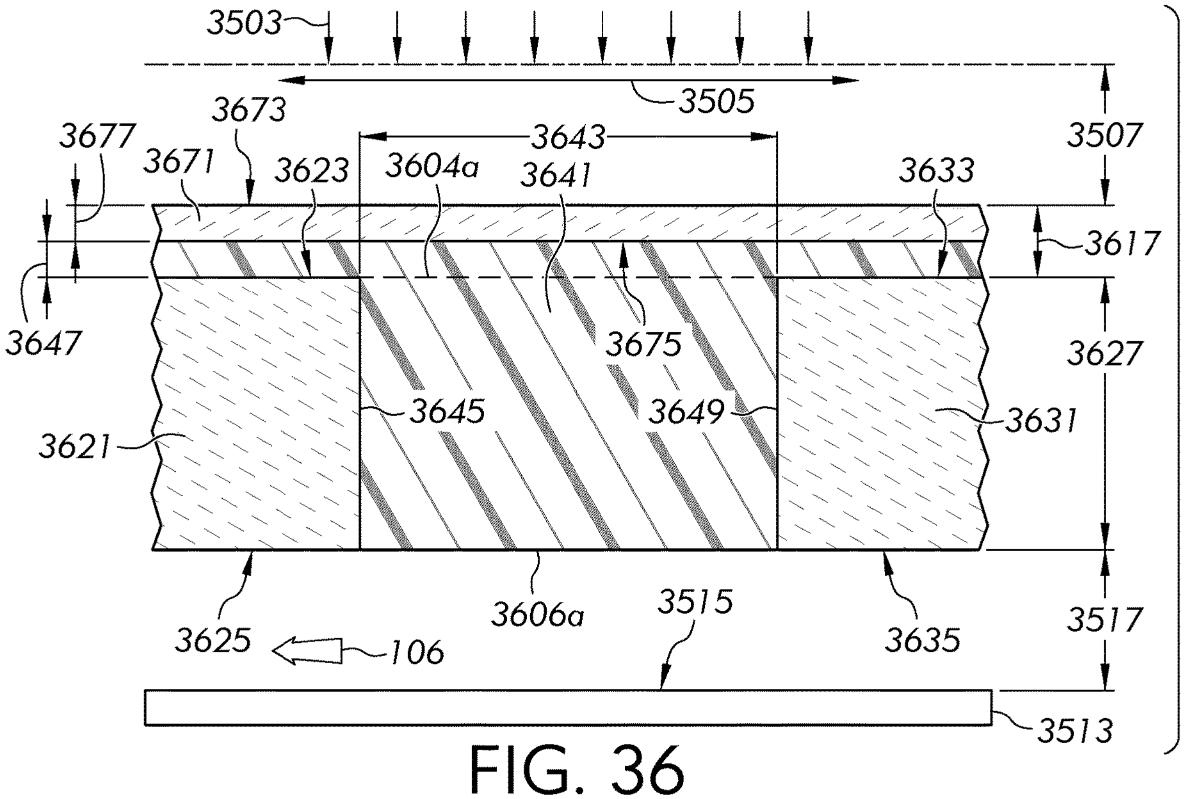
Figure 38:
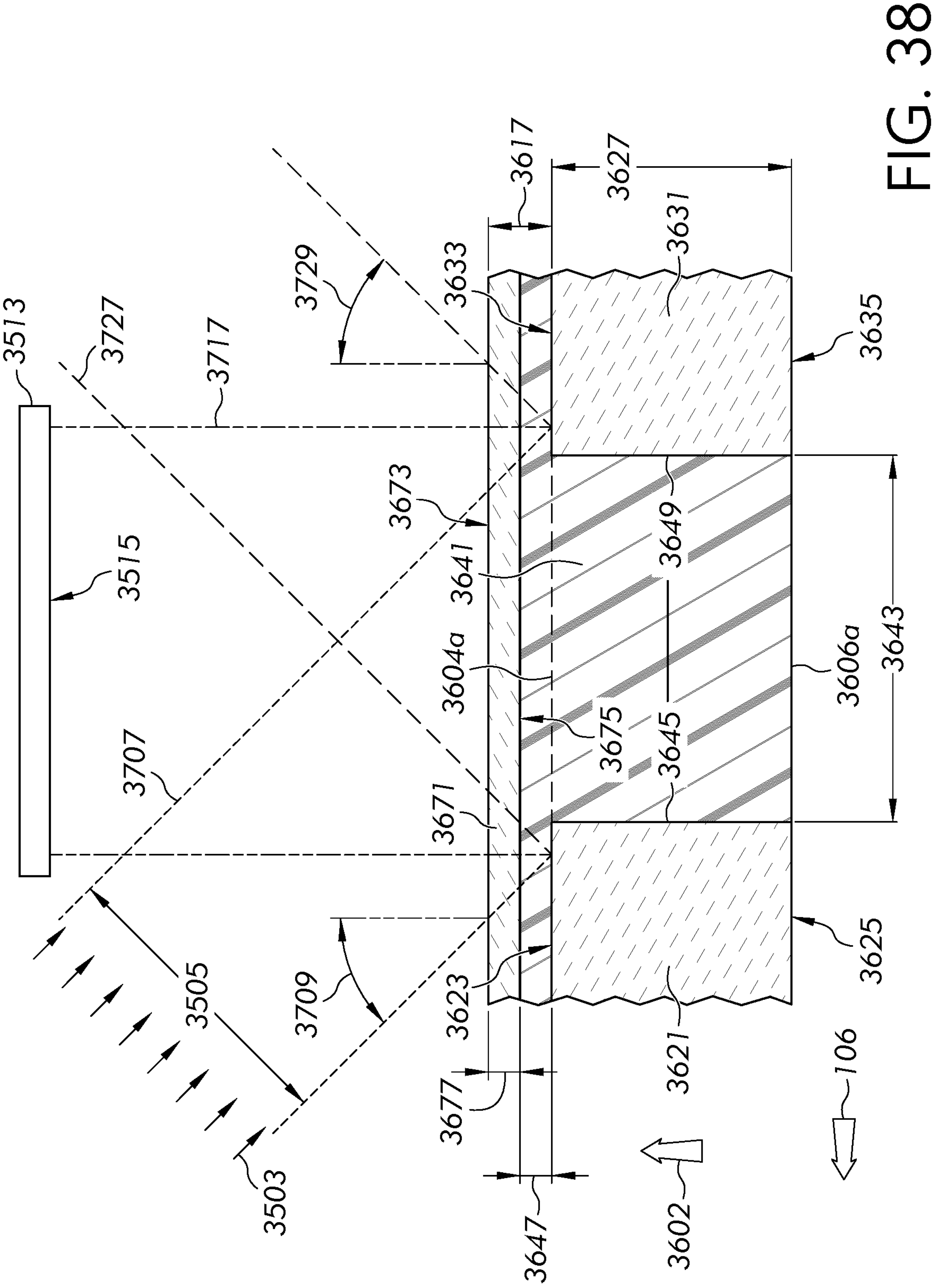

In aspects, the foldable substrate 201 and/or the foldable apparatus 101, 301, 401, 501, and/or 701 can comprise a fractional intensity measured using brightfield transmission and/or darkfield reflection. Throughout the disclosure, fractional intensity is defined as a ratio of the light detected for a test sample to the light detected for a reference sample using a specified lighting configuration. As used herein, the reference sample, as shown in FIGS. 36 and 38, comprises a first portion 3621 and a second portion 3631 separated by a minimum distance 3643 measured between a first peripheral surface 3645 of the first portion 3621 and a second peripheral surface 3649 of the second portion 3631. The first portion 3621 and the second portion 3631 comprise a portion thickness 3627. The first portion 3621 comprises a first surface area 3623 and the second portion 3631 comprises a third surface area 3633 extending along a first plane 3604*a*. The first portion 3621 comprises a second surface area 3625 and the second portion 3631 comprises a fourth surface area 3635 extending along a second plane 3606*a*. The first portion 3621 and the second portion 3631 comprise glass-based portions that are substantially unstrengthened and comprise a refractive index averaged over optical wavelengths from 400 nm to 700 nm of 1.5012. The portion thickness 3627 is configured to be equal to the substrate thickness 207 of the test sample (e.g., foldable substrate, foldable apparatus), and the minimum distance 3643 is configured to be equal to the width 210 of the central region 248 of the test sample (e.g., foldable substrate, foldable apparatus). The reference sample also comprises a substrate 3671 comprising a thickness of 30 μm. The substrate 3671 comprises a glass-based portion that is chemically strengthened to a depth of compression of 9 μm extending from each major surface and comprises a refractive index averaged over optical wavelengths from 400 nm to 700 nm of 1.512. The reference sample further comprises a polymer-based portion 3641 filling the space between the first portion 3621 and the second portion 3631. The polymer-based portion 3641 is also positioned between the substrate 3671 and the first portion 3621 and/or the second portion 3631 with a polymer thickness of 3647 equal to 10 μm. The polymer-based portion 3641 contacts a second major surface 3675 of the substrate 3671. The polymer-based portion 3641 comprises a refractive index averaged over optical wavelengths from 400 nm to 700 nm of 1.5022. The sum 3617 of the substrate thickness 3677 and the polymer thickness 3647 is configured to be substantially equal to a sum of a first thickness 3527 and a second thickness 3537 of the test sample.

Figure 35:
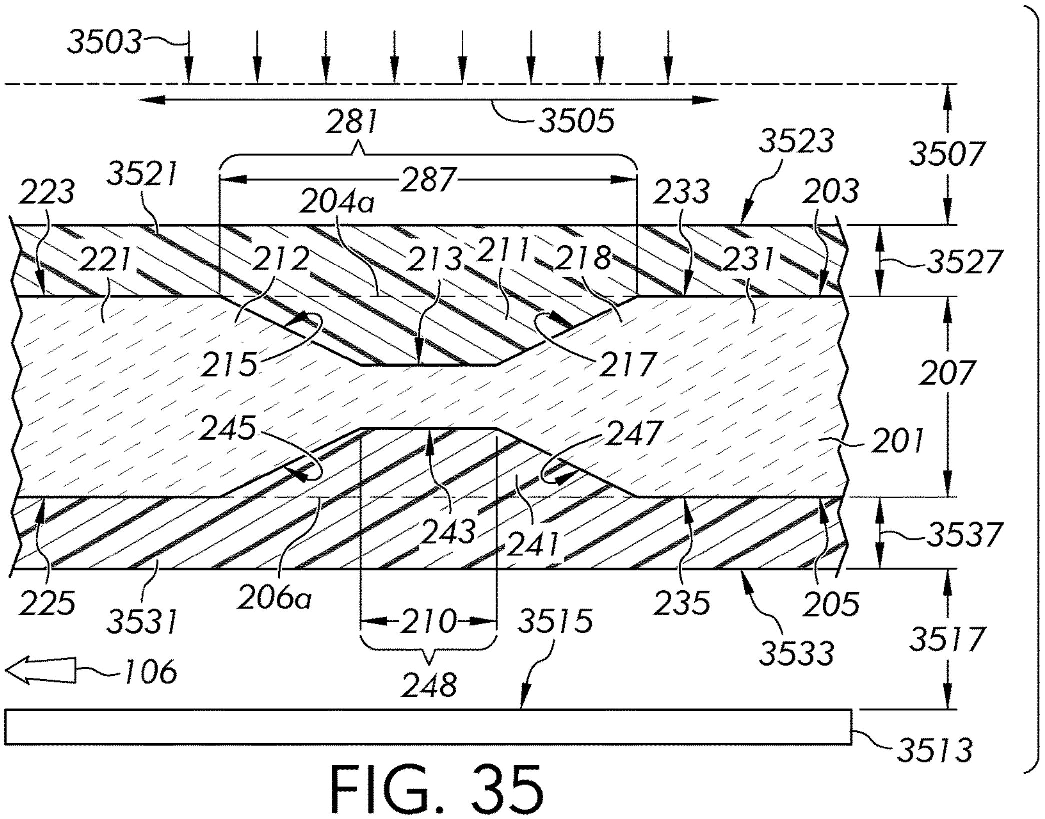
FIGS. 35-36 show methods of measuring fractional intensities using brightfield transmission.
Figure 37:
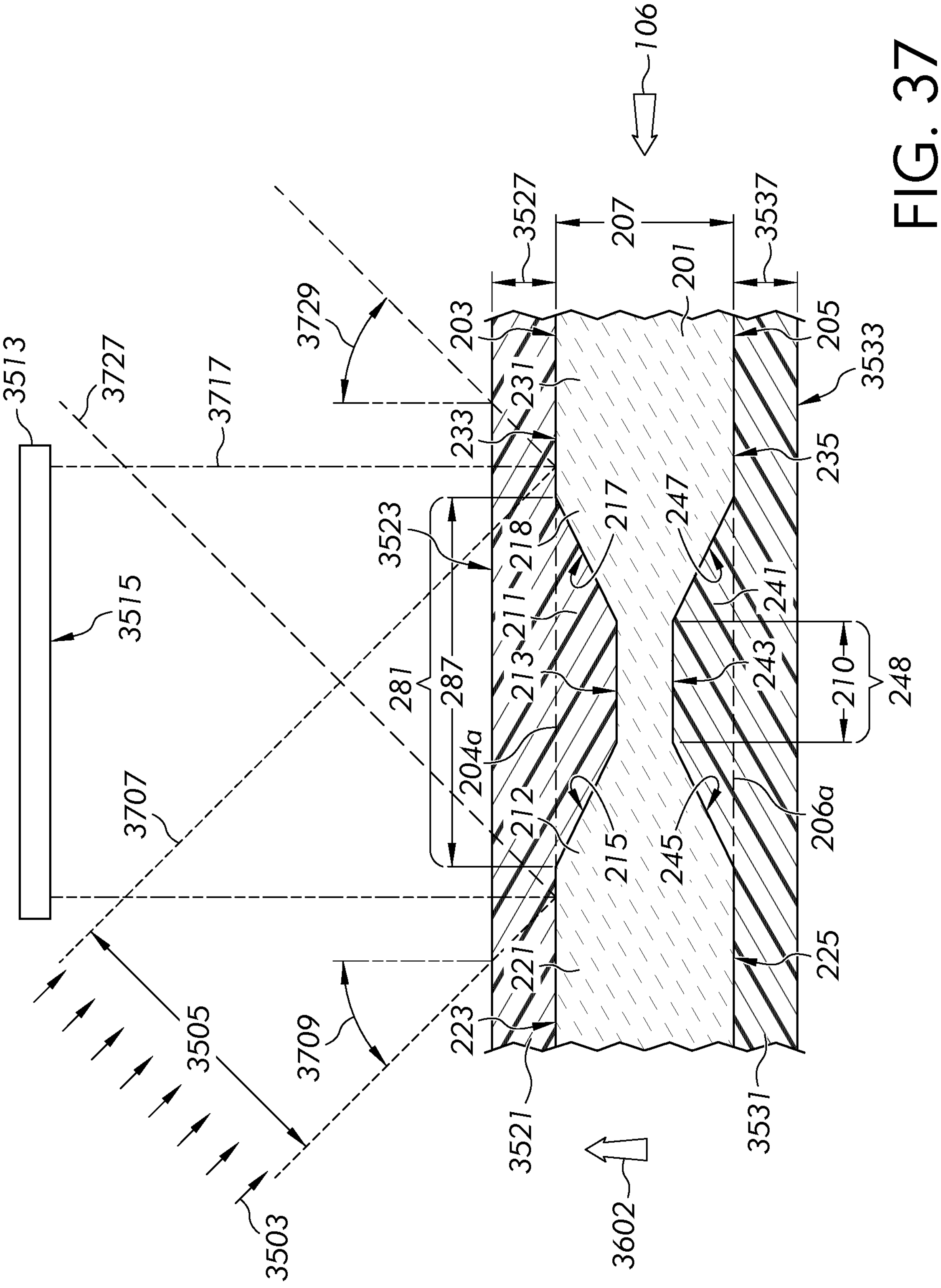
FIGS. 37-38 show methods of measuring fractional intensities using darkfield reflectance.

As shown in FIGS. 35 and 37, the test sample comprises the foldable substrate 201. The test sample comprises a first polymer-based portion 3521 filling the first recess 211 and comprising the first thickness 3527 measured from the first major surface 203. The test sample comprises a second polymer-based portion 3531 filling the second recess 241 and comprising the second thickness 3537 measured from the second major surface 205. The first thickness 3527 and the second thickness 3537 are both equal to 20 μm. The first polymer-based portion 3521 and the second polymer-based portion 3531 both comprise a refractive index averaged over optical wavelengths from 400 nm to 700 nm of 1.512. For a foldable apparatus, any adhesive layer, polymer-based portion, release liner, etc. is removed from the foldable substrate before creating the test sample as described above in this paragraph.

A beam size 3505 of the light beam 3503 is equal to 6 mm more than the width 210 of the central region 248. The light beam 3503 comprises a wavelength of 550 nm. For the reference sample, the light beam 3503 is positioned such that it is centered about the minimum distance 3643 between the first portion 3621 and the second portion 3631. For the test sample, the light beam 3503 is positioned such that it is centered about the central region 248 of the foldable substrate 201.

Using brightfield transmission, as shown in FIGS. 35 and 36, the light beam 3503 is incident at 0° relative to a direction normal to a first contact surface 3523 of the first polymer-based portion 3521 of the test sample or a first major surface 3673 of the substrate 3671 of the reference sample. The test sample and/or the reference sample are positioned such that a first beam path 3507 from a beam source to the first contact surface 3523 of the first polymer-based portion 3521 of the test sample or the first major surface 3673 of the substrate 3671 of the reference sample of 1 mm. A photodetector 3513 is positioned such that a second beam path 3517 comprising a distance of 400 μm is measured in a direction 0° relative to a direction normal to the second surface area 3625 of the first portion 3621 of the reference sample or a second contact surface 3533 of the second polymer-based portion 3531 of the test sample from the corresponding surface to a detecting surface 3515 of the photodetector 3513. The intensity of light measured by the photodetector 3513 is measured as a function of the direction 106. Then, the fractional intensity as a function of distance along the direction 106 is equal to the ratio of the light detected for the test sample to the ratio of the light detected from the reference sample. From this fractional intensity, a maximum fractional intensity can be determined as the maximum value of the fractional intensity and/or a minimum fractional intensity can be determined as the minimum value of the fractional intensity.

In aspects, a maximum fractional intensity using brightfield transmission can be 1.000 or more, about 1.005 or more, about 1.008 or more, about 1.025 or less, about 1.020 or less, about 1.015 or less, or about 1.010 or less. In aspects, a maximum fractional intensity using brightfield transmission can be in a range from 1.000 to about 1.025, from 1.000 to about 1.020, from about 1.005 to about 1.020, from about 1.005 to about 1.015, from about 1.005 to about 1.010, from about 1.008 to about 1.010, or any range or subrange therebetween. In aspects, a contrast ratio using brightfield transmission can be 0 or more, about 0.005 or more, about 0.007 or more, about 0.025 or less, about 0.020 or less, about 0.015 or less, or about 0.010 or less. In aspects, a contrast ratio using brightfield transmission can be in a range from 0 to about 0.025, from 0 to about 0.020, from 0 to about 0.015, from about 0.005 to about 0.015, from about 0.005 to about 0.010, from about 0.007 to about 0.010, or any range or subrange therebetween.

Using darkfield reflectance, as shown in FIGS. 37 and 38, the light beam 3503 is configured to travel along a third beam path 3707 that is incident at a first angle 3709 of 300 relative to a direction 3602 normal to the first contact surface 3523 of the first polymer-based portion 3521 of the test sample or a first major surface 3673 of the substrate 3671 of the reference sample (e.g., 120° relative to the first contact surface 3523 of the first polymer-based portion 3521 of the test sample or a first major surface 3673 of the substrate 3671 of the reference sample). As shown, a specular reflection of the light beam travels along a fourth beam path 3727 that travels at a second angle 3729 relative to a direction 3602 normal to the first contact surface 3523 of the first polymer-based portion 3521 of the test sample or a first major surface 3673 of the substrate 3671 of the reference sample that is equal to the first angle 3709. A photodetector 3513 is positioned such that a fifth beam path 3717 is positioned to detect light travelling at a direction 0° relative to and from a direction 3062 normal to the second surface area 3625 of the first portion 3621 of the reference sample or a second contact surface 3533 of the second polymer-based portion 3531 of the test sample from the corresponding surface to a detecting surface 3515 of the photodetector 3513. Unlike brightfield transmission where the sample is positioned between the beam source and the photodetector, the beam source is positioned on the same side of the sample as the photodetector. The intensity of light measured by the photodetector 3513 is measured as a function of the direction 106. Then, the fractional intensity as a function of distance along the direction 106 is equal to the ratio of test sample to the reference sample. From this fractional intensity, a maximum fractional intensity can be determined as the maximum value of the fractional intensity and/or a minimum fractional intensity can be determined as the minimum value of the fractional intensity.

In aspects, a maximum fractional intensity using darkfield reflection can be 1.000 or more, about 1.010 or more, about 1.030 or more, about 1.050 or less, about 1.110 or less, about 1.100 or less, about 1.080 or less, or about 1.060. In aspects, a maximum fractional intensity using brightfield transmission can be in a range from 1.000 to about 1.110, from 1.000 to about 1.100, from about 1.010 to about 1.100, from about 1.030 to about 1.10, from about 1.030 to about 1.080, from about 1.005 to about 1.008, or any range or subrange therebetween. In aspects, a contrast ratio using darkfield reflection can be 0 or more, about 0.010 or more, about 0.020 or more, about 0.025 or less, about 0.070 or less, about 0.060 or less, about 0.050 or less, about 0.040 or less, or about 0.030 or less. In aspects, a contrast ratio using brightfield transmission can be in a range from 0 to about 0.070, from 0 to about 0.060, from 0 to about 0.050, from about 0.010 to about 0.050, from about 0.010 to about 0.040, from about 0.020 to about 0.040, from about 0.025 to about 0.040, from about 0.025 to about 0.030, or any range or subrange therebetween.

Aspects of methods of making the foldable apparatus and/or foldable substrate in accordance with aspects of the disclosure will be discussed with reference to the flow chart in FIG. 10 and example method steps illustrated in FIGS. 11-34.

Example aspects of making the foldable apparatus 101, 301, 401, 501, and/or 701 and/or foldable substrate 201 illustrated in FIGS. 2-4 and 6-7 will now be discussed with reference to FIGS. 11-17, 22, and 31-34 and the flow chart in FIG. 10. In a first step 1001 of methods of the disclosure, methods can start with providing a foldable substrate 1105 (see FIGS. 11-12). In aspects, the foldable substrate 1105 may be provided by purchase or otherwise obtaining a substrate or by forming the foldable substrate. In aspects, the foldable substrate 1105 can comprise a glass-based substrate and/or a ceramic-based substrate. In further aspects, glass-based substrates and/or ceramic-based substrates can be provided by forming them with a variety of ribbon forming processes, for example, slot draw, down-draw, fusion down-draw, up-draw, press roll, redraw, or float. In further aspects, ceramic-based substrates can be provided by heating a glass-based substrate to crystallize one or more ceramic crystals. The foldable substrate 1105 may comprise an initial second major surface 1115 (see FIG. 11) that can extend along a plane. The initial second major surface 1115 can be opposite a first major surface 203 or 1113. In aspects, as shown in FIG. 11, in step 1001, the foldable substrate 1105 can comprise an existing first central surface area 1143 that is coplanar with a first surface area 1123 and/or a third surface area 1133, for example, the initial first major surface 1113 can comprise the existing first central surface area 1143, the first surface area 1123, and the third surface area 1133. In aspects, as shown in FIG. 11, in step 1001, the foldable substrate 1105 can comprise an existing second central surface area 1145 that is coplanar with a second surface area 1125 and/or a fourth surface area 1135, for example, the initial second major surface 1115 can comprise the existing second central surface area 1145, the second surface area 1125, and the fourth surface area 1135.

After step 1001, as shown in FIG. 11, methods can proceed to step 1003 comprising initially chemically strengthening the foldable substrate 1105. In aspects, the foldable substrate 1105 can be substantially unstrengthened before the chemically strengthening of step 1003. In aspects, as shown, chemically strengthening the foldable substrate 1105 can comprise contacting at least a portion of a foldable substrate 1105 comprising lithium cations and/or sodium cations with a salt bath 1101 comprising salt solution 1103. Chemically strengthening a foldable substrate 1105 (e.g., glass-based substrate, ceramic-based substrate) by ion exchange can occur when a first cation within a depth of a surface of a foldable substrate 1105 is exchanged with a second cation within a molten salt or salt solution 1103 that has a larger radius than the first cation. For example, a lithium cation within the depth of the surface of the foldable substrate 1105 can be exchanged with a sodium cation or potassium cation within a salt solution 1103. Consequently, the surface of the foldable substrate 1105 is placed in compression and thereby chemically strengthened by the ion exchange process since the lithium cation has a smaller radius than the radius of the exchanged sodium cation or potassium cation within the salt solution 1103. Chemically strengthening the foldable substrate 1105 can comprise contacting at least a portion of a foldable substrate 1105 comprising lithium cations and/or sodium cations with a salt bath 1101 comprising salt solution 1103 comprising potassium nitrate, potassium phosphate, potassium chloride, potassium sulfate, sodium chloride, sodium sulfate, sodium nitrate, and/or sodium phosphate, whereby lithium cations and/or sodium cations diffuse from the foldable substrate 1105 to the salt solution 1103 contained in the salt bath 1101. In aspects, the temperature of the salt solution 1103 can be about 300° C. or more, about 360° C. or more, about 400° C. or more, about 500° C. or less, about 460° C. or less, or about 420° C. or less. In aspects, the temperature of the salt solution 1103 can be in a range from about 300° C. to about 500° C., from about 360° C. to about 500° C., from about 400° C. to about 500° C., from about 300° C. to about 460° C., from about 360° C. to about 460° C., from about 400° C. to about 460° C., from about 400° C. to about 420° C., from about 300° C. to about 400° C., from about 360° C. to about 420° C., or any range or subrange therebetween. In aspects, the foldable substrate 1105 can be in contact with the salt solution 1103 for about 5 minutes or more, about 30 minutes or more, about 1 hour or more, about 3 hours or more, about 48 hours or less, about 24 hours or less, or about 8 hours or less. In aspects, the foldable substrate 1105 can be in contact with the salt solution 1103 for a time in a range from about 5 minutes to about 48 hours, from about 30 minutes to about 48 hours, from about 30 minutes to about 24 hours, from about 1 hour to about 24 hours, from about 3 hours to about 24 hours, from about 3 hours to about 8 hours, or any range or subrange therebetween. In aspects, the foldable substrate 1105 can be in contact with the salt solution 1103 for a time in a range from about 5 minutes to about 8 hours, from about 30 minutes to about 8 hours, from about 1 hour to about 8 hours, or any range or subrange therebetween.

In aspects, chemically strengthening the foldable substrate 1105 in step 1003 can comprise chemically strengthening the initial first major surface 1113 to form an initial first compressive stress region extending to an initial first depth of compression from the initial first major surface 1113. In aspects, chemically strengthening the foldable substrate 1105 in step 1003 can comprise chemically strengthening the initial second major surface 1115 to form an initial second compressive stress region extending to an initial second depth of compression from the initial second major surface 1115. The initial first compressive stress region and/or the initial second compressive stress region can extend across portions of the foldable substrate 1105 corresponding to the first portion, the second portion, and the central portion. For example, the initial first compressive stress region can extend from a first surface area 1123 and/or a third surface area 1133, and/or the initial second compressive stress region can extend from a second surface area 1125 and/or a fourth surface area 1135. In aspects, the initial first depth of compression and/or the initial second depth of compression, as a percentage of the substrate thickness 207 (see FIG. 11), can be about 5% or more, 10% or more, about 12% or more, about 14% or more, about 25% or less, about 20% or less, about 18% or less, or about 16% or less. In aspects, the initial first depth of compression and/or the initial second depth of compression, as a percentage of the substrate thickness 207 (see FIG. 11), can be in a range from about 5% to about 25%, from about 8% to about 25%, from about 8% to about 20%, from about 10% to about 20%, from about 10% to about 18%, from about 12% to about 18%, from about 12% to about 16%, from about 14% to about 16%, or any range or subrange therebetween. In aspects, an initial first depth of layer of one or more alkali-metal ions associated with the initial first compressive stress region and/or an initial second depth of layer of one or more alkali-metal ions associated with the initial second compressive stress region, as a percentage of the substrate thickness 207 (see FIG. 11), can be about 5% or more, 10% or more, about 12% or more, about 14% or more, about 25% or less, about 20% or less, about 18% or less, or about 16% or less. In aspects, an initial first depth of layer of one or more alkali-metal ions associated with the initial first compressive stress region and/or an initial second depth of layer of one or more alkali-metal ions associated with the initial second compressive stress region, as a percentage of the substrate thickness 207 (see FIG. 11), can be in a range from about 5% to about 25%, from about 8% to about 25%, from about 8% to about 20%, from about 10% to about 20%, from about 10% to about 18%, from about 12% to about 18%, from about 12% to about 16%, from about 14% to about 16%, or any range or subrange therebetween. In aspects, the initial first depth of compression can be less than the first distance 219 of the resulting foldable substrate 201 and/or the initial second depth of compression can be less than the second distance 249 of the resulting foldable substrate 201, which can enable the entire initial first depth of compression and/or the second depth of compression to be removed from the central portion 281 (e.g., central region 248) of the foldable substrate 1105 during etching in step 1025. In aspects, before step 1003, the foldable substrate 1105 can be substantially unstrengthened (e.g., unstressed, not chemically strengthened, not thermally strengthened). As used herein, substantially unstrengthened refers to a substrate comprising either no depth of layer or a depth of layer in a range from 0% to about 5% of the substrate thickness.

Figure 13:
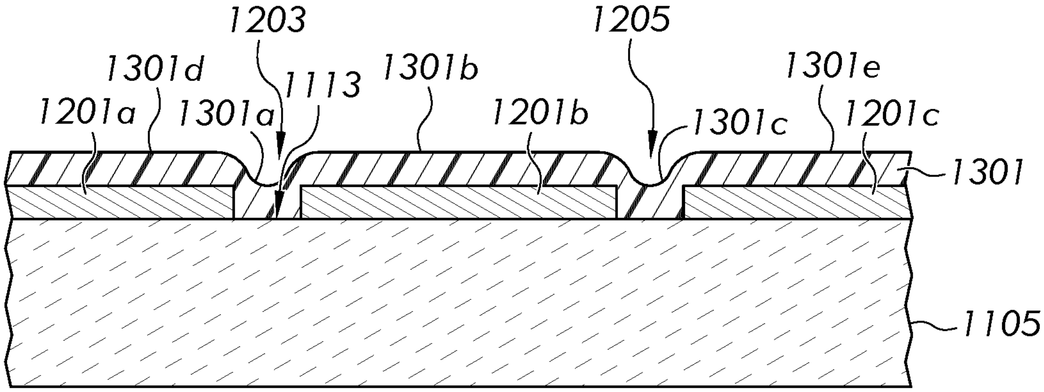
Figure 14:
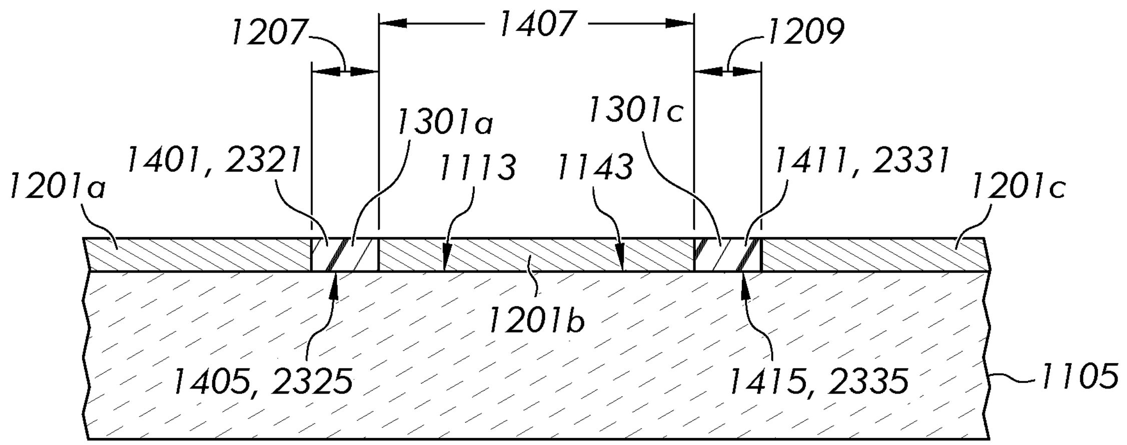
Figure 15:
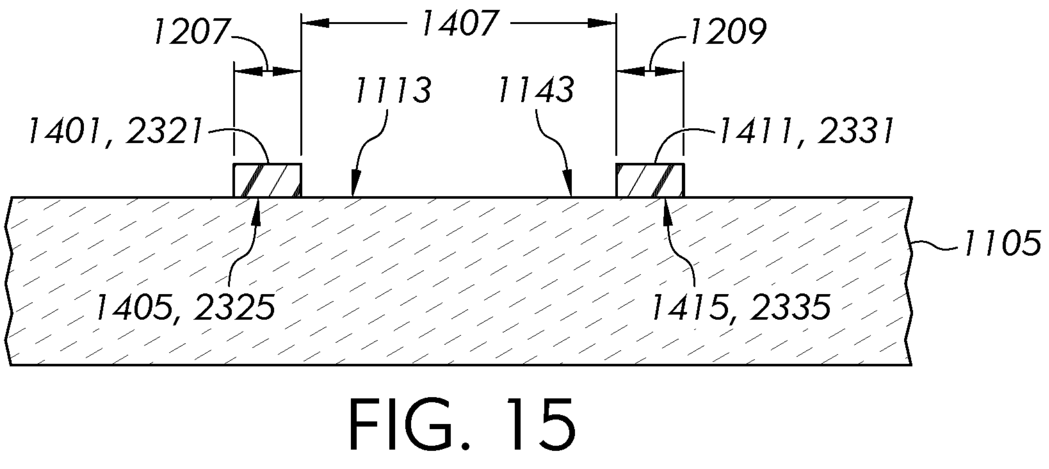
Figure 16:
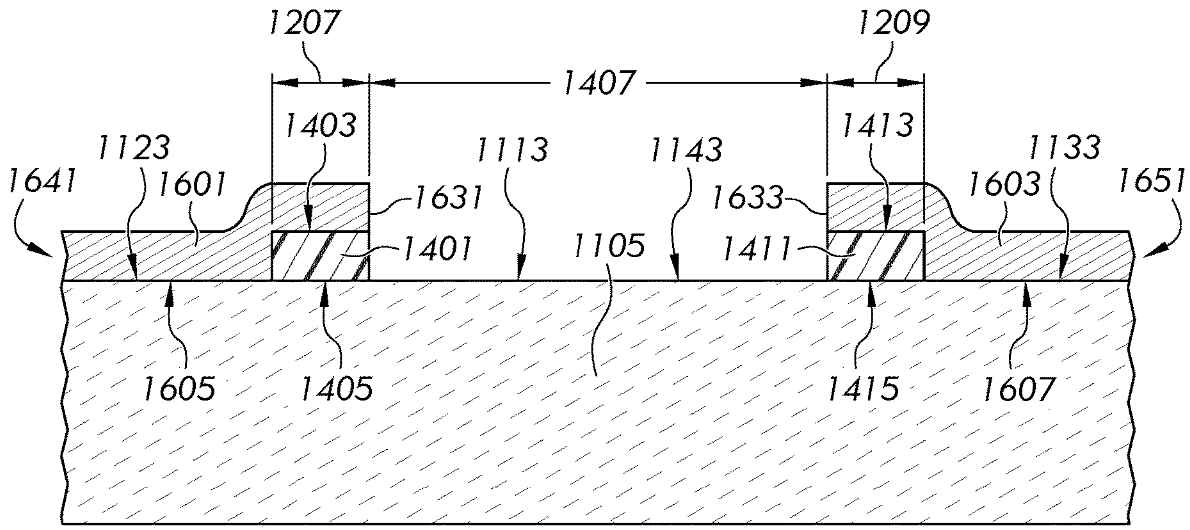
Figure 17:
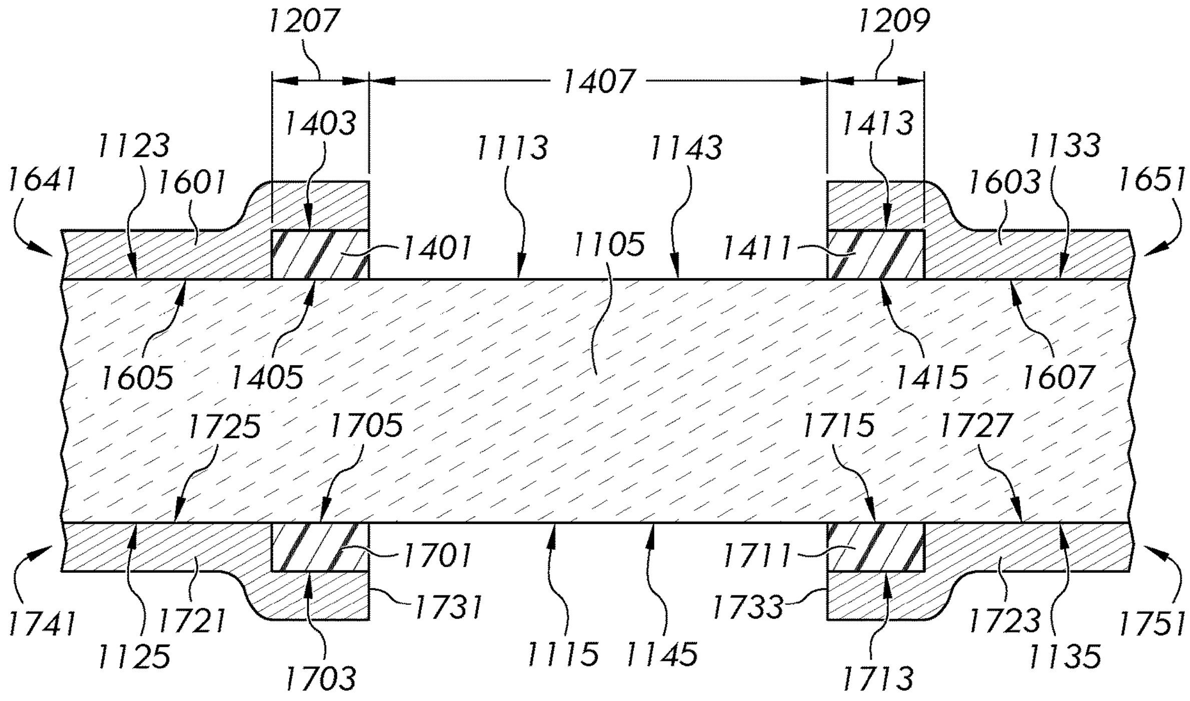

After step 1001 or 1003, as shown in FIGS. 12-17, methods can follow arrow 1002*b* to step 1005 and then follow arrow 1008 to step 1007 comprising disposing an etch mask over the initial first major surface 1113 of the foldable substrate 1105. In aspects, as shown in FIGS. 16-17, the etch mask can comprise a first portion 1641 comprising a first polymer layer 1401 and a second portion 1651 comprising a second polymer layer 1411. In aspects, as shown in FIG. 15, step 1005 can comprise disposing the first polymer layer 1401 over the initial first major surface 1113 and disposing the second polymer layer 1411 over the initial first major surface 1113. In further aspects, as shown, the first polymer layer 1401 can comprise a second contact surface 1405 facing the initial first major surface 1113. In even further aspects, as shown, the first polymer layer 1401 can comprise a first width 1207. In further aspects, as shown, the second polymer layer 1411 can comprise a fourth contact surface 1415 facing the initial first major surface 1113. In even further aspects, as shown, the second polymer layer 1411 can comprise a second width 1209.

In aspects, as shown in FIG. 15, the first polymer layer 1401 and the second polymer layer 1411 can comprise the first width 1207 and the second width 1209, respectively, when the polymer layers are disposed on the initial first major surface 1113. In further aspects, the first width 1207 and/or the second width 1209 can be about 0.7 mm or more, about 0.8 mm or more, about 0.9 mm or more, about 1 mm or more, about 3 mm or less, about 2 mm or less, about 1.5 mm or less, or about 1 mm or less. In further aspects, the first width 1207 and/or the second width 1209 can be in a range from about 0.7 mm to about 3 mm, from about 0.7 mm to about 2 mm, from about 0.8 mm to about 2 mm, from about 0.8 mm to about 1.5 mm, from about 0.9 mm to about 1.5 mm, from about 0.9 mm to about 1 mm. In further aspects, the first width 1207 and/or the second width 1209 can be in a range from about 0.7 mm to about 1.5 mm, from about 0.7 mm to about 1 mm, or any range or subrange therebetween. In further aspects, the first width 1207 can be substantially equal to the second width 1209. Difficulty can be encountered in handling and accurately placing polymer layers when the width of the polymer layers is less than 0.7 mm. In further aspects, the first width 1207 can be equal to or less than the first transition width 214 of the first transition region 212 of the resulting foldable apparatus (see FIGS. 2-4). In further aspects, the second width 1209 can be equal to or less than the second transition width 216 of the second transition region 218 of the resulting foldable apparatus (see FIGS. 2-4).

Figure 12:
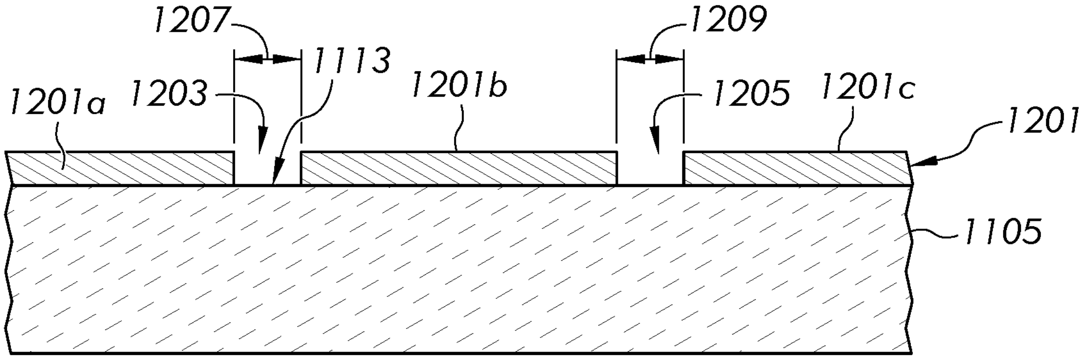

In aspects, as shown in FIGS. 12-15, the first polymer layer 1401 and the second polymer layer 1411 can be disposed on the initial first major surface 1113 in step 1005 by trimming a polymer sheet 1301 (see FIG. 13). In further aspects, as shown in FIG. 12, step 1005 can comprise disposing a first tape 1201 over the initial first major surface 1113 from which a first section comprising the first width 1207 is removed to create a first space 1203 and from which as second section comprising the second width 1209 is removed to create a second space 1205. Consequently, the first tape 1201 can be segmented into three portions 1201*a-c* with the first space 1203 separating the first portion 1201*a* and the second portion 1201*b* and with the second space 1205 separating the second portion 1201*b* and the third portion 1201*c*. In aspects, as shown in FIG. 13, step 1005 can further comprise disposing a polymer sheet 1301 over the initial first major surface 1113 with a first portion 1301*a* disposed in the first space 1203 and a second portion 1301*b* disposed over a portion of the first tape (e.g., second portion 1201*b*). In further aspects, a fourth portion 1301*d* of the polymer sheet 1301 can be disposed over the first portion 1201*a* of the first tape, and the fifth portion 1301*e* of the polymer sheet 1301 can be disposed over the third portion 1201*c* of the first tape. In further aspects, as shown, the first portion 1301*a* of the polymer sheet 1301 can contact the initial first major surface 1113. In further aspects, as shown, the polymer sheet 1301 can comprise a third portion 1301*c* disposed in the second space 1205, and the third portion 1301*c* can contact the initial first major surface 1113. In aspects, as shown from FIG. 13 to FIG. 14, step 1005 can further comprise removing the second portion 1301*b* of the polymer sheet 1301. In further aspects, as shown, the fourth portion 1301*d* and the fifth portion 1301*e* can be removed. Consequently, the portions (e.g., the first portion 1301*a* and the third portion 1301*c*) positioned in the first space 1203 and the second space 1205 are kept while other portions of the polymer sheet 1301 are removed. In further aspects, as shown in FIG. 14, the first portion 1301*a* of the polymer sheet 1301 can correspond to the first polymer layer 1401, and/or the third portion 1301*c* of the polymer sheet 1301 can correspond to the second polymer layer 1411. In aspects, as shown from FIG. 14 to FIG. 15, step 1005 can further comprise removing the first tape comprising the first portion 1201*a*, the second portion 1201*b*, and the third portion 1201*c*. Using the first tape to form the first polymer layer and/or the second polymer layer from the polymer sheet can be used to accurately size and place polymer layers on the foldable substrate.

In aspects, for example using the methods shown in FIGS. 12-15, the first width 1207 and/or the second width 1209 can be about 100 μm or more, about 150 μm more, about 200 μm or more, about 300 μm or more, about 400 μm or more, about 3 mm or less, about 2 mm or less, about 1 mm or less, about 700 μm or less, about 600 μm or less, about 500 μm or less, or about 450 μm or less. In aspects, for example using the methods shown in FIGS. 12-15, the first width 1207 and/or the second width 1209 can be in a range from about 100 μm to about 3 mm, from about 100 μm to about 2 mm, from about 100 μm to about 1 mm, from about 150 μm to about 1 mm, from about 150 μm to about 700 μm, from about 200 μm to about 700 μm, from about 200 μm to about 600 μm, from about 300 μm to about 600 μm, from about 300 μm to about 500 μm, from about 400 μm to about 500 μm, or any range or subrange therebetween. In aspects, for example using the methods shown in FIGS. 12-15, the first width 1207 and/or the second width 1209 can be in a range from about 100 to about 700 μm, from about 100 μm to about 600 μm, from about 100 μm to about 500 μm, from about 150 μm to about 500 μm, from about 200 μm to about 500 μm, from about 300 μm to about 500 μm, or any range or subrange therebetween. In further aspects, the first width 1207 and/or the second width 1209 can be within one or more of the ranges discussed above for the first width 1207 and/or the second width 1209 in reference to FIG. 15. In further aspects, the first width 1207 can be substantially equal to the second width 1209.

In aspects, the first polymer layer 1401 and/or the second polymer layer 1411 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of polyolefins include low molecular weight polyethylene (LDPE), high molecular weight polyethylene (HDPE), ultrahigh molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene). An exemplary aspect of a polymer for the first polymer layer 1401 and/or the second polymer layer 1411 is poly(ethylene terephthalate). In aspects, there may not be an adhesive layer of the first polymer layer 1401 and/or the second polymer layer 1411 contacting the initial first major surface 1113 of the foldable substrate 1105.

After step 1005, as shown in FIGS. 16-17, methods can proceed to step 1009 comprising disposing a first barrier layer 1601 over the initial first major surface 1113 and disposing a second barrier layer 1603 over the initial first major surface 1113. In further aspects, as shown, a portion of the first barrier layer 1601 and/or the second barrier layer 1603 can contact the initial first major surface 1113. In even further aspects, the first barrier layer 1601 and/or the second barrier layer 1603 can be at least partially adhered to the initial first major surface 1113. As used herein, a first layer is partially adhered to a second layer if a portion of the first layer is adhered to the second layer but an entire surface of the first layer is not necessarily adhered to the second layer. For example, a first surface area 1605 of the first barrier layer 1601 can contact and/or be adhered to a portion of the initial first major surface 1113 comprising the first surface area 1123, and/or a second surface area 1607 of the second barrier layer 1603 can contact and/or be adhered to a portion of the initial first major surface 1113 comprising the third surface area 1133.

In further aspects, as shown in FIGS. 16-17, the first portion 1641 can comprise the first polymer layer 1401 positioned between the first barrier layer 1601 and the initial first major surface 1113. In even further aspects, a first surface area 1403 of the first polymer layer 1401 can contact and/or be adhered to the first barrier layer 1601 (e.g., first surface area 1605). In even further aspects, the first polymer layer 1401 can be positioned at a first peripheral portion 1631 of the first barrier layer 1601. For example, as shown, an inner peripheral surface of the first polymer layer 1401 can be flush with the first peripheral portion 1631 of the first barrier layer 1601. For example, as shown, the first peripheral portion 1631 of the first barrier layer 1601 can be the portion of the first barrier layer 1601 closest to the second barrier layer 1603. In further aspects, as shown in FIGS. 16-17, the second portion 1651 can comprise the second polymer layer 1411 positioned between the second barrier layer 1603 and the first major surface. In even further aspects, a third contact surface 1413 of the second polymer layer 1411 can contact and/or be adhered to the second barrier layer 1603 (e.g., second surface area 1607). In even further aspects, the second polymer layer 1411 can be positioned at a second peripheral portion 1633 of the second barrier layer 1603. For example, as shown, the inner peripheral surface of the second polymer layer 1411 can be flush with the second peripheral portion 1633 of the second barrier layer 1603. For example, as shown, the second peripheral portion 1633 of the second barrier layer 1603 can be the portion of the second barrier layer 1603 closest to the first barrier layer 1601 (e.g., first peripheral portion 1631).

In aspects, as shown in FIGS. 16-17, a minimum distance 1407 can be defined between the first peripheral portion 1631 and the second peripheral portion 1633 as a minimum distance between the first polymer layer 1401 and the second polymer layer 1411. In further aspects, the minimum distance 1407 can be about 1 mm or more, about 2 mm or more, about 5 mm or more, about 10 mm or more, about 50 mm or less, about 40 mm or less, about 30 mm or less, or about 20 mm or less. In further aspects, the minimum distance 1407 can be in a range from about 1 mm to about 50 mm, from about 1 mm to about 40 mm, from about 2 mm to about 40 mm, from about 2 mm to about 30 mm, from about 5 mm to about 30 mm, from about 5 mm to about 20 mm, from about 10 mm to about 20 mm, or any range or subrange therebetween. In further aspects, the minimum distance 1407 can be within one or more of the ranges discussed above for the width 287 of the central portion 281, for example, in terms of absolute distance and/or as a multiple of the minimum parallel plate distance. In further aspects, the minimum distance 1407 can be less than the width 287 of the central portion 281 of the resulting foldable apparatus (see FIGS. 2 and 4). In further aspects, the minimum distance 1407 can be substantially equal to the width 210 of the first central surface area 213 (e.g., central region 248).

In aspects, the first barrier layer 1601 and/or the second barrier layer 1603 can comprise a polymeric tape, for example, comprising a polymeric film and an adhesive film. In further aspects, the polymeric film can comprise one or more of the materials discussed above for the first polymer layer 1401. An exemplary aspect of the polymeric film is polyimide. In further aspects, the adhesive film can comprise a pressure-sensitive adhesive. In further aspects, the adhesive film can comprise a silicone-based polymer, an acrylate-based polymer, an epoxy-based polymer, a polyimide-based material, or a polyurethane. In even further aspects, the adhesive film can comprise an ethylene acid copolymer. An exemplary aspect of an ethylene acid copolymer includes SURLYN available from Dow (e.g., Surlyn PC-2000, Surlyn 8940, Surlyn 8150). Examples of epoxies include bisphenol-based epoxy resins, novolac-based epoxies, cycloaliphatic-based epoxies, and glycidylamine-based epoxies. An exemplary aspect of the adhesive film is a silicone-based polymer (e.g., silicone). Consequently, an exemplary aspect of the first barrier layer 1601 and/or the second barrier layer 1603 is a polymeric tape comprising a polymeric film comprising a polyimide and an adhesive film comprises a silicone. The first barrier layer 1601 and the second barrier layer 1603 is resistant to an etchant (e.g., acid) that can be used to etch the foldable substrate. In aspects, although not shown, the barrier layers (e.g., first barrier layer 1601, second barrier layer 1603) can be adhered to the foldable substrate 1105 (e.g., initial first major surface 1113) through an adhesive layer of the corresponding barrier layer. In aspects, although not shown, the barrier layers (e.g., first barrier layer 1601, second barrier layer 1603) can be adhered to the corresponding polymer layer (e.g., first polymer layer 1401, second polymer layer 1411) by an adhesive layer of the corresponding barrier layer and/or an adhesive layer of the corresponding polymer layer, for example, Maxi 689BL-003 (Maxi Adhesive Products, Inc.) or JVCC EGPF-01 (J.V. Converting Company, Inc.).

In aspects, as shown in FIG. 17, steps 1005 and 1007 can further comprise disposing a third portion 1741 over the initial second major surface 1115 and/or disposing a fourth portion 1751 over the initial second major surface 1115. In further aspects, as shown, the third portion 1741 can comprise a third polymer layer 1701 with a third width. In even further aspects, the third width can be within one or more of the ranges discussed above for the first width 1207 of the first polymer layer 1401. In still further aspects, the third width can be substantially equal to the first width 1207. In even further aspects, the third polymer layer 1701 can comprise the third width before it is disposed over the initial second major surface 1115. In even further aspects, the third polymer layer 1701 can be formed from a polymer sheet analogous to or identical to the portion of step 1005 discussed above with reference to FIGS. 12-14. In even further aspects, a sixth contact surface 1705 of the third polymer layer 1701 can contact a portion of the initial second major surface 1115 comprising the second surface area 1125. In even further aspects, as shown, the third portion 1741 can comprise a third barrier layer 1721 disposed over the initial second major surface 1115. In still further aspects, the third polymer layer 1701 can be positioned between the third barrier layer 1721 and the initial second major surface 1115. In even further aspects, at least a portion of a third surface area 1725 of the third barrier layer 1721 can contact and/or be adhered to the initial second major surface 1115 comprising the second surface area 1125. In even further aspects, a fifth contact surface 1703 of the third polymer layer 1701 can contact and/or be adhered to the third barrier layer 1721 (e.g., third surface area 1725). In even further aspects, the third polymer layer 1701 can be positioned at a third peripheral portion 1731 of the third barrier layer 1721. For example, as shown, an inner peripheral surface of the third polymer layer 1701 can be flush with the third peripheral portion 1731 of the third barrier layer 1721. In further aspects, as shown, the third portion 1741 can be a mirror image of the first portion 1641.

In further aspects, as shown in FIG. 17, the fourth portion 1751 can comprise a fourth polymer layer 1711 with a fourth width. In even further aspects, the fourth width can be within one or more of the ranges discussed above for the first width 1207 of the first polymer layer 1401. In still further aspects, the third width can be substantially equal to the first width 1207 and/or the second width 1209. In even further aspects, the fourth polymer layer 1711 can comprise the fourth width before it is disposed over the initial second major surface 1115. In even further aspects, the fourth polymer layer 1711 can be formed from a polymer sheet analogous to or identical to the portion of step 1005 discussed above with reference to FIGS. 12-14. In even further aspects, an eighth contact surface 1715 of the fourth polymer layer 1711 can contact a portion of the initial second major surface 1115 comprising the fourth surface area 1727. In even further aspects, as shown, the fourth portion 1751 can comprise a fourth barrier layer 1723 disposed over the initial second major surface 1115. In still further aspects, the fourth polymer layer 1711 can be positioned between the fourth barrier layer 1723 and the initial second major surface 1115. In even further aspects, at least a portion of a fourth surface area 1727 of the fourth barrier layer 1723 can contact and/or be adhered to the initial second major surface 1115 comprising the fourth surface area 1135. In even further aspects, a seventh contact surface 1713 of the fourth polymer layer 1711 can contact and/or be adhered to the fourth barrier layer 1723 (e.g., fourth surface area 1727). In even further aspects, the fourth polymer layer 1711 can be positioned at a fourth peripheral portion 1733 of the fourth barrier layer 1723. For example, as shown, an inner peripheral surface of the fourth polymer layer 1711 can be flush with the fourth peripheral portion 1733 of the fourth barrier layer 1723. In further aspects, as shown, the fourth portion 1751 can be a mirror image of the second portion 1651. In even further aspects, a minimum distance between the third portion 1741 and the fourth portion 1751 can be within one or more of the ranges discussed above for the minimum distance 1407. In still further aspects, the minimum distance between the third portion 1741 and the fourth portion 1751 can be substantially equal to the minimum distance 1407.

Figure 22:
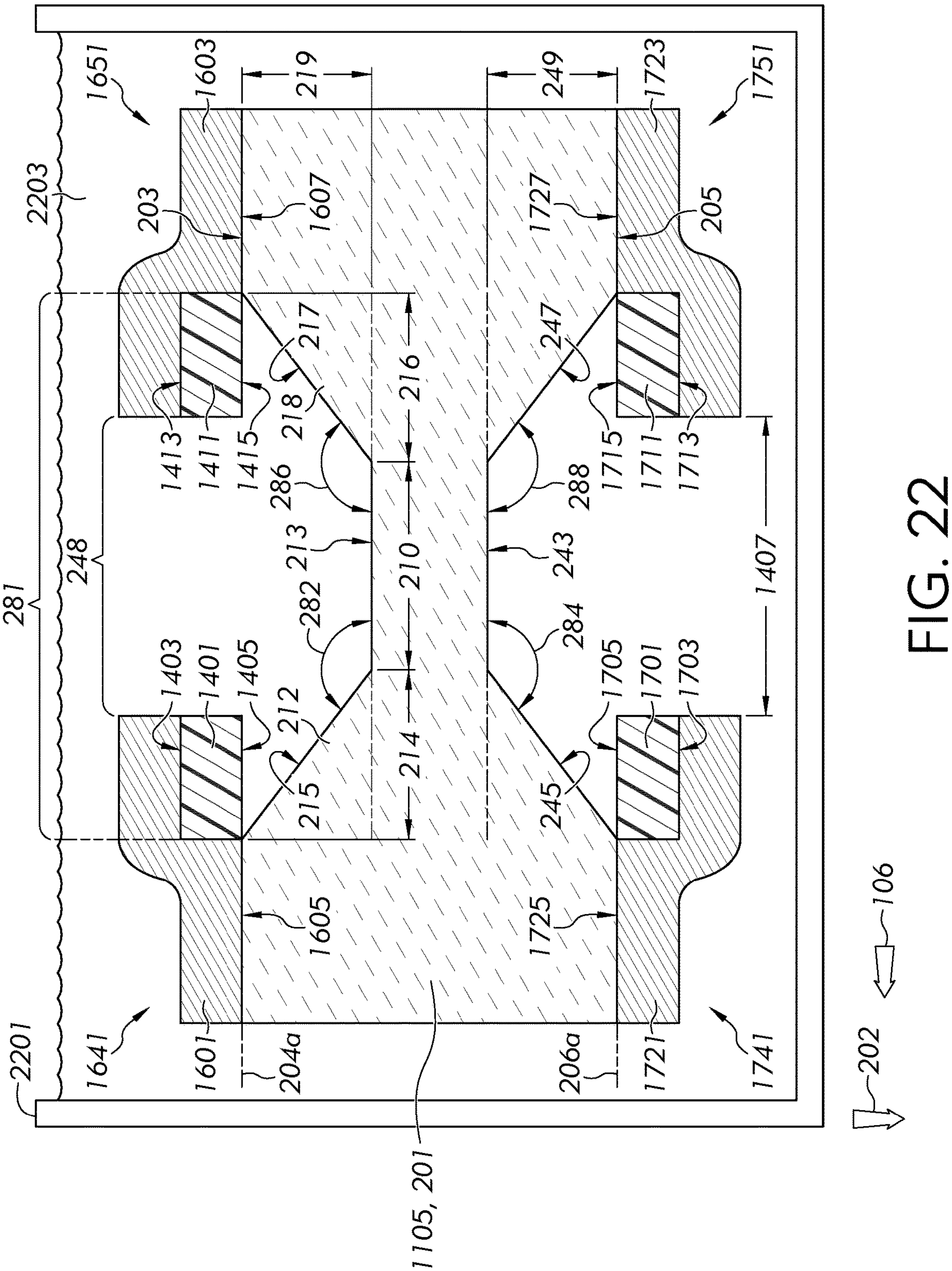

After step 1009, as shown in FIG. 22, methods can proceed to step 1025 comprising etching the foldable substrate 1105 by contacting a central region 248 of a central portion 281 of the foldable substrate 1105 that is between the first portion 1641 of the etch mask and the second portion 1651 of the etch mask to form the foldable substrate 201. As used herein, a surface is positioned between two portions if the surface is laterally positioned between the two portions, which allows for a displacement of the surface perpendicular to the direction of a minimum distance between the two portions. For example, as shown in FIG. 22, all of the central region 248 of the foldable substrate 201 is positioned between the first portion 1641 of the etch mask and the second portion 1651 of the etch mask even though the central region 248 is displaced from the first portion 1641 of the etch mask and the second portion 1651 of the etch mask in the direction 202 of the thickness because the direction 202 of the thickness is perpendicular to a direction (e.g., direction 106) of the minimum distance 1407 between the first portion 1641 of the etch mask and the second portion 1651 of the etch mask and the central region 248 is laterally positioned (e.g., in the direction 106) between the first portion 1641 of the etch mask and the second portion 1651 of the etch mask. In aspects, the etching can remove a portion of the foldable substrate to form the first central surface area 213 that is recessed from the first major surface 203 (e.g., first plane 204*a*) by the first distance 219. In further aspects, the etching can remove a portion of the foldable substrate to form the first transition surface area 215 of the first transition region 212. In further aspects, the etching can remove a portion of the foldable substrate to form the third transition surface area 217 of the second transition region 218. In aspects, the first transition width 214 of the first transition region 212 can be greater than or equal to the first width 1207 of the first polymer layer 1401. In aspects, the second transition width 216 of the second transition region 218 can be greater than or equal to the second width 1209 of the second polymer layer 1411.

In aspects, as shown in FIG. 22, step 1025 can further comprise etching the foldable substrate 1105 by contacting a central region 248 of a central portion 281 of the foldable substrate 1105 that is between the third portion 1741 of the etch mask and the fourth portion 1751 of the etch mask to form the foldable substrate 201. In aspects, the etching can remove a portion of the foldable substrate to form the second central surface area 243 that is recessed from the second major surface 205 (e.g., second plane 206*a*) by the second distance 249. In further aspects, the etching can remove a portion of the foldable substrate to form the second transition surface area 245 of the first transition region 212. In further aspects, the etching can remove a portion of the foldable substrate to form the fourth transition surface area 247 of the second transition region 218.

In aspects, as shown in FIG. 22, the etching of step 1025 can comprise contacting the central portion 281 (e.g., central region 248) of the foldable substrate 1105 with an etchant 2203 to form the foldable substrate 201. In further aspects, as shown, the etchant 2203 can be a liquid etchant contained in an etchant bath 2201. In even further aspects, the etchant can comprise one or more mineral acids (e.g., HCl, HF, $H_2SO_4$, $HNO_3$). Without wishing to be bound by theory, the polymer layer can be deflected away from the foldable substrate during etching to enable the etchant access to an additional portion of the foldable substrate that the polymer layer could otherwise be in contact with. While the etchant can contact the additional portion of the foldable substrate by deflection of the polymer layer, diffusion of the etchant to the additional portion is limited, which limits the extent of etching of the additional portion, producing the transition region.

In aspects, step 1025 can further comprise removing the etch mask (e.g., first portion 1641, second portion 1651, third portion 1741, fourth portion 1751). In further aspects, removing the etching mask can comprise lifting and/or peeling the etch mask from the foldable substrate. In further aspects, removing the etching mask can comprise rinsing the foldable substrate with deionized water, a neutral detergent, an alkaline detergent, and/or an alkaline solution. Rinsing the foldable substrate can remove any residue from the material adhering the etch mask to the foldable substrate.

Figure 31:
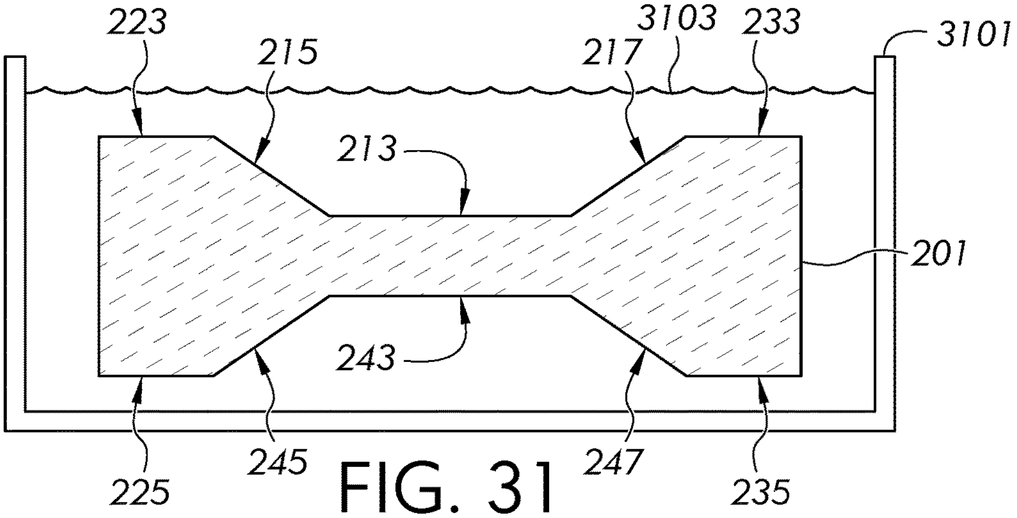

After step 1025, as shown in FIG. 31, methods can proceed to step 1027 comprising chemically strengthening the foldable substrate 201. In aspects, as shown, chemically strengthening the foldable substrate 201 can comprise contacting at least a portion of a foldable substrate 201 with a salt solution 3103 in a salt bath 3101 comprising potassium cations and/or sodium cations. In further aspects, a composition of the salt solution 3103 can comprise one or more of the materials discussed above with reference to salt solution 1103. In further aspects, a composition of the salt solution 3103 can be the same as the salt solution 1103 discussed above. In further aspects, a temperature of the salt solution can be within one or more of the ranges discussed above with reference to the temperature of the salt solution 1103. In further aspects, a time that the salt solution contacts the foldable substrate can be within one or more of the ranges discussed above with reference to the time that the salt solution 1103 contacts the foldable substrate 1105. At the end of step 1027, the foldable substrate 201 can comprise the first compressive stress region, the second compressive stress region, the third compressive stress region, the fourth compressive stress region, the first central compressive stress region, and/or the second central compressive stress region can comprise a corresponding maximum compressive stress within one or more of the ranges discussed above for the corresponding maximum compress stress of the corresponding compressive stress region and/or the corresponding depth of compression can be within one or more of the ranges discussed above for the corresponding depth of compression of the corresponding compressive stress region.

Figure 32:
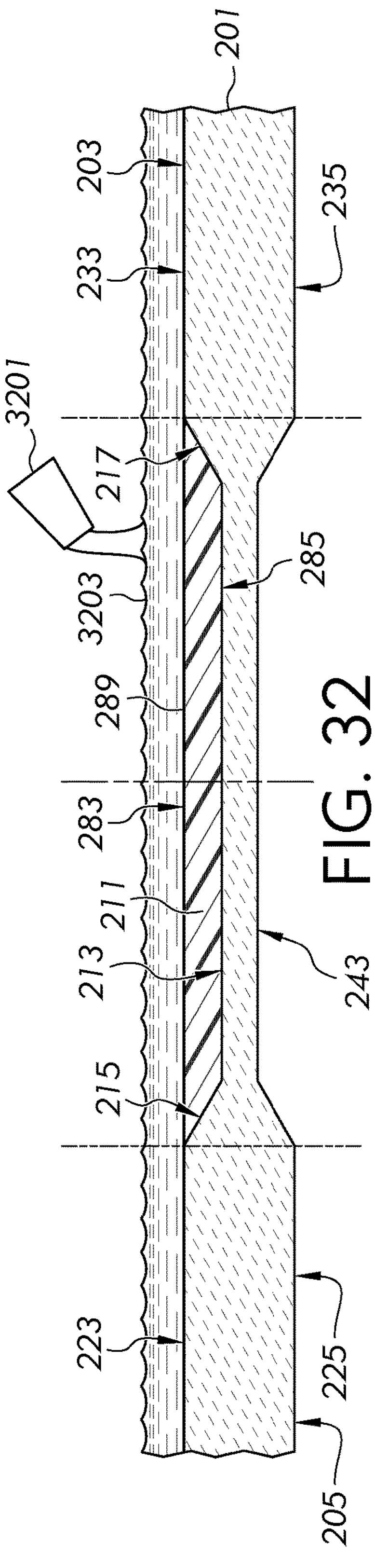
Figure 33:
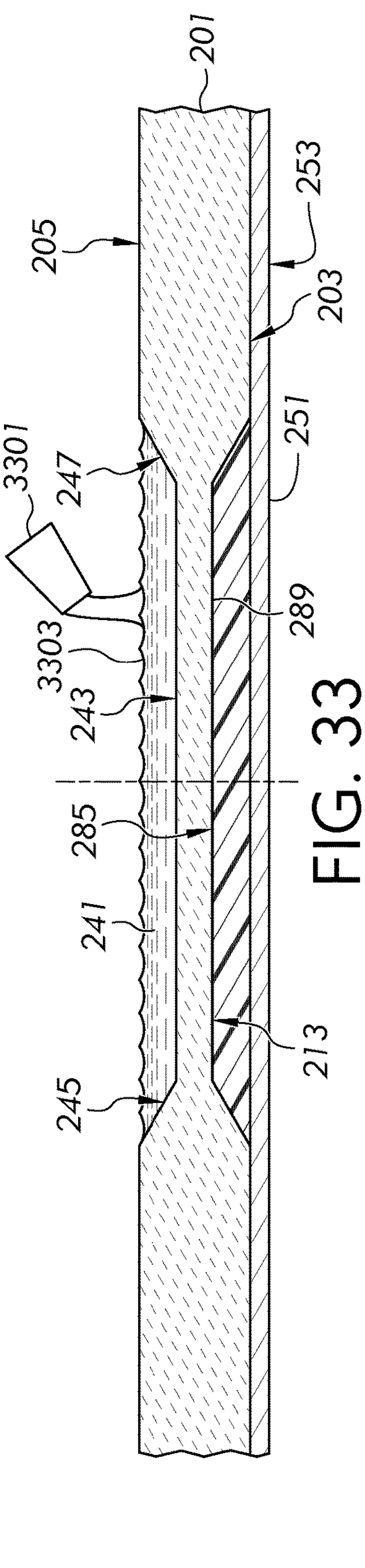
Figure 34:
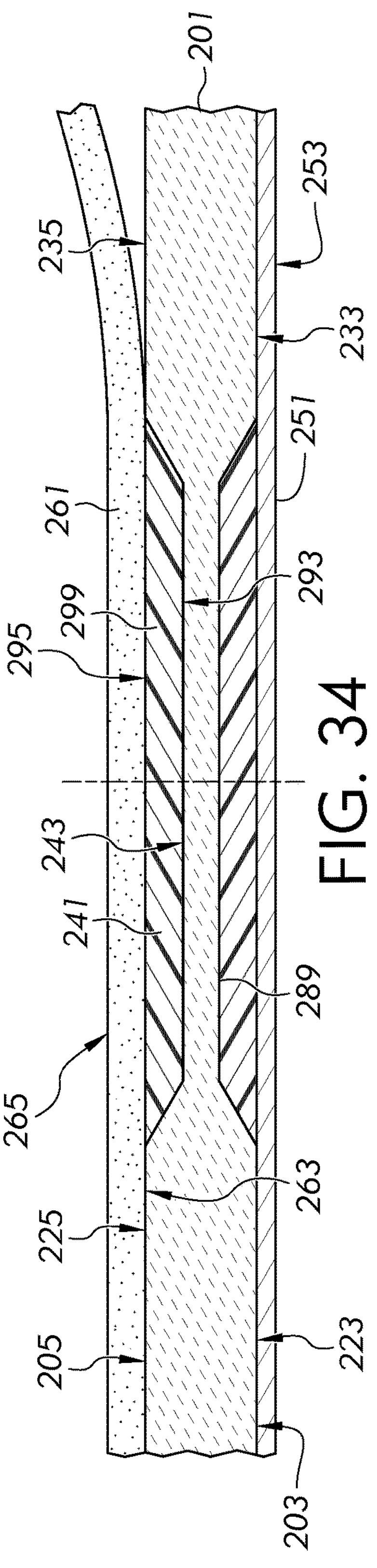

After step 1025 or 1027, as shown in FIGS. 32-34, methods can proceed to step 1029 comprising assembling the foldable apparatus. In aspects, as shown in FIGS. 32-34, step 1029 can comprise assembling the foldable apparatus by disposing a polymer-based portion (e.g., first polymer-based portion 289, second polymer-based portion 299), an adhesive layer 261, and/or a coating 251 over the foldable substrate 201. In further aspects, as shown in FIG. 32, a first polymer-based portion 289 can be disposed in the first recess 211 and/or over the first central surface area 213. In further aspects, as shown in FIGS. 32-33, a coating 251 can be disposed over the first major surface 203 (e.g., first surface area 223 and third surface area 233), for example, by dispensing a first liquid 3203 from a container 3201 (e.g., conduit, flexible tube, micropipette, or syringe) over the first major surface 203 that can be cured to form the coating 251. In even further aspects, the first liquid 3203 may comprise a coating precursor, a solvent, particles, nanoparticles, and/or fibers. In still further aspects, the coating precursor can comprise, without limitation, one or more of a monomer, an accelerator, a curing agent, an epoxy, and/or an acrylate. Curing the first liquid 3203 can comprise heating the first liquid 3203, irradiating the first liquid 3203 with ultraviolet (UV) radiation, and/or waiting a predetermined amount of time (e.g., from about 30 minutes to 24 hours, from about 1 hour to about 8 hours). In aspects, although not shown, the coating 251 can be disposed in the first recess 211 (e.g., fill the first recess 211) without contacting the first major surface 203 (e.g., first surface area 223, third surface area 233), for example, in place of the first polymer-based portion 289 in FIGS. 32-34. In further aspects, as shown in FIGS. 33-34, a second polymer-based portion 299 can be disposed in the second recess 241, for example, by dispensing a second liquid 3303 from a container 3301 (e.g., conduit, flexible tube, micropipette, or syringe) over the second central surface area 243 that can be cured to form the second polymer-based portion 299. Curing the second liquid 3303 can comprise heating the second liquid 3303, irradiating the second liquid 3303 with ultraviolet (UV) radiation, and/or waiting a predetermined amount of time (e.g., from about 30 minutes to 24 hours, from about 1 hour to about 8 hours). In further aspects, as shown in FIG. 34, an adhesive layer 261 can contact the second major surface 205 (e.g., the second surface area 225 and the fourth surface area 235). For example, the adhesive layer 261 can comprise one or more sheets of an adhesive material. In aspects, there can be an integral interface between the one or more sheets comprising the adhesive layer 261, which can reduce (e.g., avoid) optical diffraction and/or optical discontinuities as light travels between the sheets since the one or more sheets can include substantially the same index of refraction. In aspects, although not shown, at least a portion of the adhesive layer can be disposed in the second recess. In aspects, a release liner (e.g., see release liner 271 in FIG. 2) or a display device may be disposed on the adhesive layer 261 (e.g., second contact surface 265). After step 1025, 1027, or 1029, methods of the disclosure according to the flow chart in FIG. 10 of making the foldable substrate and/or foldable apparatus can be complete at step 1031.

Figure 10:
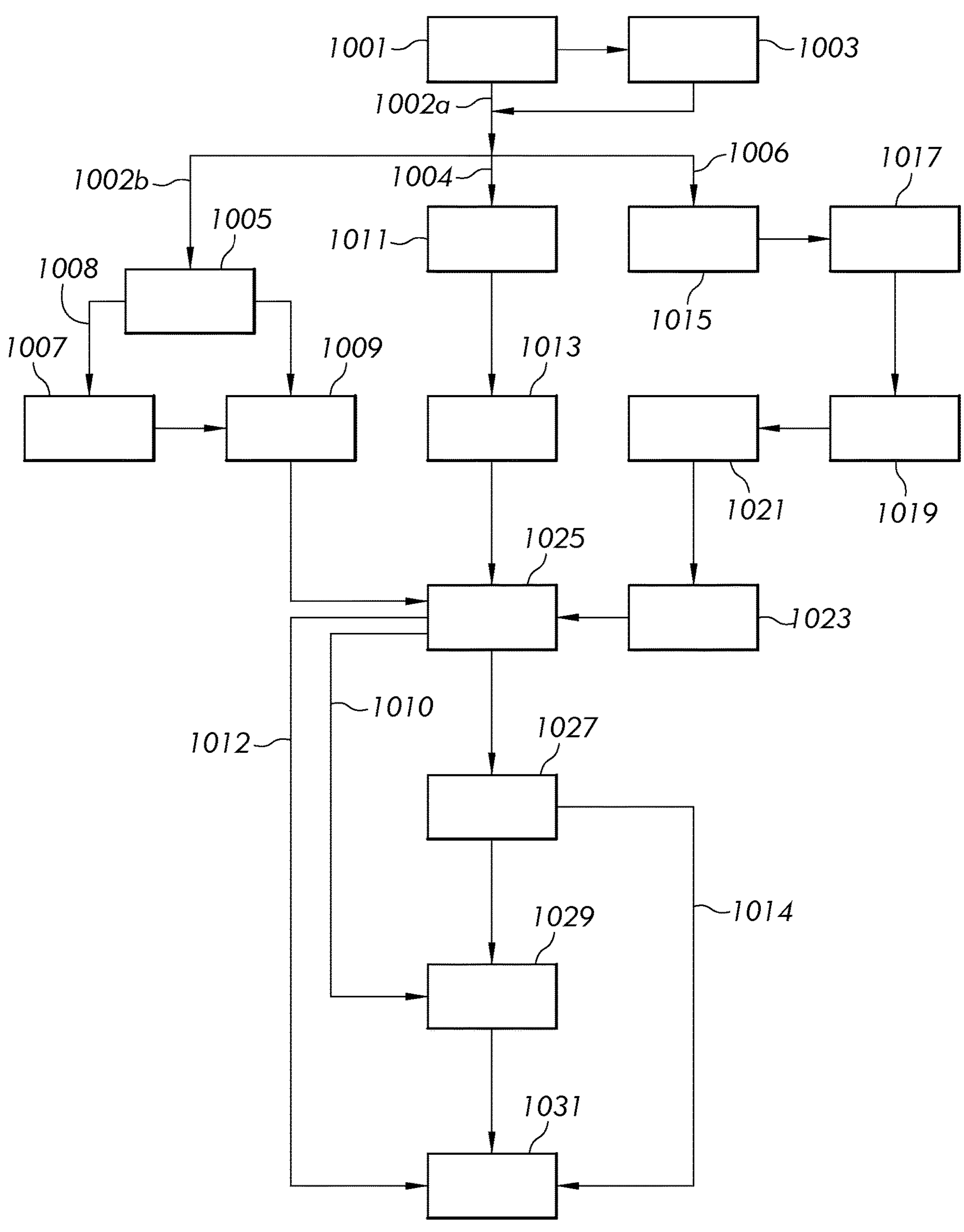
FIG. 10 is a flow chart illustrating example methods making foldable apparatus in accordance with aspects of the disclosure.
Figure 11:
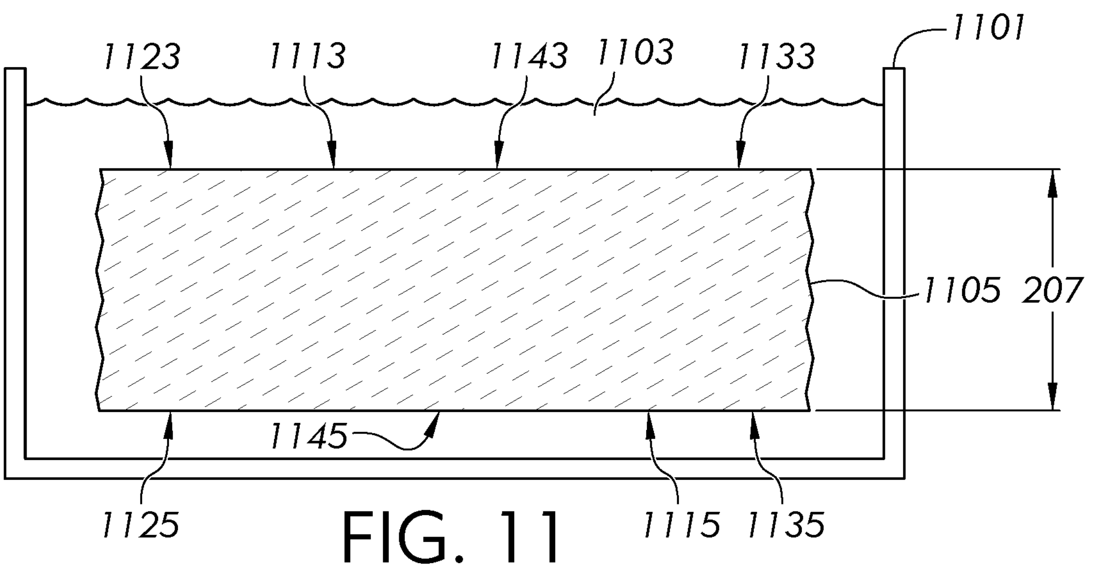
FIGS. 11-34 schematically illustrate steps in methods of making a foldable substrate and/or foldable apparatus.

In aspects, the foldable substrate 201 produced by the methods outlined in the flow chart of FIG. 10 can comprise the first average angle 282, the second average angle 284, the third average angle 286, and/or the fourth average angle 288 can be within one or more of the ranges discussed above for the corresponding average angle. In aspects, the foldable substrate 201 produced by the methods outlined in the flow chart of FIG. 10 can comprise the first transition width 214 and/or the second transition width 216 can be within one or more of the ranges discussed above for the corresponding transition width. In aspects, the foldable substrate 201 produced by the methods outlined in the flow chart of FIG. 10 can comprise a first distance 219, second distance 249, substrate thickness 207, and/or central thickness 209 within one or more of the ranges discussed above for the corresponding distance or thickness. In aspects, the foldable substrate 201 produced by the methods outlined in the flow chart of FIG. 10 can comprise the maximum fractional intensity using brightfield transmission, the difference between the maximum fractional intensity and the minimum fractional intensity using brightfield transmission, the maximum fractional intensity using darkfield reflection, and/or the difference between the maximum fractional intensity and the minimum fractional intensity using darkfield reflection can be within one or more of the ranges discussed above for the corresponding value.

In aspects, methods of making a foldable apparatus in accordance with aspects of the disclosure can proceed along steps 1001, 1003, 1005, 1009, 1025, 1027, 1029, and 1031 of the flow chart in FIG. 10 sequentially, as discussed above. In aspects, arrow **1002*a* to arrow 1002*b* can be followed from step 1001 to step 1005, for example, when the foldable substrate 1105 comprises one or more compressive stress regions after step 1001. In aspects, arrow 1010 can be followed from step 1025 to step 1029, for example, when the foldable substrate 201 comprises one or more compressive stress regions and/or further processing is to comprise chemically strengthening the foldable substrate. In aspects, arrow 1012 can be followed from step 1025 to step 1031, for example, when the foldable substrate 201 is the product of the method and/or the foldable substrate 201 is to be further processed after step 1031. In aspects, arrow 1014 can be followed from step 1027 to step 1031, for example, when the foldable substrate 201 is the product of the method. In aspects, the initial first major surface 1113 and the initial second major surface 1115 can be etched (e.g., see FIG. 22). For example, as shown in FIG. 17, the etch mask can comprise the first portion 1641 and the second portion 1651 disposed over the initial first major surface 1113 in addition to the third portion 1741 and the fourth portion 1751 disposed over the initial second major surface 1115. In further aspects, the initial first major surface 1113 and the initial second major surface 1115 can be etched (e.g., simultaneously) (see FIG. 22) to form the first central surface area 213 and the second central surface area 243, the first transition surface area 215, the second transition surface area 245, the third transition surface area 217 and/or the fourth transition surface area 247. In aspects, only the initial first major surface 1113 can be etched, for example, using the etch mask shown in FIG. 16 to produce a foldable substrate resembling the foldable substrate 201 of the foldable apparatus 401 shown in FIG. 4**. Any of the above options may be combined to make a foldable apparatus in accordance with aspects of the disclosure.

Example aspects of making the foldable apparatus 101, 301, 401, 501, and/or 701 and/or foldable substrate 201 illustrated in FIGS. 2-4 and 6-7 will now be discussed with reference to FIGS. 11-15, 23-26, and 31-34 and the flow chart in FIG. 10. In a first step 1001 of methods of the disclosure, methods can start with providing a foldable substrate 1105 (see FIGS. 11-12). In step 1001, the foldable substrate 1105 can be provided through any of the methods discussed above with reference to step 1001 and the foldable substrate can comprise the properties discussed above for the foldable substrate 1105 with reference to step 1001.

After step 1001, as shown in FIG. 11, methods can proceed to step 1003 comprising initially chemically strengthening the foldable substrate 1105. In aspects, the foldable substrate 1105 can exist in a substantially unstrengthened state (i.e., be substantially unstrengthened) before the chemically strengthening of step 1003. In aspects, as shown, chemically strengthening the foldable substrate 1105 can comprise contacting at least a portion of a foldable substrate 1105 comprising lithium cations and/or sodium cations with a salt bath 1001 comprising salt solution 1103. In further aspects, the salt solution 1103 can comprise any of the components discussed above with reference to step 1003. In further aspects, the temperature of the salt solution 1103 and/or the time that the foldable substrate 1105 can be in contact with the salt solution 1103 can be within one or more of the ranges discussed above for the corresponding property. Step 1003 can result in an initial first compressive stress region extending to an initial first depth of compression from the initial first major surface 1113 and/or an initial second compressive stress region extending to an initial second depth of compression from the initial second major surface 1115, where the corresponding initial depth of compression as a percentage of the substrate thickness 207 can be within one or more of the ranges discussed above in step 1003. In aspects, the initial first depth of compression can be less than the first distance 219 of the resulting foldable substrate 201 and/or the initial second depth of compression can be less than the second distance 249 of the resulting foldable substrate 201, which can enable the entire initial first depth of compression and/or the second depth of compression to be removed from the central portion 281 (e.g., central region 248) of the foldable substrate 1105 during etching in step 1025. In aspects, before step 1003, the foldable substrate 201 can be in a substantially unstrengthened state (i.e., substantially unstrengthened) (e.g., unstressed, not chemically strengthened, not thermally strengthened). As used herein, "substantially unstrengthened" and "substantially unstrengthened state" refer to a substrate comprising either no depth of layer or a depth of layer in a range from 0% to about 5% of the substrate thickness.

Figure 23:
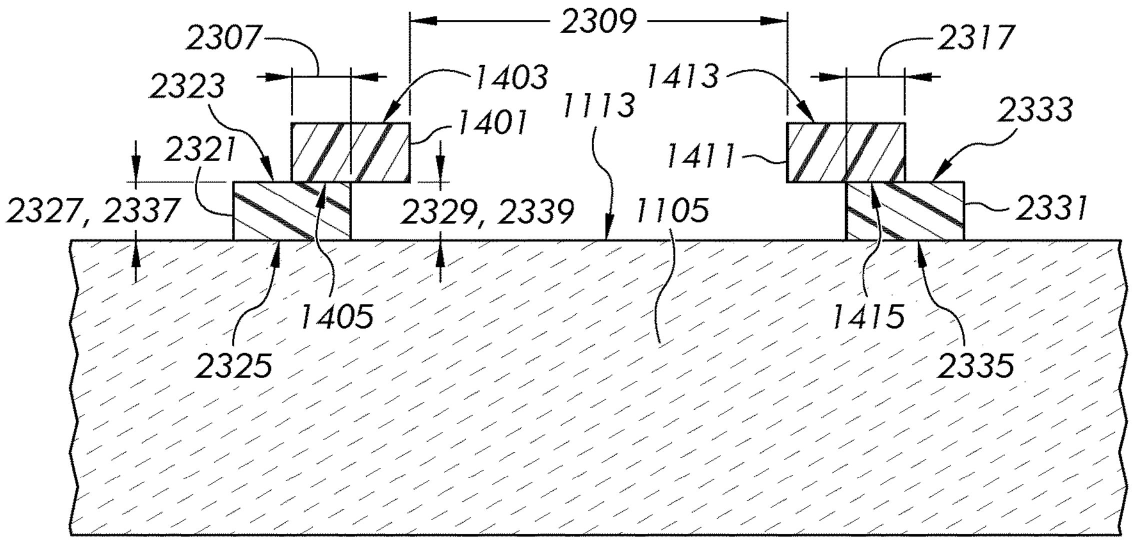
Figure 24:
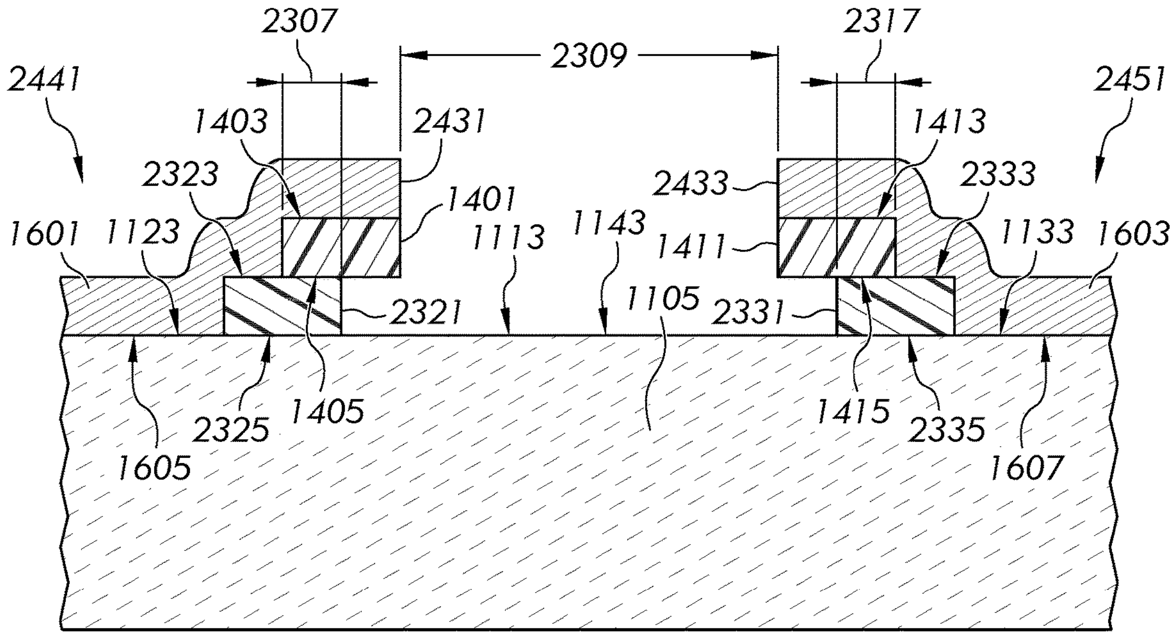
Figure 25:
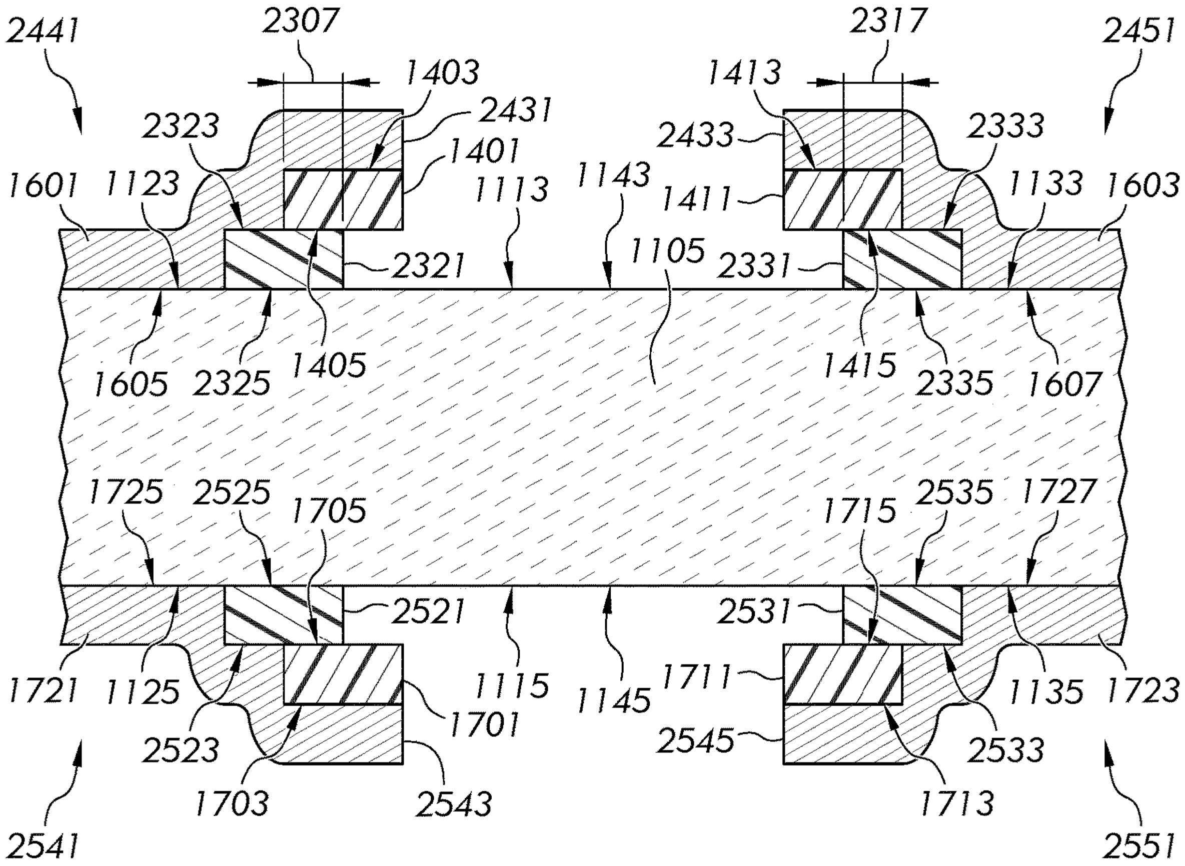

After step 1001 or 1003, as shown in FIGS. 12-15 and 23-25, methods can proceed to steps 1005, 1007, and 1009 comprising disposing an etch mask over the initial first major surface 1113 of the foldable substrate 1105. In aspects, as shown in FIGS. 24-25, the etch mask can comprise a first portion 2441 comprising the first polymer layer 1401 and a fifth polymer layer 2321, and the etch mask can comprise a second portion 2451 comprising the second polymer layer 1411 and a sixth polymer layer 2331. In further aspects, as shown in FIG. 15, step 1005 can comprise disposing the fifth polymer layer 2321 over the initial first major surface 1113 and disposing the sixth polymer layer 2331 over the initial first major surface 1113. In even further aspects, as discussed above for step 1005 for the first polymer layer 1401 and the second polymer layer 1411, the fifth polymer layer 2321 and/or the sixth polymer layer 2331 can comprise the first width 1207 and/or the second width 1209, respectively, before being disposed over the initial first major surface 1113. In further aspects, the first width 1207 of the fifth polymer layer 2321 and/or the second width 1209 of the sixth polymer layer 2331 can be within one or more of the ranges discussed above for the first width 1207 and/or the second width 1209. In even further aspects, as discussed above for step 1005 with reference to FIGS. 12-14 for the first polymer layer 1401 and the second polymer layer 1411, the fifth polymer layer 2321 and the sixth polymer layer 2331 can be formed from the polymer sheet 1301 positioned in a first space 1203 and a second space 1205 in between portions 1201*a-c* of the first tape 1201, respectively. In further aspects, as shown in FIG. 15, a tenth contact surface 2325 of the fifth polymer layer 2321 can face and/or contact the initial first major surface 1113. In further aspects, as shown in FIG. 15, a twelfth contact surface 2335 of the sixth polymer layer 2331 can face and/or contact the initial first major surface 1113. In further aspects, the fifth polymer layer 2321 and/or the sixth polymer layer 2331 can comprise one or more of the materials discussed above for the first polymer layer 1401 and/or the second polymer layer 1411. In aspects, there may not be an adhesive layer of the fifth polymer layer 2321 and/or the sixth polymer layer 2331 contacting the initial first major surface 1113 of the foldable substrate 1105.

In aspects, as shown in FIG. 23, the fifth polymer layer 2321 can comprise a fifth thickness 2327 and/or the sixth polymer layer 2331 can comprise a sixth thickness 2337. In further aspects, the fifth thickness 2327 and/or the sixth thickness 2337 can be about 10 μm or more, about 20 μm or more, about 50 μm or more, about 500 μm or less, about 200 μm or less, or about 100 μm or less. In further aspects, the fifth thickness 2327 and/or the sixth thickness 2337 can be in a range from about 10 μm to about 500 μm, from about 10 μm to about 200 μm, from about 20 μm to about 200 μm, from about 20 μm to about 100 μm, from about 50 μm to about 100 μm, or any range or subrange therebetween. Providing a fifth thickness and/or sixth thickness within one of the above-mentioned ranges can enable formation of a transition region by controlling access of the etchant to a portion of the foldable substrate corresponding to the gap, for example, by limiting diffusion of the etchant to the corresponding portion.

After step 1005, as shown in FIG. 23, methods can proceed to step 1007 comprising disposing the first polymer layer 1401 over the fifth polymer layer 2321 and disposing the second polymer layer 1411 over the sixth polymer layer 2331. In aspects, a width of the first polymer layer 1401 can be substantially equal to the width of the second polymer layer 1411. In aspects, a width of the first polymer layer 1401 can be substantially equal to the width of the fifth polymer layer 2321, and/or a width of the second polymer layer 1411 can be substantially equal to the width of the sixth polymer layer 2331. In aspects, as shown in FIG. 23, a portion of the second contact surface 1405 of the first polymer layer 1401 can contact a ninth surface area 2323 of the fifth polymer layer 2321. In aspects, as shown in FIG. 23, a portion of the fourth contact surface 1415 of the second polymer layer 1411 can contact an eleventh contact surface 2333 of the sixth polymer layer 2331. In aspects, as shown in FIG. 23, the first polymer layer 1401 can be separated from the initial first major surface 1113 by a first gap 2329.

In further aspects, the first gap 2329 can be substantially equal to the fifth thickness 2327 of the fifth polymer layer 2321. In aspects, as shown in FIG. 23, the second polymer layer 1411 can be separated from the initial first major surface 1113 by a second gap 2339. In further aspects, the second gap 2339 can be substantially equal to the sixth thickness 2337 of the sixth polymer layer 2331.

After step 1007, as shown in FIG. 24, methods can proceed to step 1009 comprising disposing a first barrier layer 1601 over the initial first major surface 1113 and disposing a second barrier layer 1603 over the initial first major surface 1113. In further aspects, as shown, a portion of the first barrier layer 1601 and/or the second barrier layer 1603 can contact the initial first major surface 1113. In even further aspects, the first barrier layer 1601 and/or the second barrier layer 1603 can be at least partially adhered to the initial first major surface 1113. For example, a first surface area 1605 of the first barrier layer 1601 can contact and/or be adhered to a portion of the initial first major surface 1113 comprising the first surface area 1123, and/or a second surface area 1607 of the second barrier layer 1603 can contact and/or be adhered to a portion of the initial first major surface 1113 comprising the third surface area 1133. In aspects, the first barrier layer 1601 and/or the second barrier layer 1603 can comprise one or more of the materials discussed above for the materials of the first barrier layer 1601 and/or the second barrier layer 1603.

In further aspects, as shown in FIGS. 24-25, the first portion 2441 can comprise the fifth polymer layer 2321 positioned between the first polymer layer 1401 and the initial first major surface 1113. In even further aspects, as shown, the first polymer layer 1401 can be positioned between the first barrier layer 1601 and the initial first major surface 1113. In still further aspects, as shown, the first polymer layer 1401 can be positioned between the first barrier layer 1601 and the fifth polymer layer 2321. In even further aspects, a first surface area 1403 of the first polymer layer 1401 can contact and/or be adhered to the first barrier layer 1601 (e.g., first surface area 1605). In even further aspects, a ninth surface area 2323 of the fifth polymer layer 2321 can be partially adhered to the first barrier layer 1601. In even further aspects, the first polymer layer 1401 can be positioned at a first peripheral portion 2431 of the first barrier layer 1601. For example, as shown, the first peripheral portion 2431 of the first barrier layer 1601 can be the portion of the first barrier layer 1601 closest to the second barrier layer 1603. For example, as shown, an inner peripheral surface of the first polymer layer 1401 can be flush with the first peripheral portion 2431 of the first barrier layer 1601. In even further aspects, as shown, the fifth polymer layer 2321 can be recessed from the first peripheral portion 2431 (e.g., offset from the first polymer layer 1401) by a first distance 2307. In still further aspects, the first distance 2307 can be about 200 μm or more, about 500 μm or more, about 600 μm or more, about 700 μm or more, about 800 μm or more, about 3 mm or less, about 2 mm or less, about 1.5 mm or less, about 1.2 mm or less, about 1 mm or less, or about 900 μm or less. In still further aspects, the first distance 2307 that the fifth polymer layer 2321 is recessed from the first peripheral portion 2431 (e.g., offset from the first polymer layer 1401) can be from about 200 μm to about 3 mm, about 200 μm to about 2 mm, from about 500 μm to about 2 mm, from about 500 μm to about 1.5 mm, from about 600 μm to about 1.5 mm, from about 600 μm to about 1.2 mm, from about 700 μm to about 1.2 mm, from about 700 to about 1 mm, from about 800 μm to about 1 mm, from about 800 μm to about 900 μm, or any range or subrange therebetween.

In further aspects, as shown in FIGS. 24-25, the second portion 2451 can comprise the sixth polymer layer 2331 positioned between the second polymer layer 1411 and the initial first major surface 1113. In even further aspects, as shown, the second polymer layer 1411 can be positioned between the second barrier layer 1603 and the initial first major surface 1113. In still further aspects, as shown, the second polymer layer 1411 can be positioned between the second barrier layer 1603 and the sixth polymer layer 2331. In even further aspects, a third contact surface 1413 of the second polymer layer 1411 can contact and/or be adhered to the second barrier layer 1603 (e.g., second surface area 1607). In even further aspects, an eleventh contact surface 2333 of the sixth polymer layer 2331 can be at least partially adhered to the second barrier layer 1603 (e.g., second surface area 1607). In even further aspects, the second polymer layer 1411 can be positioned at a second peripheral portion 2433 of the second barrier layer 1603. For example, as shown, the second peripheral portion 2433 of the second barrier layer 1603 can be the portion of the second barrier layer 1603 closest to the first barrier layer 1601 (e.g., first peripheral portion 1631). For example, as shown, an inner peripheral surface of the first polymer layer 1401 can be flush with the first peripheral portion 2433 of the second barrier layer 1603. In even further aspects, as shown, the sixth polymer layer 2331 can be recessed from the second peripheral portion 2433 (e.g., offset from the second polymer layer 1411) by a second distance 2317. In still further aspects, the second distance 2317 can be within one or more of the ranges discussed above for the first distance 2307. In aspects, as shown in FIG. 24, a minimum distance 2309 between the first peripheral portion 2431 and the second peripheral portion 2433 (e.g., a minimum distance between the first polymer layer 1401 and the second polymer layer 1411 can be within one or more of the ranges discussed above for the minimum distance 1407.

Without wishing to be bound by theory, the gap can enable the etchant to contact a portion of the foldable substrate, but the diffusion of the etchant to the additional portion is limited, which limits the extent of etching of the additional portion, producing a transition region. In combination with the first polymer layer or the second polymer layer that can be deflected away from the foldable substrate during etching to enable the etchant access to an additional portion of the foldable substrate that the polymer layer could otherwise be in contact with, which enables a further reduced diffusion of the etchant and enabling longer transition regions.

In aspects, as shown in FIG. 25, steps 1005, 1007, and 1009 can further comprise disposing a third portion 2541 over the initial second major surface 1115 and/or disposing a fourth portion 2551 over the initial second major surface 1115. In further aspects, as shown, the third portion 2541 can comprise a third polymer layer 1701 with a third width and a seventh polymer layer 2521 with a seventh width. In even further aspects, the third width and/or the seventh width can be within one or more of the ranges discussed above for the first width 1207 of the first polymer layer 1401. In still further aspects, the third width can be substantially equal to the first width 1207, and/or the seventh width can be substantially equal to the fifth width. In even further aspects, the seventh polymer layer 2521 can comprise the third width before it is disposed over the initial second major surface 1115. In even further aspects, the seventh polymer layer 2521 can be formed from a polymer sheet analogous to or identical to the portion of step 1005 discussed above with reference to FIGS. 12-14. In even further aspects, a fourteenth contact surface 2525 of the seventh polymer layer 2521 can contact a portion of the initial second major surface 1115 comprising the second surface area 1125. In even further aspects, the third polymer layer 1701 can be disposed over the seventh polymer layer 2521 such that the seventh polymer layer 2521 is positioned between the sixth contact surface 1705 of the third polymer layer 1701 and the initial second major surface 1115. In still further aspects, the sixth contact surface 1705 of the third polymer layer 1701 can contact a thirteenth contact surface 2523 of the seventh polymer layer 2521. In even further aspects, as shown, the third portion 2541 can comprise a third barrier layer 1721 disposed over the initial second major surface 1115. In still further aspects, the third polymer layer 1701 can be positioned between the third barrier layer 1721 and the initial second major surface 1115. In even further aspects, at least a portion of a third surface area 1725 of the third barrier layer 1721 can contact and/or be adhered to the initial second major surface 1115 comprising the second surface area 1125. In even further aspects, a portion of the thirteenth contact surface 2523 of the seventh polymer layer 2521 can contact and/or be adhered to the third barrier layer 1721 (e.g., third surface area 1725). In even further aspects, a portion of the fifth contact surface 1703 of the third polymer layer 1701 can contact and/or be adhered to the third barrier layer 1721 (e.g., third surface area 1725). In even further aspects, the third polymer layer 1701 can be positioned at a third peripheral portion 2543 of the third barrier layer 1721. For example, as shown, an inner peripheral surface of the third polymer layer 1701 can be flush with the third peripheral portion 2543 of the third barrier layer 1721. In even further aspects, the seventh polymer layer 2521 can be recessed from the third peripheral portion 2543 (e.g., the third polymer layer 1701) by a distance that can be substantially equal to the first distance 2307. In further aspects, as shown, the third portion 2541 can be a mirror image of the first portion 2441.

In further aspects, as shown in FIG. 25, the fourth portion 2551 can comprise a fourth polymer layer 1711 with a fourth width and an eighth polymer layer 2531 with an eighth width. In even further aspects, the fourth width and/or the eighth width can be within one or more of the ranges discussed above for the first width 1207 of the first polymer layer 1401. In still further aspects, the fourth width can be substantially equal to the first width 1207 and/or the second width 1209, and/or the eighth width can be substantially equal to the seventh width. In even further aspects, the eighth polymer layer 2531 can comprise the eighth width before it is disposed over the initial second major surface 1115. In even further aspects, the eighth polymer layer 2531 can be formed from a polymer sheet analogous to or identical to the portion of step 1005 discussed above with reference to FIGS. 12-14. In even further aspects, a sixteenth contact surface 2535 of the eighth polymer layer 2531 can contact a portion of the initial second major surface 1115 comprising the fourth surface area 1135. In even further aspects, the fourth polymer layer 1711 can be disposed over the eighth polymer layer 2531 such that the eighth polymer layer 2531 is positioned between the eighth contact surface 1715 of the fourth polymer layer 1711 and the initial second major surface 1115. In still further aspects, the eighth contact surface 1715 of the fourth polymer layer 1711 can contact a fifteenth contact surface 2533 of the eighth polymer layer 2531. In even further aspects, as shown, the fourth portion 2551 can comprise a fourth barrier layer 1723 disposed over the initial second major surface 1115. In still further aspects, the fourth polymer layer 1711 can be positioned between the fourth barrier layer 1723 and the initial second major surface 1115. In even further aspects, at least a portion of a fourth surface area 1727 of the fourth barrier layer 1723 can contact and/or be adhered to the initial second major surface 1115 comprising the fourth surface area 1135. In even further aspects, a portion of the fifteenth contact surface 2533 of the eighth polymer layer 2531 can contact and/or be adhered to the fourth barrier layer 1723 (e.g., fourth surface area 1727). In even further aspects, a portion of the seventh contact surface 1713 of the fourth polymer layer 1711 can contact and/or be adhered to the fourth barrier layer 1723 (e.g., fourth surface area 1727). In even further aspects, the fourth polymer layer 1711 can be positioned at a fourth peripheral portion 2545 of the fourth barrier layer 1723. For example, as shown, an inner peripheral surface of the fourth polymer layer 1711 can be flush with the fourth peripheral portion 2545 of the fourth barrier layer 2545. In even further aspects, the eighth polymer layer 2531 can be recessed from the fourth peripheral portion 2545 (e.g., the fourth polymer layer 1711) by the second distance 2317 that can be substantially equal to the first distance 2307. In further aspects, as shown, the fourth portion 2551 can be a mirror image of the second portion 2451. In even further aspects, a minimum distance between the third portion 2541 and the fourth portion 2551 can be within one or more of the ranges discussed above for the minimum distance 1407. In still further aspects, the minimum distance between the third portion 2541 and the fourth portion 2551 can be substantially equal to the minimum distance 1407.

Figure 26:
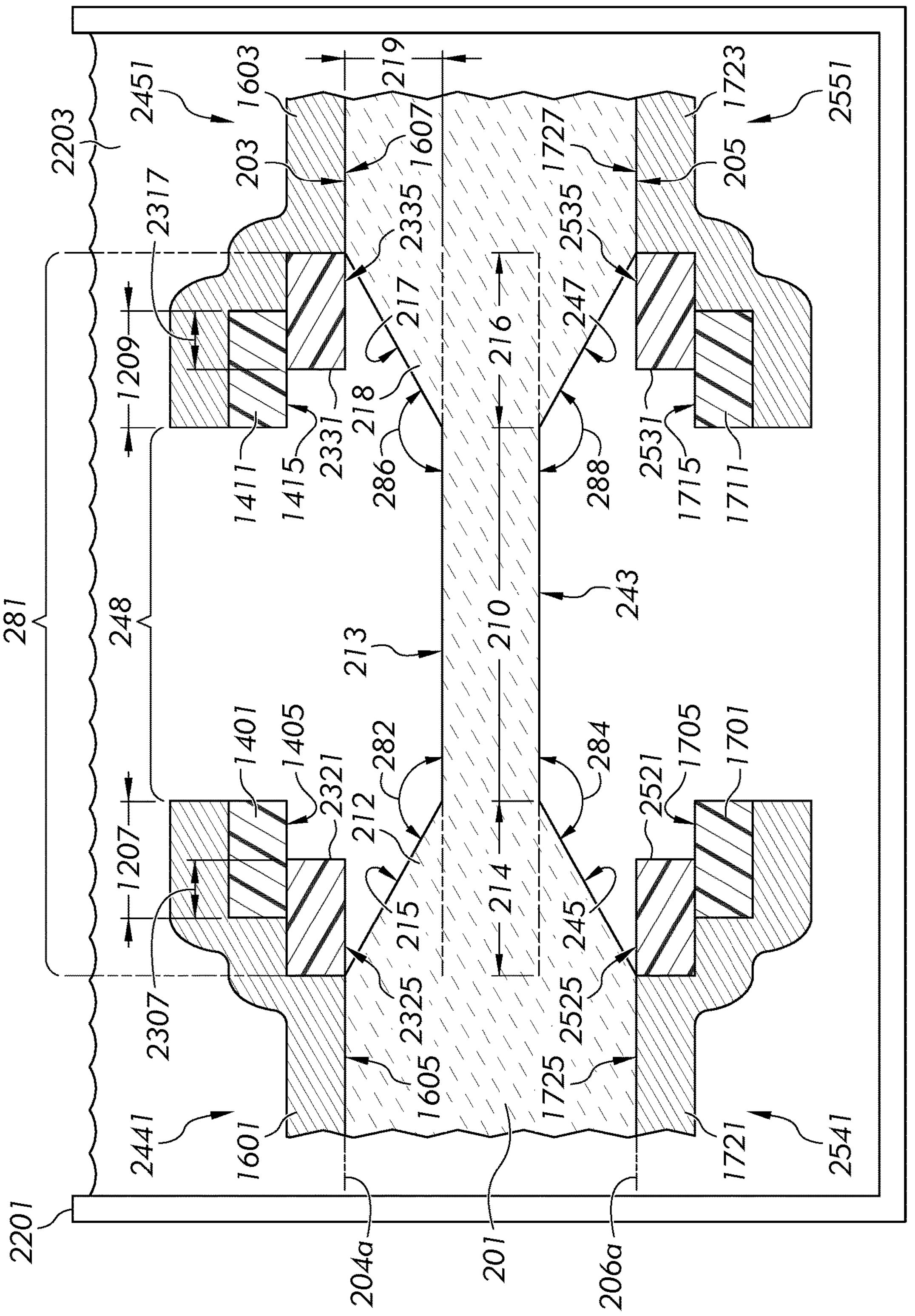

After step 1009, as shown in FIG. 26, methods can proceed to step 1025 comprising etching the foldable substrate 1105 by contacting a central region 248 of a central portion 281 of the foldable substrate 1105 that is between the first portion 2441 of the etch mask and the second portion 2451 of the etch mask to form the foldable substrate 201. In aspects, the etching can remove a portion of the foldable substrate to form the first central surface area 213 that is recessed from the first major surface 203 (e.g., first plane **204*a*) by the first distance 219. In further aspects, the etching can remove a portion of the foldable substrate to form the first transition surface area 215 of the first transition region 212. In further aspects, the etching can remove a portion of the foldable substrate to form the third transition surface area 217 of the second transition region 218. In aspects, the first transition width 214 of the first transition region 212 can be greater than the first width 1207 of the first polymer layer 1401. In even further aspects, the first transition width 214 of the first transition region 212 can be equal to or greater than a sum of the first width 1207 and the fifth width minus the first distance 2307. In aspects, the second transition width 216 of the second transition region 218 can be greater than the second width 1209 of the second polymer layer 1411. In even further aspects, the second transition width 216 of the second transition region 218 can be equal to or greater than a sum of the second width 1209 and the sixth width minus the second distance 2317**.

In aspects, as shown in FIG. 26, step 1025 can further comprise etching the foldable substrate 1105 by contacting a central region 248 of a central portion 281 of the foldable substrate 1105 that is between the third portion 2541 of the etch mask and the fourth portion 2551 of the etch mask to form the foldable substrate 201. In aspects, the etching can remove a portion of the foldable substrate to form the second central surface area 243 that is recessed from the second major surface 205 (e.g., second plane **206*a*) by the second distance 249 (see FIG. 22). In further aspects, the etching can remove a portion of the foldable substrate to form the second transition surface area 245 of the first transition region 212. In further aspects, the etching can remove a portion of the foldable substrate to form the fourth transition surface area 247 of the second transition region 218**.

In aspects, as shown in FIG. 26, the etching of step 1025 can comprise contacting the central portion 281 (e.g., central region 248) of the foldable substrate 1105 with an etchant 2203 to form the foldable substrate 201. In further aspects, as shown, the etchant 2203 can be a liquid etchant contained in an etchant bath 2201. In even further aspects, the etchant can comprise one or more mineral acids (e.g., HCl, HF, $H_2SO_4$, $HNO_3$).

In aspects, step 1025 can further comprise removing the etch mask (e.g., first portion 2441, second portion 2451, third portion 2541, fourth portion 2551). In further aspects, removing the etching mask can comprise lifting and/or peeling the etch mask from the foldable substrate. In further aspects, removing the etching mask can comprise rinsing the foldable substrate with deionized water, a neutral detergent, an alkaline detergent, and/or an alkaline solution. Rinsing the foldable substrate can remove any residue from the material adhering the etch mask to the foldable substrate.

After step 1025, as shown in FIG. 31, methods can proceed to step 1027 comprising chemically strengthening the foldable substrate 201. In aspects, as shown, chemically strengthening the foldable substrate 201 can comprise contacting at least a portion of a foldable substrate 201 comprising potassium cations and/or sodium cations in a salt bath 3101 comprising salt solution 3103. In further aspects, a composition of the salt solution 3103 can comprise one or more of the materials discussed above with reference to salt solution 1103. In further aspects, a composition of the salt solution 3103 can be the same as the salt solution 1103 discussed above. In further aspects, a temperature of the salt solution can be within one or more of the ranges discussed above with reference to the temperature of the salt solution 1103. In further aspects, a time that the salt solution contacts the foldable substrate can be within one or more of the ranges discussed above with reference to the time that the salt solution 1103 contacts the foldable substrate 1105. At the end of step 1027, the foldable substrate 201 can comprise the first compressive stress region, the second compressive stress region, the third compressive stress region, the fourth compressive stress region, the first central compressive stress region, and/or the second central compressive stress region can comprise a corresponding maximum compressive stress within one or more of the ranges discussed above for the corresponding maximum compress stress of the corresponding compressive stress region and/or the corresponding depth of compression can be within one or more of the ranges discussed above for the corresponding depth of compression of the corresponding compressive stress region.

After step 1025 or 1027, as shown in FIGS. 32-34, methods can proceed to step 1029 comprising assembling the foldable apparatus, which is discussed above. In aspects, as shown in FIGS. 2-3, the foldable substrate 201 produced by the methods outlined in the flow chart of FIG. 10 can comprise the first average angle 282, the second average angle 284, the third average angle 286, and/or the fourth average angle 288 can be within one or more of the ranges discussed above for the corresponding average angle. In aspects, the foldable substrate 201 produced by the methods outlined in the flow chart of FIG. 10 can comprise the first transition width 214 and/or the second transition width 216 can be within one or more of the ranges discussed above for the corresponding transition width. In aspects, the foldable substrate 201 produced by the methods outlined in the flow chart of FIG. 10 can comprise a first distance 219, second distance 249, substrate thickness 207, and/or central thickness 209 within one or more of the ranges discussed above for the corresponding distance or thickness. In aspects, the foldable substrate 201 produced by the methods outlined in the flow chart of FIG. 10 can comprise the maximum fractional intensity using brightfield transmission, the difference between the maximum fractional intensity and the minimum fractional intensity using brightfield transmission, the maximum fractional intensity using darkfield reflection, and/or the difference between the maximum fractional intensity and the minimum fractional intensity using darkfield reflection can be within one or more of the ranges discussed above for the corresponding value.

In aspects, methods of making a foldable apparatus in accordance with aspects of the disclosure can proceed along steps 1001, 1003, 1005, 1007, 1009, 1025, 1027, 1029, and 1031 of the flow chart in FIG. 10 sequentially, as discussed above. In aspects, arrow 1002*a* to arrow 1002*b* can be followed from step 1001 to step 1005, for example, when the foldable substrate 1105 comprises one or more compressive stress regions after step 1001. In aspects, arrow 1010 can be followed from step 1025 to step 1029, for example, when the foldable substrate 201 comprises one or more compressive stress regions and/or further processing is to comprise chemically strengthening the foldable substrate. In aspects, arrow 1012 can be followed from step 1025 to step 1031, for example, when the foldable substrate 201 is the product of the method and/or the foldable substrate 201 is to be further processed after step 1031. In aspects, arrow 1014 can be followed from step 1027 to step 1031, for example, when the foldable substrate 201 is the product of the method. In aspects, as shown in FIGS. 25-26, the etch mask can comprise the third portion 2541 and the fourth portion 2551 can be disposed over the initial second major surface 1115, and the initial second major surface 1115 can be etched to form the second central surface area 243, the second transition surface area 245, and/or the fourth transition surface area. In aspects, only the initial first major surface 1113 can be etched, for example, using the etch mask shown in FIG. 24 to produce a foldable substrate resembling the foldable substrate 201 of the foldable apparatus 401 shown in FIG. 4. Any of the above options may be combined to make a foldable apparatus in accordance with aspects of the disclosure.

Example aspects of making the foldable apparatus 101, 301, 401, 501, and/or 701 and/or foldable substrate 201 illustrated in FIGS. 2-4 and 6-7 will now be discussed with reference to FIGS. 11, 17-22, 26, and 31-34 and the flow chart in FIG. 10. In a first step 1001 of methods of the disclosure, methods can start with providing a foldable substrate 1105 (see FIG. 11). In step 1001, the foldable substrate 1105 can be provided through any of the methods discussed above with reference to step 1001 and the foldable substrate can comprise the properties discussed above for the foldable substrate 1105 with reference to step 1001.

After step 1001, as shown in FIG. 11, methods can proceed to step 1003 comprising initially chemically strengthening the foldable substrate 1105. In aspects, the foldable substrate 1105 can be substantially unstrengthened before the chemically strengthening of step 1003. In aspects, as shown, chemically strengthening the foldable substrate 1105 can comprise contacting at least a portion of a foldable substrate 1105 comprising lithium cations and/or sodium cations with a salt bath 1001 comprising salt solution 1103. In further aspects, the salt solution 1103 can comprise any of the components discussed above with reference to step 1003. In further aspects, the temperature of the salt solution 1103 and/or the time that the foldable substrate 1105 can be in contact with the salt solution 1103 can be within one or more of the ranges discussed above for the corresponding property. Step 1003 can result in an initial first compressive stress region extending to an initial first depth of compression from the initial first major surface 1113 and/or the initial second major surface 1115 to form an initial second compressive stress region extending to an initial second depth of compression from the initial second major surface 1115, where the corresponding initial depth of compression as a percentage of the substrate thickness 207 can be within one or more of the ranges discussed above in step 1003. In aspects, the initial first depth of compression can be less than the first distance 219 of the resulting foldable substrate 201 and/or the initial second depth of compression can be less than the second distance 249 of the resulting foldable substrate 201, which can enable the entire initial first depth of compression and/or the second depth of compression to be removed from the central portion 281 (e.g., central region 248) of the foldable substrate 1105 during etching in step 1025. In aspects, before step 1003, the foldable substrate 201 can be substantially unstrengthened (e.g., unstressed, not chemically strengthened, not thermally strengthened). As used herein, substantially unstrengthened refers to a substrate comprising either no depth of layer or a depth of layer in a range from 0% to about 5% of the substrate thickness.

Figure 18:
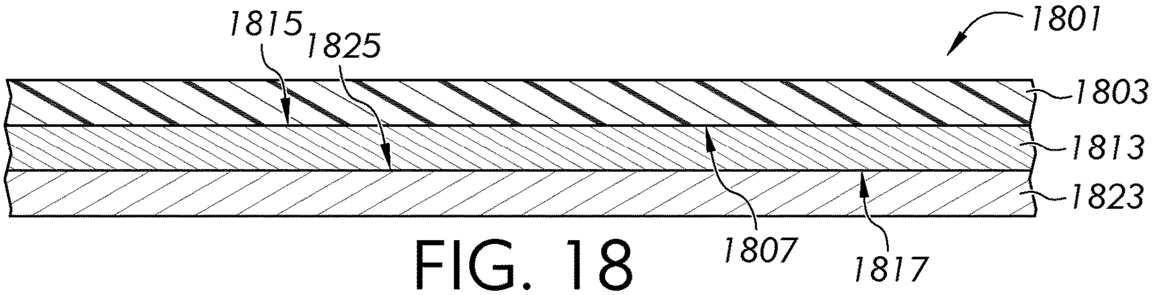
Figure 19:
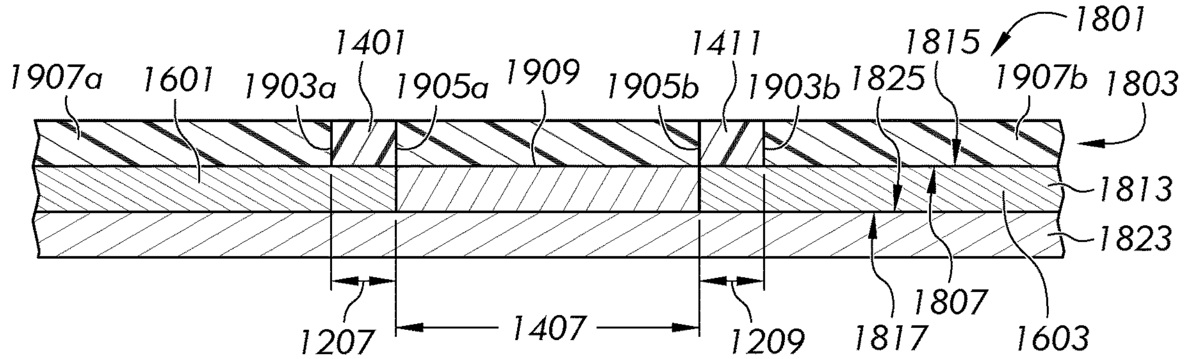
Figure 20:
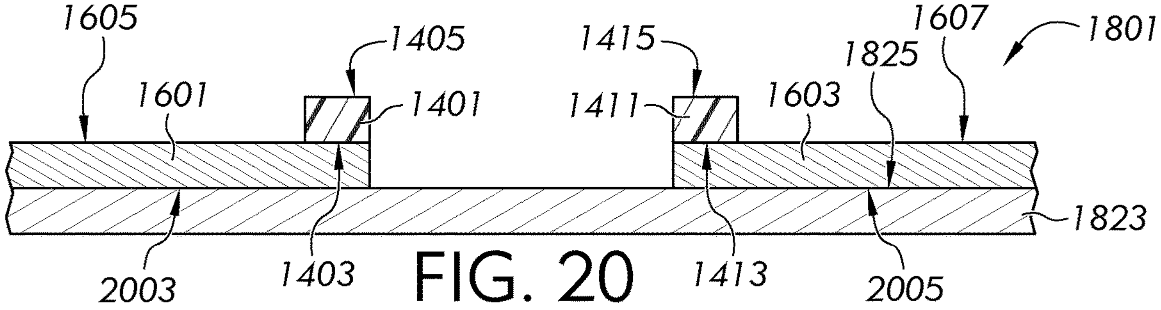

After step 1001 or 1003, as shown in FIGS. 18-20, methods can follow arrow 1004 to steps 1011 and 1013 comprising forming an assembly and disposing the assembly over the initial first major surface 1113 to form a first portion and a second portion of an etch mask. In aspects, as shown in FIG. 18, step 1011 can comprise forming an assembly 1801 by disposing a polymer sheet 1803 on a barrier sheet 1813. In further aspects, as shown, a first major surface 1807 of the polymer sheet 1803 can contact and/or be adhered a second major surface 1815 of the barrier sheet 1813. In further aspects, as shown, the barrier sheet 1813 can be disposed on a backer layer 1823. In even further aspects, as shown, a third major surface 1817 of the barrier sheet 1813 can contact and/or be adhered to a fourth major surface 1825 of the backer layer 1823.

In aspects, as shown in FIG. 19, step 1011 can comprise making a plurality of cuts in the assembly 1801. In further aspects, as shown, the plurality of cuts can comprise cutting through the polymer sheet 1803 and the barrier sheet 1813 at a first location to form a first cut 1905*a* and at a second location to form a second cut 1905*b*. In even further aspects, as shown, the first cut 1905*a* (e.g., first location) and the second cut 1905*b* (e.g., second location) can be separated by the minimum distance 1407, which can correspond to the minimum distance 1407 shown in FIGS. 16-17. In further aspects, as shown, the plurality of cuts can comprise cutting through the polymer sheet 1803 at a third location to form a third cut 1903*a* and at a fourth location to form a fourth cut 1903*b*. In even further aspects, as shown, the third cut 1903*a* (e.g., third location) can be separated from the first cut 1905*a* (e.g., first location) by the first width 1207, which can correspond to the first width 1207 shown in FIGS. 16-17. In even further aspects, as shown, the fourth cut 1903*b* (e.g., fourth location) can be separated from the second cut 1905*b* (e.g., second location) by the second width 1209, which can correspond to the second width 1209 shown in FIGS. 16-17. In even further aspects, as shown, the first cut 1905*a* and the third cut 1903*a* can define a first polymer layer 1401, and/or the second cut 1905*b* and the fourth cut 1903*b* can define a second polymer layer 1411.

In aspects, as shown from FIG. 19 to FIG. 20, step 1011 can comprise removing portions of the polymer sheet and/or the barrier sheet defined by one or more of the plurality of cuts. In further aspects, as shown, step 1001 can comprise removing a portion 1909 of the polymer sheet 1803 and the barrier sheet 1813 between the first cut 1905*a* (e.g., first location) and the second cut 1905*b* (e.g., second location). In even further aspects, as shown, the portion 1909 can comprise the minimum distance 1407. In even further aspects, as shown, removing the portion 1909 can form the first barrier layer 1601 and the second barrier layer 1603 from the barrier sheet 1813. In still further aspects, as shown, a fifth surface area 2003 of the first barrier layer 1601 can contact the fourth major surface 1825 of the backer layer 1823. In still further aspects, as shown, a sixth surface area 2005 of the second barrier layer 1603 can contact the fourth major surface 1825 of the backer layer 1823. In further aspects, as shown, step 1001 can comprise removing a portion 1907*a* of the polymer sheet 1803 extending from the third cut 1903*a* (e.g., third location), for example, in a direction away from the first cut 1905*a* (e.g., first location). In even further aspects, removing the portion 1909 and the portion 1907*a* can form the first polymer layer 1401 from the polymer sheet 1803. In still further aspects, as shown, the first surface area 1403 of the first polymer layer 1401 can contact and/or be adhered to at least a portion of the first surface area 1605 of the first barrier layer 1601. In further aspects, as shown, step 1001 can comprise removing a portion 1907*b* of the polymer sheet 1803 extending from the fourth cut 1903*b* (e.g., fourth location), for example, in a direction away from the second cut 1905*b* (e.g., second location). In even further aspects, as shown, removing the portion 1909 and the portion 1907*b* can form the second polymer layer 1411 from the polymer sheet 1803. In still further aspects, as shown, the third contact surface 1413 of the second polymer layer 1411 can contact and/or be adhered to at least a portion of the second surface area 1607 of the second barrier layer 1603.

Figure 21:
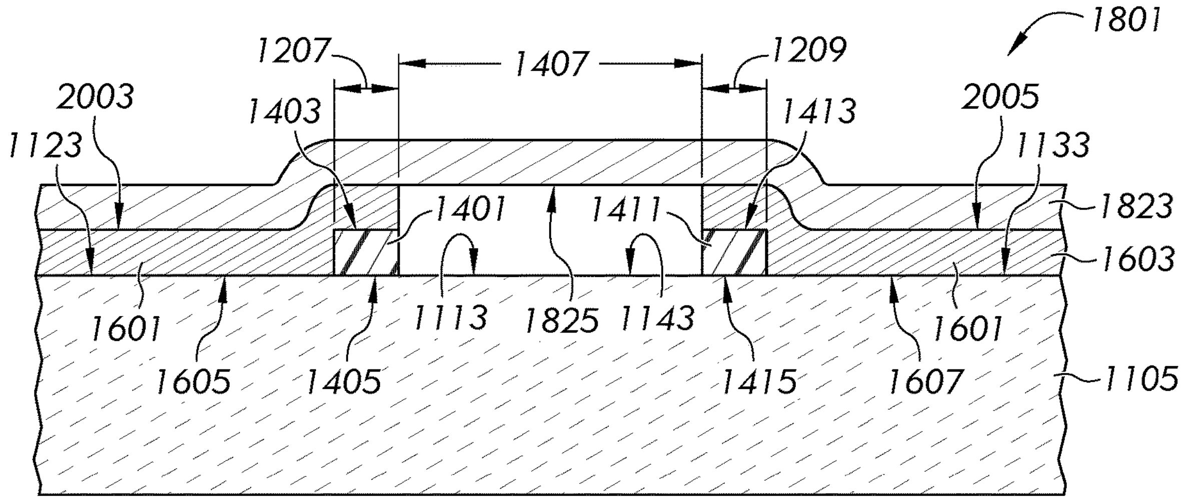

After step 1011, as shown from FIG. 20 to FIG. 21, methods can proceed to step 1013 comprising disposing the assembly 1801 over the initial first major surface 1113 of the foldable substrate 1105. In aspects, as shown, the second contact surface 1405 of the first polymer layer 1401 can be disposed on and/or contact the initial first major surface 1113 of the foldable substrate 1105. In aspects, as shown, the fourth contact surface 1415 of the second polymer layer 1411 can be disposed and/or contact the initial first major surface 1113 of the foldable substrate. In aspects, as shown, at least a portion of the first barrier layer 1601 (e.g., first surface area 1605) can contact the initial first major surface 1113 (e.g., first surface area 1123) of the foldable substrate 1105. In further aspects, the first barrier layer 1601 can be at least partially adhered to the initial first major surface 1113 (e.g., first surface area 1123) of the foldable substrate 1105. In aspects, as shown, at least a portion of the second barrier layer 1603 (e.g., second surface area 1607) can contact the initial first major surface 1113 (e.g., third surface area 1133). In further aspects, the second barrier layer 1603 can be at least partially adhered to the initial first major surface 1113 (e.g., third surface area 1133) of the foldable substrate 1105. In aspects, as shown from FIG. 21 to FIG. 16, step 1013 can further comprise removing the backer layer 1823 to form the first portion 1641 of the etch mask and the second portion 1651 of the etch mask.

In aspects, as shown in FIG. 17, steps 1011 and 1013 can further comprise disposing a third portion 1741 over the initial second major surface 1115 and/or disposing a fourth portion 1751 over the initial second major surface 1115. In further aspects, as shown, the third portion 1741 can comprise a third polymer layer 1701 with a third width. In even further aspects, the third width can be within one or more of the ranges discussed above for the first width 1207 of the first polymer layer 1401. In still further aspects, the third width can be substantially equal to the first width 1207. In even further aspects, the sixth contact surface 1705 of the third polymer layer 1701 can contact a portion of the initial second major surface 1115 comprising the second surface area 1125. In even further aspects, as shown, the third portion 1741 can comprise a third barrier layer 1721 disposed over the initial second major surface 1115. In still further aspects, the third polymer layer 1701 can be positioned between the third barrier layer 1721 and the initial second major surface 1115. In even further aspects, at least a portion of a third surface area 1725 of the third barrier layer 1721 can contact and/or be adhered to the initial second major surface 1115 comprising the second surface area 1125. In even further aspects, a portion of the fifth contact surface 1703 of the third polymer layer 1701 can contact and/or be adhered to the third barrier layer 1721 (e.g., third surface area 1725). In even further aspects, the third polymer layer 1701 can be positioned at a third peripheral portion 1731 of the third barrier layer 1721. In further aspects, as shown, the third portion 1741 can be a mirror image of the first portion 1641.

In further aspects, as shown in FIG. 17, the fourth portion 1751 can comprise a fourth polymer layer 1711 with a fourth width. In even further aspects, the fourth width can be within one or more of the ranges discussed above for the first width 1207 of the first polymer layer 1401 and/or the second width 1209 of the second polymer layer 1411. In still further aspects, the fourth width can be substantially equal to the first width 1207 and/or the second width 1209. In even further aspects, the eighth contact surface 1715 of the fourth polymer layer 1711 can contact a portion of the initial second major surface 1115 comprising the fourth surface area 1135. In even further aspects, as shown, the fourth portion 1751 can comprise a fourth barrier layer 1723 disposed over the initial second major surface 1115. In still further aspects, the fourth barrier layer 1723 can be disposed over the fourth polymer layer 1711 such that the fourth polymer layer 1711 is positioned between the fourth surface area 1727 of the fourth barrier layer 1723 and the initial second major surface 1115. In even further aspects, at least a portion of a fourth surface area 1727 of the fourth barrier layer 1723 can contact and/or be adhered to the initial second major surface 1115 comprising the fourth surface area 1135. In even further aspects, a portion of the seventh contact surface 1713 of the fourth polymer layer 1711 can contact and/or be adhered to the fourth barrier layer 1723 (e.g., fourth surface area 1727). In even further aspects, the fourth polymer layer 1711 can be positioned at a fourth peripheral portion 1733 of the fourth barrier layer 1723. In further aspects, as shown, the fourth portion 1751 can be a mirror image of the second portion 1651. In even further aspects, a minimum distance between the third portion 1741 and the fourth portion 1751 can be within one or more of the ranges discussed above for the minimum distance 1407. In still further aspects, the minimum distance between the third portion 1741 and the fourth portion 1751 can be substantially equal to the minimum distance 1407.

After step 1013, as shown in FIG. 22, methods can proceed to step 1025 comprising etching the foldable substrate 1105 by contacting a central region 248 of a central portion 281 of the foldable substrate 1105 that is between the first portion 1641 of the etch mask and the second portion 1651 of the etch mask to form the foldable substrate 201. In aspects, the etching can remove a portion of the foldable substrate to form the first central surface area 213 that is recessed from the first major surface 203 (e.g., first plane 204*a*) by the first distance 219. In further aspects, the etching can remove a portion of the foldable substrate to form the first transition surface area 215 of the first transition region 212. In further aspects, the etching can remove a portion of the foldable substrate to form the third transition surface area 217 of the second transition region 218. In aspects, the first transition width 214 of the first transition region 212 can be equal to or greater than the first width 1207 of the first polymer layer 1401. In aspects, the second transition width 216 of the second transition region 218 can be greater than or equal to the second width 1209 of the second polymer layer 1411.

In aspects, as shown in FIG. 22, step 1025 can further comprise etching the foldable substrate 1105 by contacting a central region 248 of a central portion 281 of the foldable substrate 1105 that is between the third portion 1741 of the etch mask and the fourth portion 1751 of the etch mask to form the foldable substrate 201. In aspects, the etching can remove a portion of the foldable substrate to form the second central surface area 243 that is recessed from the second major surface 205 (e.g., second plane 206*a*) by the second distance 249. In further aspects, the etching can remove a portion of the foldable substrate to form the second transition surface area 245 of the first transition region 212. In further aspects, the etching can remove a portion of the foldable substrate to form the fourth transition surface area 247 of the second transition region 218.

In aspects, as shown in FIG. 22, the etching of step 1025 can comprise contacting the central portion 281 (e.g., central region 248) of the foldable substrate 1105 with an etchant 2203 to form the foldable substrate 201. In further aspects, as shown, the etchant 2203 can be a liquid etchant contained in an etchant bath 2201. In even further aspects, the etchant can comprise one or more mineral acids (e.g., HCl, HF, $H_2SO_4$, $HNO_3$).

In aspects, step 1025 can further comprise removing the etch mask (e.g., first portion 1641, second portion 1651, third portion 1741, fourth portion 1751). In further aspects, removing the etching mask can comprise lifting and/or peeling the etch mask from the foldable substrate. In further aspects, removing the etching mask can comprise rinsing the foldable substrate with deionized water, a neutral detergent, an alkaline detergent, and/or an alkaline solution. Rinsing the foldable substrate can remove any residue from the material adhering the etch mask to the foldable substrate.

After step 1025, as shown in FIG. 31, methods can proceed to step 1027 comprising chemically strengthening the foldable substrate 201. In aspects, as shown, chemically strengthening the foldable substrate 201 can comprise contacting at least a portion of a foldable substrate 201 comprising potassium cations and/or sodium cations in a salt bath 3101 comprising salt solution 3103. In further aspects, a composition of the salt solution 3103 can comprise one or more of the materials discussed above with reference to salt solution 1103. In further aspects, a composition of the salt solution 3103 can be the same as the salt solution 1103 discussed above. In further aspects, a temperature of the salt solution can be within one or more of the ranges discussed above with reference to the temperature of the salt solution 1103. In further aspects, a time that the salt solution contacts the foldable substrate can be within one or more of the ranges discussed above with reference to the time that the salt solution 1103 contacts the foldable substrate 1105. At the end of step 1027, the foldable substrate 201 can comprise the first compressive stress region, the second compressive stress region, the third compressive stress region, the fourth compressive stress region, the first central compressive stress region, and/or the second central compressive stress region can comprise a corresponding maximum compressive stress within one or more of the ranges discussed above for the corresponding maximum compress stress of the corresponding compressive stress region and/or the corresponding depth of compression can be within one or more of the ranges discussed above for the corresponding depth of compression of the corresponding compressive stress region.

After step 1025 or 1027, as shown in FIGS. 32-34, methods can proceed to step 1029 comprising assembling the foldable apparatus, which is discussed above. In aspects, the foldable substrate 201 produced by the methods outlined in the flow chart of FIG. 10 can comprise the first average angle 282, the second average angle 284, the third average angle 286, and/or the fourth average angle 288 can be within one or more of the ranges discussed above for the corresponding average angle. In aspects, the foldable substrate 201 produced by the methods outlined in the flow chart of FIG. 10 can comprise the first transition width 214 and/or the second transition width 216 can be within one or more of the ranges discussed above for the corresponding transition width. In aspects, the foldable substrate 201 produced by the methods outlined in the flow chart of FIG. 10 can comprise a first distance 219, second distance 249, substrate thickness 207, and/or central thickness 209 within one or more of the ranges discussed above for the corresponding distance or thickness. In aspects, the foldable substrate 201 produced by the methods outlined in the flow chart of FIG. 10 can comprise the maximum fractional intensity using brightfield transmission, the difference between the maximum fractional intensity and the minimum fractional intensity using brightfield transmission, the maximum fractional intensity using darkfield reflection, and/or the difference between the maximum fractional intensity and the minimum fractional intensity using darkfield reflection can be within one or more of the ranges discussed above for the corresponding value.

In aspects, methods of making a foldable apparatus in accordance with aspects of the disclosure can proceed along steps 1001, 1003, 1011, 1013, 1025, 1027, 1029, and 1031 of the flow chart in FIG. 10 sequentially, as discussed above. In aspects, arrow **1002*a* to arrow 1004 can be followed from step 1001 to step 1011, for example, when the foldable substrate 1105 comprises one or more compressive stress regions after step 1001. In aspects, arrow 1010 can be followed from step 1025 to step 1029, for example, when the foldable substrate 201 comprises one or more compressive stress regions and/or further processing is to comprise chemically strengthening the foldable substrate. In aspects, arrow 1012 can be followed from step 1025 to step 1031, for example, when the foldable substrate 201 is the product of the method and/or the foldable substrate 201 is to be further processed after step 1031. In aspects, arrow 1014 can be followed from step 1027 to step 1031, for example, when the foldable substrate 201 is the product of the method. In aspects, as shown in FIGS. 17 and 22, the etch mask can comprise the third portion 1741 and the fourth portion 1751 can be disposed over the initial second major surface 1115, and the initial second major surface 1115 can be etched to form the second central surface area 243, the second transition surface area 245, and/or the fourth transition surface area 247. In aspects, only the initial first major surface 1113 can be etched, for example, using the etch mask shown in FIG. 24 to produce a foldable substrate resembling the foldable substrate 201 of the foldable apparatus 401 shown in FIG. 4**. Any of the above options may be combined to make a foldable apparatus in accordance with aspects of the disclosure.

Example aspects of making the foldable apparatus resembling foldable apparatus 101, 301, 401, 501, and/or 701 and/or a foldable substrate 201 will now be discussed with reference to FIGS. 11 and 27-34 and the flow chart in FIG. 10. In a first step 1001 of methods of the disclosure, methods can start with providing a foldable substrate 1105 (see FIG. 11). In step 1001, the foldable substrate 1105 can be provided through any of the methods discussed above with reference to step 1001 and the foldable substrate can comprise the properties discussed above for the foldable substrate 1105 with reference to step 1001.

After step 1001, as shown in FIG. 11, methods can proceed to step 1003 comprising initially chemically strengthening the foldable substrate 1105. In aspects, the foldable substrate 1105 can be substantially unstrengthened before the chemically strengthening of step 1003. In aspects, as shown, chemically strengthening the foldable substrate 1105 can comprise contacting at least a portion of a foldable substrate 1105 comprising lithium cations and/or sodium cations with a salt bath 1101 comprising salt solution 1103. In further aspects, the salt solution 1103 can comprise any of the components discussed above with reference to step 1003. In further aspects, the temperature of the salt solution 1103 and/or the time that the foldable substrate 1105 can be in contact with the salt solution 1103 can be within one or more of the ranges discussed above for the corresponding property. Step 1003 can result in an initial first compressive stress region extending to an initial first depth of compression from the initial first major surface 1113 and/or the initial second major surface 1115 to form an initial second compressive stress region extending to an initial second depth of compression from the initial second major surface 1115, where the corresponding initial depth of compression as a percentage of the substrate thickness 207 can be within one or more of the ranges discussed above in step 1003. In aspects, the initial first depth of compression can be less than the first distance 219 of the resulting foldable substrate 201 and/or the initial second depth of compression can be less than the second distance 249 of the resulting foldable substrate 201, which can enable the entire initial first depth of compression and/or the second depth of compression to be removed from the central portion 281 (e.g., central region 248) of the foldable substrate 1105 during etching in step 1025. In aspects, before step 1003, the foldable substrate 201 can be substantially unstrengthened (e.g., unstressed, not chemically strengthened, not thermally strengthened). As used herein, substantially unstrengthened refers to a substrate comprising either no depth of layer or a depth of layer in a range from 0% to about 5% of the substrate thickness.

Figure 27:
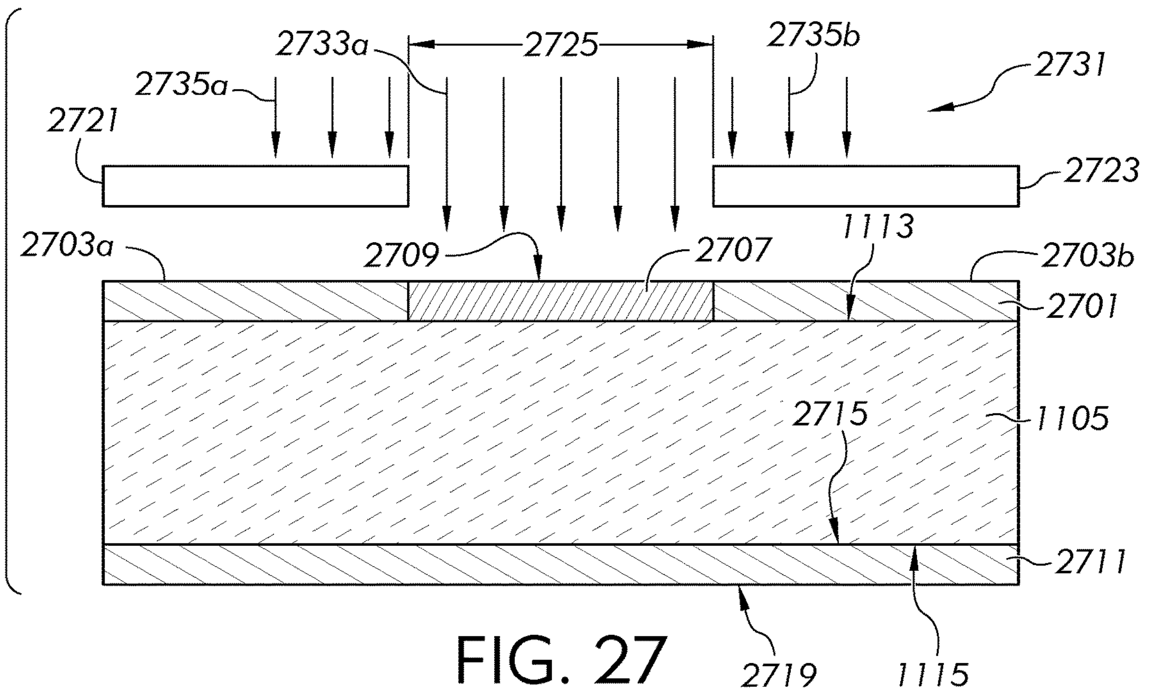
Figure 28:
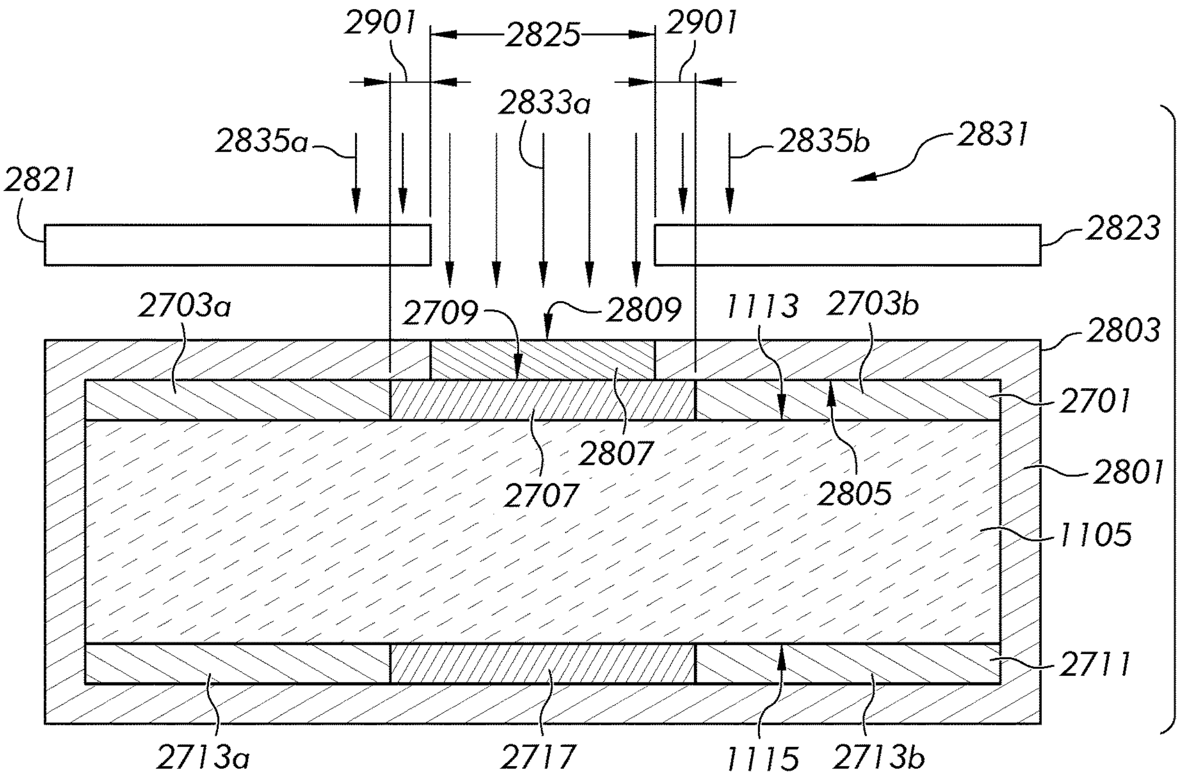
Figure 29:
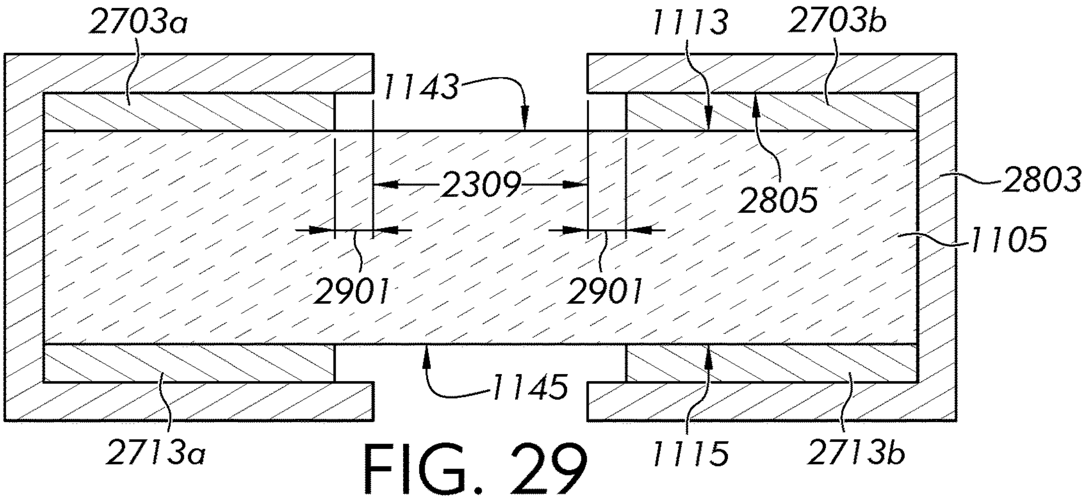

After step 1001 or 1003, as shown in FIGS. 27-29, methods can follow arrow 1006 to steps 1015, 1017, 1019, 1021, and 1023 comprising disposing an etch mask comprising a positive photoresist over the initial first major surface 1113 of the foldable substrate 1105. As used herein, "positive photoresist" refers to a material that is initially resistant to being removed with a treatment solution is more readily removed with the treatment solution after the material is irradiated. In aspects, as shown in FIG. 27, step 1015 can comprise disposing a first layer 2701 of a positive photoresist over the initial first major surface 1113. In further aspects, as shown, the first layer 2701 can contact the initial first major surface 1113. In further aspects, as shown in FIG. 27, the step 1015 can comprise disposing an another layer 2711 of a positive photoresist over the initial second major surface 1115. In even further aspects, as shown, the another layer 2711 can contact the initial second major surface 1115. In further aspects, as shown, a third surface area 2715 of the another layer 2711 can contact the initial second major surface 1115. In further aspects, although not shown, the first layer 2701 can extend around edges of the foldable substrate 1105 and/or be continuous with the another layer 2711. In aspects, a thickness of the first layer and/or a thickness of the second layer can be within one or more of the ranges discussed above for the second gap 2339 and/or the sixth thickness 2337 shown in FIG. 23.

In further aspects, the disposing the first layer 2701 and/or the another layer 2711 can comprise dip coating, spin coating, or chemical vapor deposition. In further aspects, the positive photoresist can comprise a sensitizer, for example, diazonaphthoquinone, which can be combined with a resin (e.g., phenol-based resins, novolac resins).

After step 1015, as shown in FIG. 27, methods can proceed to step 1017 comprising irradiating a first portion 2707 of the first layer 2701. In aspects, as shown, the first portion 2707 can comprise a first width 2725. In further aspects, the first portion 2707 can be positioned between peripheral portions 2703*a-b* of the first layer 2701. In further aspects, the first width 2725 can be within one or more of the ranges discussed above with reference to the minimum distance 1407 in FIGS. 16-17. In further aspects, as shown, a set of photomasks 2721 and 2723 can be used to limit a region (e.g., first portion 2707) of the first layer 2701 irradiated. For example, as shown in FIG. 27, the set of photomasks 2721 and 2723 can allow a central portion 2733*a* of the light 2731 to pass while blocking peripheral portions 2735*a-b* of the light 2731. In further aspects, a first surface area 2709 of the first portion 2707 irradiated can be irradiated with light comprising a wavelength that a sensitizer of the positive photoresist is sensitive to. In further aspects, the light can comprise a wavelength of about 100 nm or more, about 200 nm or more, about 250 nm or more, about 400 nm or more, about 800 nm or more, about 1500 nm or less, about 1300 nm or less, about 1100 nm or less, about 900 nm or less, or about 400 nm or less. In further aspects, the light can comprise a wavelength in a range from about 100 nm to about 1500 nm, from about 100 nm to about 1100 nm, from about 100 nm to about 400 nm, from about 200 nm to about 400 nm, from about 250 nm to about 400 nm, or any range or subrange therebetween. In further aspects, the light can comprise a wavelength in a range from about 200 nm to about 1500 nm, from about 400 nm to about 1500 nm, from about 800 nm to about 1500 nm, from about 800 nm to about 1300 nm, from about 800 nm to about 1100 nm, from about 800 nm to about 900 nm, or any range or subrange therebetween. The first portion 2707 of the first layer 2701 can be irradiated with a sufficient amount of energy to increase the ability to remove the first portion 2707 with the treatment solution. In aspects, as shown between FIGS. 27 and 28, the another layer 2711 can be irradiated to form an another portion 2717 positioned between peripheral portions 2713*a-b*.

After step 1017, as shown in FIG. 28, methods can proceed to step 1019 comprising disposing a second layer 2803 of a positive photoresist over the first layer 2701. In aspects, as shown, an inner surface 2805 of the second layer 2803 can contact the first surface area 2709 of the first portion 2707. In further aspects, as shown, the second layer 2803 can contact both the first layer 2701 and the another layer 2711. In further aspects, as shown, the second layer 2803 can extend around an entire periphery of the foldable substrate 1105. In aspects, the second layer 2803 can comprise the same material as the first layer 2701. In aspects, the second layer 2803 can be disposed using one of the methods discussed above for the first layer 2701.

After step 1019, as shown in FIG. 28, methods can proceed to step 1021 comprising irradiating a second portion 2807 of the second layer 2803. In aspects, as shown, the second portion 2807 can comprise a second width 2825. In further aspects, the second width 2825 of the second layer 2803 can be less than the first width of the first layer 2701. In aspects, the second width 2825 can be within one or more of the ranges discussed above with reference to the minimum distance 2309 in FIG. 24. In further aspects, as shown, the second portion 2807 can be centered within the first portion 2707 with a distance of an edge of the second portion 2807 and the edge of the first portion 2707 is substantially equal to a first width 2901 on both sides. In further aspects, as shown, a set of photomasks 2821 and 2823 can be used to limit a region (e.g., second portion 2807) of the second layer 2803 irradiated. For example, as shown in FIG. 28, the set of photomasks 2821 and 2823 can allow a central portion 2833*a* of the light 2831 to pass while blocking peripheral portions 2835*a-b* of the light 2831. In further aspects, a second surface area 2809 of the first portion 2707 irradiated can be irradiated with light comprising a wavelength that a sensitizer of the positive photoresist is sensitive to. In further aspects, the light can comprise a wavelength within one or more of the ranges discussed above for the wavelength in step 1017. The second portion 2807 of the second layer 2803 can be irradiated with a sufficient amount of energy to increase the ability to remove the second portion 2807 with the treatment solution. In aspects, although not shown, an another portion of the second layer 2803 opposite the second portion 2807 can be formed by being irradiated as discussed above for the second portion 2807.

After step 1021, as shown from FIG. 28 to FIG. 29, methods can proceed to step 1023 comprising removing the second portion 2807 of the second layer 2803 and the first portion 2707 of the first layer 2701. In aspects, removing the second portion 2807 and the first portion 2707 can comprise contacting the corresponding portions with a treatment solution. In further aspects, the treatment solution can comprise a basic solution, for example, tetramethylammonium hydroxide (TMAH), ammonium hydroxide ($NH_4OH$), potassium hydroxide (KOH), sodium hydroxide (NaOH), and/or an alkaline detergent solution.

Figure 30:
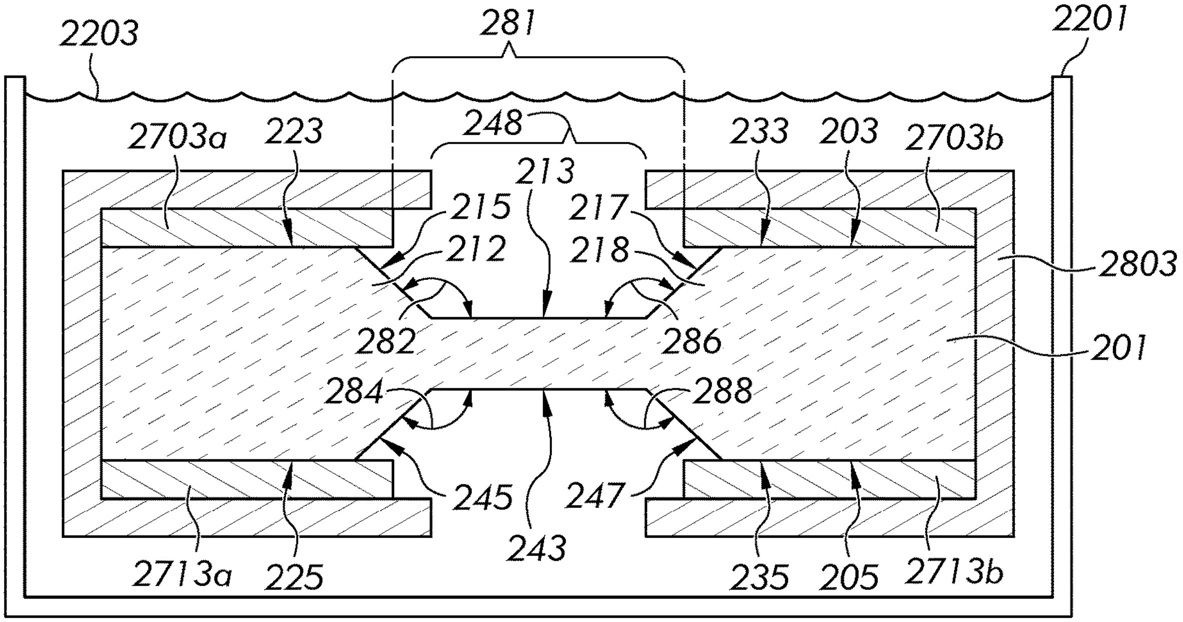

After step 1023, as shown in FIG. 30, methods can proceed to step 1025 comprising forming the foldable substrate 201 by etching the foldable substrate 1105 by contacting the existing first central surface area 1143 with etchant, where the existing first central surface area 1143 was left exposed for etching after step 1023. In aspects, the etching can remove a portion of the foldable substrate to form the first central surface area 213 that is recessed from the first major surface 203 (e.g., first plane 204*a*) by the first distance 219. In further aspects, the etching can remove a portion of the foldable substrate to form the first transition surface area 215 of the first transition region 212. In further aspects, the etching can remove a portion of the foldable substrate to form the third transition surface area 217 of the second transition region 218. In aspects, the first transition width 214 of the first transition region 212 can be greater than or equal to the first width 2901. In aspects, the second transition width 216 of the second transition region 218 can be greater than or equal to the first width 2901.

In aspects, as shown in FIG. 30, step 1025 can further comprise forming the foldable substrate 201 by etching the foldable substrate 1105 by contacting the existing second central surface area 1145 with etchant, where the existing second central surface area 1145 was left exposed for etching after step 1023. In aspects, the etching can remove a portion of the foldable substrate to form the second central surface area 243 that is recessed from the second major surface 205 (e.g., second plane 206*a*) by the second distance 249. In further aspects, the etching can remove a portion of the foldable substrate to form the second transition surface area 245 of the first transition region 212. In further aspects, the etching can remove a portion of the foldable substrate to form the fourth transition surface area 247 of the second transition region 218. In further aspects, as shown in FIG. 30, the etchant 2203 can be a liquid etchant contained in an etchant bath 2201. In even further aspects, the etchant can comprise one or more mineral acids (e.g., HCl, HF, $H_2SO_4$, $HNO_3$).

In aspects, step 1025 can further comprise removing the etch mask (e.g., the peripheral portions 2703*a*, 2703*b* of the first layer 2701, the peripheral portions 2713*a*, 2713*b* of the layer 2711 and the second layer 2803). In further aspects, removing the etching mask can comprise lifting and/or peeling the etch mask from the foldable substrate. In further aspects, removing the etching mask can comprise rinsing the foldable substrate with deionized water, a neutral detergent, an alkaline detergent, and/or an alkaline solution. Rinsing the foldable substrate can remove any residue from the material adhering the etch mask to the foldable substrate.

After step 1025, as shown in FIG. 31, methods can proceed to step 1027 comprising chemically strengthening the foldable substrate 201. In aspects, as shown, chemically strengthening the foldable substrate 201 can comprise contacting at least a portion of a foldable substrate 201 comprising potassium cations and/or sodium cations in a salt bath 3101 comprising salt solution 3103. In further aspects, a composition of the salt solution 3103 can comprise one or more of the materials discussed above with reference to salt solution 1103. In further aspects, a composition of the salt solution 3103 can be the same as the salt solution 1103 discussed above. In further aspects, a temperature of the salt solution can be within one or more of the ranges discussed above with reference to the temperature of the salt solution 1103. In further aspects, a time that the salt solution contacts the foldable substrate can be within one or more of the ranges discussed above with reference to the time that the salt solution 1103 contacts the foldable substrate 1105. At the end of step 1027, the foldable substrate 201 can comprise the first compressive stress region, the second compressive stress region, the third compressive stress region, the fourth compressive stress region, the first central compressive stress region, and/or the second central compressive stress region can comprise a corresponding maximum compressive stress within one or more of the ranges discussed above for the corresponding maximum compress stress of the corresponding compressive stress region and/or the corresponding depth of compression can be within one or more of the ranges discussed above for the corresponding depth of compression of the corresponding compressive stress region.

After step 1025 or 1027, as shown in FIGS. 32-34, methods can proceed to step 1029 comprising assembling the foldable apparatus, which is discussed above. In aspects, the foldable substrate 201 produced by the methods outlined in the flow chart of FIG. 10 can comprise the first average angle 282, the second average angle 284, the third average angle 286, and/or the fourth average angle 288 can be within one or more of the ranges discussed above for the corresponding average angle. In aspects, the foldable substrate 201 produced by the methods outlined in the flow chart of FIG. 10 can comprise the first transition width 214 and/or the second transition width 216 can be within one or more of the ranges discussed above for the corresponding transition width. In aspects, the foldable substrate 201 produced by the methods outlined in the flow chart of FIG. 10 can comprise a first distance 219, second distance 249, substrate thickness 207, and/or central thickness 209 within one or more of the ranges discussed above for the corresponding distance or thickness. In aspects, the foldable substrate 201 produced by the methods outlined in the flow chart of FIG. 10 can comprise the maximum fractional intensity using brightfield transmission, the difference between the maximum fractional intensity and the minimum fractional intensity using brightfield transmission, the maximum fractional intensity using darkfield reflection, and/or the difference between the maximum fractional intensity and the minimum fractional intensity using darkfield reflection can be within one or more of the ranges discussed above for the corresponding value.

In aspects, methods of making a foldable apparatus in accordance with aspects of the disclosure can proceed along steps 1001, 1003, 1015, 1017, 1019, 1021, 1023, 1025, 1027, 1029, and 1031 of the flow chart in FIG. 10 sequentially, as discussed above. In aspects, arrow 1002*a* to arrow 1006 can be followed from step 1001 to step 1011, for example, when the foldable substrate 1105 comprises one or more compressive stress regions after step 1001. In aspects, arrow 1010 can be followed from step 1025 to step 1029, for example, when the foldable substrate 201 comprises one or more compressive stress regions and/or further processing is to comprise chemically strengthening the foldable substrate. In aspects, arrow 1012 can be followed from step 1025 to step 1031, for example, when the foldable substrate 201 is the product of the method and/or the foldable substrate 201 is to be further processed after step 1031. In aspects, arrow 1014 can be followed from step 1027 to step 1031, for example, when the foldable substrate 201 is the product of the method. In aspects, the initial first major surface 1113 and the initial second major surface 1115 can be etched (e.g., simultaneously) (see FIG. 22) to form the first central surface area 213 and the second central surface area 243, the first transition surface area 215, the second transition surface area 245, the third transition surface area 217 and/or the fourth transition surface area 247. In aspects, only the initial first major surface 1113 can be etched, for example, using the etch mask shown in FIG. 16 to produce a foldable substrate resembling the foldable substrate 201 of the foldable apparatus 401 shown in FIG. 4. Any of the above options may be combined to make a foldable apparatus in accordance with aspects of the disclosure.

EXAMPLES

Various aspects will be further clarified by the following examples. Examples AA-CC, A-B, and J comprise a glass-based substrate (Composition 1 having a nominal composition in mol % of: 63.6 $SiO_2$; 15.7 $Al_2O_3$; 10.8 $Na_2O$; 6.2

$Li_2O$; 1.16 ZnO; 0.04 $SnO_2$; and 2.5 $P_2O_5$) with a substrate thickness 207 of 100 μm. In Examples AA-CC, A-B, and J, the minimum distance between peripheral portions of the etch mask is 10 mm, and the barrier layer comprises JVCC EGPF-01 (J.V. Converting Company, Inc.). Examples AA-CC, A-B, and J were etched with an HF solution. Examples AA-CC are comparative examples where the etch mask comprises a barrier layer without a polymer layer. For Example CC, dust was placed on the 3 mm of the barrier layer at the peripheral portion of the barrier layer before placing the barrier layer on the foldable substrate. The dust acts to reduce the adhesion of the peripheral portion of the barrier layer to the foldable substrate. Examples C-G are prophetic examples based on the results of Examples A-B. Examples K-P are prophetic examples based on the results of Examples A-B and J. Examples A-G corresponds to the etch mask shown in FIGS. 16-17 and comprise a polymer layer comprising a thickness of 50 μm and the first width stated in Table 2. Examples J-P correspond to the etch mask shown in FIGS. 24-25 and comprises polymer layers comprising a thickness of 50 μm, the first width stated in Table 3, and the offset states in Table 3.

Table 1 presents the properties of the transition region formed using the Examples AA-CC, where the "depth" corresponds to the first distance that the first central surface area is recessed from the first major surface (e.g., first plane), the "transition width" corresponds to the first transition width, and the average transition angle corresponds to the first average transition angle. Examples AA-BB represent the range of average transition angles obtained using a barrier layer without a polymer layer, which is from about 157° to about 164°. Example CC provides a reduced average transition angle of about 165°.

TABLE 1

Properties of Examples AA-CC

| Example | Depth (μm) | Transition Width (μm) | Average Transition Angle (°) |
|---|---|---|---|
| AA | 35 | 85 | 157.62 |
| BB | 30 | 103 | 163.78 |
| CC | 35 | 134 | 165.34 |

Table 2 presents the properties of the transition regions for Examples A-F, where the "depth" corresponds to the first distance that the first central surface area is recessed from the first major surface (e.g., first plane), the "transition width" corresponds to the first transition width, and the average transition angle corresponds to the first average transition angle. The "first width" corresponds to the first width 1207 of the first polymer layer 1401 shown in FIGS. 16-17. Examples A and B are based on actual experiments, which resulted in average transition angles of 166.87° and 179.33°, respectively. It is expected that average transition angles between these average transition angles can also be achieved (see Examples C-G below) such that the average transition angle can range from about 166° to about 179.3°. For the smaller first width (100 μm), the transition width was larger than the first width; however, the first width is substantially equal to the transition width for the longer first width (3,000 μm). Without wishing to be bound by theory, it appears that a certain amount of undercutting naturally occurs (similar to Examples AA-CC) in combination with the taper formed by the polymer portions of the mask when the first width is comparable (e.g., within a factor of 5, within a factor of 7) of the 100 μm to 135 μm seen in Examples AA-CC. Examples C-G are prophetic examples based on the results of Examples A-B and this reasoning. Increasing the first width results in an increased transition width and an increased average transition angle (comparing Examples A and B), which is reflected in the prophetic examples of Examples C-G as well.

TABLE 2

Properties of Examples A-G

| Example | First Width (μm) | Depth (μm) | Transition Width (μm) | Average Transition Angle (°) |
|---|---|---|---|---|
| A | 100 | 35 | 150 | 166.87 |
| B | 3,000 | 35 | 3,000 | 179.33 |
| C | 150 | 35 | 200 | 170.07 |
| D | 250 | 35 | 300 | 173.35 |
| E | 475 | 35 | 500 | 176.00 |
| F | 700 | 35 | 700 | 177.14 |
| G | 2,000 | 35 | 2,000 | 179.00 |

TABLE 3

Properties of Examples J-P

| Example | First Width (μm) | Offset (μm) | Depth (μm) | Transition Width (μm) | Average Transition Angle (°) |
|---|---|---|---|---|---|
| J | 3,000 | 2,000 | 35 | 5,000 | 179.6 |
| K | 100 | 0 | 35 | 150 | 166.87 |
| L | 100 | 50 | 35 | 200 | 170.07 |
| M | 200 | 50 | 35 | 300 | 173.35 |
| N | 300 | 175 | 35 | 500 | 176.00 |
| O | 500 | 200 | 35 | 700 | 177.14 |
| P | 1,500 | 500 | 35 | 2,000 | 179.00 |

Table 3 presents the properties of the transition region for Examples J-O, where the "depth" corresponds to the first distance that the first central surface area is recessed from the first major surface (e.g., first plane), the "transition width" corresponds to the first transition width, and the average transition angle corresponds to the first average transition angle. The "first width" corresponds to the first width 1207 of the first polymer layer 1401 shown in FIGS. 23-24, and the "offset" corresponds to the first distance 2307 shown in FIGS. 23-24. Example J is based on an actual experiment. Example J demonstrates that the two polymer layers offset from each other can achieve a transition width corresponding to a width of the portion covered by the polymer layers. Examples K-P are prophetic examples based on this result along with the results and reasoning discussed above with reference to Table 2-3. Consequently, it is expected that a range of average transition angles from about 166° to about 179° (see Examples J-P). The average transition angle of Example J (and Examples K-P) are greater than those obtained for Examples AA-CC. Increasing the first width results is expected to result in an increased transition width and an increased average transition angle.

The results presented in Tables 4-5 are based on simulations of the corresponding Example apparatus configured as described above for measuring fractional intensity using either brightfield transmission or darkfield reflection with the configuration described above. Table 4 presents the simulated results of fractional intensity using brightfield reflectance for Examples BB and C. The contrast ratio is equal to the difference of the maximum fractional intensity and the minimum fraction intensity divided by the difference between the maximum fractional intensity and the minimum fractional intensity. A transition region that is truly invisible would correspond to a minimum fractional intensity of 1.000, a maximum fractional intensity of 1.000, and a contrast ratio of 0. Consequently, values closer to 1.000 and smaller contrast ratios (i.e., closer to 0) correspond to less visible transition regions. Example BB has a minimum fractional intensity of 0.975 and a maximum fractional intensity of 1.030 with a contrast ratio of 0.027. Example C has a minimum fractional intensity of 0.993 and a maximum fractional intensity of 1.009 with a contrast ratio of 0.008. Comparing Example BB and Example C, the fractional intensities were closer to 1.000 for Example C than for Example BB. Also, Example C comprises a difference less than Example BB by 0.019 (the difference of Example BB is 237% greater than the difference of Example C).

TABLE 4

Fractional Intensity using Brightfield Transmission

| Example | Minimum Fractional Intensity | Maximum Fractional Intensity | Contrast Ratio |
|---|---|---|---|
| BB | 0.975 | 1.030 | 0.027 |
| C | 0.993 | 1.009 | 0.008 |

TABLE 5

Fractional Intensity using Darkfield Reflection

| Example | Minimum Fractional Intensity | Maximum Fractional Intensity | Contrast Ratio |
|---|---|---|---|
| BB | 0.991 | 1.130 | 0.074 |
| C | 0.996 | 1.051 | 0.026 |

Table 5 presents the simulated results of fractional intensity using brightfield reflectance for Examples BB and C. Example BB has a minimum fractional intensity of 0.991 and a maximum fractional intensity of 1.130 with a contrast ratio of 0.074. Example C has a minimum fractional intensity of 0.996 and a maximum fractional intensity of 1.051 with a contrast ratio of 0.026. Comparing Example BB and Example C, the fractional intensities were closer to 1.000 for Example C than for Example BB. Also, Example C comprises a contrast ratio less than Example BB by 0.048 (the contrast ratio of Example BB is 184% greater than the contrast ratio of Example C).

The above observations can be combined to provide foldable substrate comprising a low minimum parallel plate distance, high impact resistance, increased durability, reduced fatigue, and reduced incidence of mechanical instabilities. The portions can comprise glass-based and/or ceramic-based portions, which can provide good dimensional stability, reduced incidence of mechanical instabilities, good impact resistance, and/or good puncture resistance. The first portion and/or the second portion can comprise glass-based and/or ceramic-based portions comprising one or more compressive stress regions, which can further provide increased impact resistance and/or increased puncture resistance. By providing a substrate comprising a glass-based and/or ceramic-based substrate, the substrate can also provide increased impact resistance and/or puncture resistance while simultaneously facilitating good folding performance. In aspects, the substrate thickness can be sufficiently large (e.g., from about 80 micrometers (microns or μm) to about 2 millimeters) to further enhance impact resistance and puncture resistance. Providing foldable substrates comprising a central portion comprising a central thickness that is less than a substrate thickness (e.g., first thickness of the first portion and/or second thickness of the second portion) can enable a small parallel plate distance (e.g., about 10 millimeters or less) based on the reduced thickness in the central portion.

In aspects, the foldable apparatus and/or foldable substrates can comprise a plurality of recesses, for example, a first central surface area recessed from a first major surface by a first distance and a second central surface area recessed from a second major surface by a second distance. Providing a first recess opposite a second recess can provide the central thickness that is less than a substrate thickness. Further, providing a first recess opposite a second recess can reduce a maximum bend-induced strain of the foldable apparatus, for example, between a central portion and a first portion and/or second portion since the central portion comprising the central thickness can be closer to a neutral axis of the foldable apparatus and/or foldable substrates than if only a single recess was provided. Additionally, providing the first distance substantially equal to the second distance can reduce the incidence of mechanical instabilities in the central portion, for example, because the foldable substrate is symmetric about a plane comprising a midpoint in the substrate thickness and the central thickness. Moreover, providing a first recess opposite a second recess can reduce a bend-induced strain of a material positioned in the first recess and/or second recess compared to a single recess with a surface recessed by the sum of the first distance and the second distance. Providing a reduced bend-induced strain of a material positioned in the first recess and/or the second recess can enable the use of a wider range of materials because of the reduced strain requirements for the material. For example, stiffer and/or more rigid materials can be positioned in the first recess, which can improve impact resistance, puncture resistance, abrasion resistance, and/or scratch resistance of the foldable apparatus. Additionally, controlling properties of a first material positioned in a first recess and a second material positioned in a second recess can control the position of a neutral axis of the foldable apparatus and/or foldable substrates, which can reduce (e.g., mitigate, eliminate) the incidence of mechanical instabilities, apparatus fatigue, and/or apparatus failure.

In aspects, the foldable apparatus and/or foldable substrates can comprise a first transition region attaching the central portion to the first portion and/or a second transition region attaching the central portion to the second portion. Providing transition regions with smoothly and/or monotonically decreasing (e.g., continuously decreasing) thicknesses can reduce stress concentration in the transition regions and/or avoid optical distortions. Providing a sufficient length of the transition region(s) (e.g., about 0.15 mm or more or about 0.3 mm or more) can avoid optical distortions that may otherwise exist from a sharp change in thickness of the foldable substrate. Providing sufficient length of the transition region(s) (e.g., about 0.3 mm or more) can reduce visibility of the transition region, for example, as measured using fractional intensity and/or a contrast ratio. Providing a sufficiently small length of the transition regions (e.g., about 2 mm or less or about 1 mm or less) can reduce the amount of the foldable apparatus and/or foldable substrates having an intermediate thickness that may have reduced impact resistance and/or reduced puncture resistance. Providing an average transition angle of a first transition surface area of the first transition region relative to the first central surface area that is sufficiently large (e.g., about 167° or more or about 170° or more) can avoid optical distortions and/or reduce visibility of the transition region. Providing a sufficiently small average transition angle (e.g., about 179° or less or about 176° or less) can reduce the amount of the foldable apparatus and/or the foldable substrates having an intermediate thickness that may have reduced impact resistance and/or reduced puncture resistance.

Methods of the aspects of the disclosure can enable formation of transition regions using an etch mask and an etchant. Providing an etch mask comprising a polymer layer at a peripheral portion of the etch mask can enable formation of transition regions with a transition width (e.g., about 0.15 mm or more or about 0.3 mm or more) and/or an average transition angle (e.g., about 167° or more or about 170° or more) that can be greater than comparative etch masks (see Examples AA-CC). Without wishing to be bound by theory, the polymer layer can be deflected away from the foldable substrate during etching to enable the etchant access to an additional portion of the foldable substrate that the polymer layer could otherwise be in contact with. While the etchant can contact the additional portion of the foldable substrate by deflection of the polymer layer, diffusion of the etchant to the additional portion is limited, which limits the extent of etching of the additional portion, producing a transition region. In aspects, the polymer layer can be formed on the surface of the foldable substrate using a first tape with spaces corresponding to the polymer layers, which can enable the reliable formation of smaller widths (e.g., about 700 μm) of the polymer layer as well as accurate positioning of the polymer layers. In aspects, the etch mask can be formed by placing a plurality of cuts in an assembly comprising a polymer layer disposed on a barrier layer and a backer layer, then removing portions of the assembly before disposing the assembly on the foldable substrate, which can enable reliable spacing of the polymer-based portions.

In aspects, methods can comprise using an etch mask having a gap between the foldable substrate and a peripheral portion of the etch mask, which can enable formation of transition regions with a transition width (e.g., about 0.15 mm or more or about 0.3 mm or more) and/or an average transition angle (e.g., about 167° or more or about 170° or more) that can be greater than comparative etch masks (see Examples AA-CC). Without wishing to be bound by theory, the gap can enable the etchant to contact a portion of the foldable substrate, but the diffusion of the etchant to the additional portion is limited, which limits the extent of etching of the additional portion, producing a transition region. In combination with the first polymer layer or the second polymer layer that can be deflected away from the foldable substrate during etching to enable the etchant access to an additional portion of the foldable substrate that the polymer layer could otherwise be in contact with, which enables a further reduced diffusion of the etchant and enabling longer transition regions. In aspects, the gap can be formed using at least two polymer layers. In aspects, the gap can be formed using at least two layers of a positive photoresist.

Directional terms as used herein—for example, up, down, right, left, front, back, top, bottom—are made only with reference to the figures as drawn and are not intended to imply absolute orientation.

It will be appreciated that the various disclosed aspects may involve features, elements, or steps that are described in connection with that aspect. It will also be appreciated that a feature, element, or step, although described in relation to one aspect, may be interchanged or combined with alternate aspects in various non-illustrated combinations or permutations.

It is also to be understood that, as used herein the terms "the," "a," or "an," mean "at least one," and should not be limited to "only one" unless explicitly indicated to the contrary. For example, reference to "a component" comprises aspects having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, aspects include from the one particular value and/or to the other particular value. Similarly, when values are expressed as approximations, by use of the antecedent "about," it will be understood that the particular value forms another aspect. Whether or not a numerical value or endpoint of a range in the specification recites "about," the numerical value or endpoint of a range is intended to include two aspects: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In aspects, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

While various features, elements, or steps of particular aspects may be disclosed using the transitional phrase "comprising," it is to be understood that alternative aspects, including those that may be described using the transitional phrases "consisting of" or "consisting essentially of," are implied. Thus, for example, implied alternative aspects to an apparatus that comprises A+B+C include aspects where an apparatus consists of A+B+C and aspects where an apparatus consists essentially of A+B+C. As used herein, the terms "comprising" and "including", and variations thereof shall be construed as synonymous and open-ended unless otherwise indicated.

The above aspects, and the features of those aspects, are exemplary and can be provided alone or in any combination with any one or more features of other aspects provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the aspects herein provided they come within the scope of the appended claims and their equivalents.

What is claimed is:

1. A foldable substrate comprising:

a substrate thickness in a range from 60 micrometers to 500 micrometers defined between a first major surface and a second major surface opposite the first major surface;

a first portion comprising the substrate thickness between a first surface area of the first major surface and a second surface area of the second major surface;

a second portion comprising the substrate thickness between a third surface area of the first major surface and a fourth surface area of the second major surface; and a central portion comprising:

a central thickness less than the substrate thickness and in a range from 25 micrometers to 80 micrometers defined between a first central surface area and a second central surface area opposite the first central surface area, and the first central surface area recessed from the first major surface by a first distance;

a first transition region comprising a first transition surface area extending between the first surface area and the first central surface area with a first average angle relative to the first central surface area, and a thickness of the first transition region smoothly and monotonically decreases between the substrate thickness of the first portion and the central thickness of the central portion; and a second transition region comprising a third transition surface area extending between the third surface area and the first central surface area with a third average angle relative to the first central surface area, and a thickness of the second transition region smoothly and monotonically decreases between the substrate thickness of the second portion and the central thickness of the central portion, wherein the first average angle is in a range from 170° to 179°, and wherein the foldable substrate comprises a glass-based substrate and has a refractive index of the foldable substrate is from 1.49 to 1.55, and a width of the first central surface area between the first transition region and the second transition region is from 2.8 mm to 60 mm.

2. The foldable substrate of claim 1, wherein the first average angle is in a range from 170° to 176°.

3. The foldable substrate of claim 1, wherein a first transition width of the first transition region is in a range from about 150 micrometers to about 700 micrometers.

4. The foldable substrate of claim 1, wherein the foldable substrate comprises a maximum fractional intensity in a range from 1.0 to about 1.02 as measured using brightfield transmission.

5. The foldable substrate of claim 1, wherein the foldable substrate comprises a contrast ratio defined as a difference between a maximum fractional intensity and a minimum fractional intensity divided by the sum of the maximum fractional intensity and the minimum fractional intensity is in a range from 0 to about 0.02 as measured using brightfield transmission.

6. The foldable substrate of claim 1, wherein the foldable substrate comprises a maximum fractional intensity in a range from 1.0 to about 1.1 as measured using darkfield reflection.

7. The foldable substrate of claim 1, wherein the foldable substrate comprises a contrast ratio defined as a difference between a maximum fractional intensity and a minimum fractional intensity divided by the sum of the maximum fractional intensity and the minimum fractional intensity is in a range from 0 to about 0.6 as measured using darkfield reflection.

8. The foldable substrate of claim 1, wherein the foldable substrate achieves a parallel plate distance of 10 millimeters.

9. The foldable substrate of claim 1, wherein the foldable substrate comprises a minimum parallel plate distance in a range from about 2 millimeters to about 10 millimeters.

10. A method of making a foldable substrate comprising a substrate thickness, the method comprising:

disposing an etch mask over a first major surface of the foldable substrate, the etch mask comprising:

a first portion comprising a first barrier layer at least partially adhered to the first major surface, a first polymer layer positioned between the first barrier layer and the first major surface at a first peripheral portion of the first portion, the first polymer layer comprising a first width, a first contact surface of the first polymer layer adhered to the first barrier layer, and a second contact surface of the first polymer layer facing the first major surface; and a second portion comprising a second barrier layer at least partially adhered to the first major surface, a second polymer layer positioned between the second barrier layer and the first major surface at a second peripheral portion of the second portion, the second polymer layer comprising a second width, a third contact surface of the second polymer layer adhered to the second barrier layer, and a fourth contact surface of the second polymer layer facing the first major surface, and a minimum distance between the first peripheral portion and the second peripheral portion is in a range from about 1 millimeter to about 50 millimeters;

etching the foldable substrate by contacting a central region of a central portion of the foldable substrate between the first portion of the etch mask and the second portion of the etch mask, the etching removes a portion of the foldable substrate to form a first central surface area recessed from the first major surface by a first distance, the etching removes a portion of the foldable substrate to form a first transition surface area of a first transition region, and the etching removes a portion of the foldable substrate to form a third transition surface area of a second transition region; and removing the etch mask, wherein the first transition region comprises a first transition surface area extending between the first major surface and the first central surface area with a first average angle relative to the first central surface area, the second transition region comprises a third transition surface area extending between the first major surface and the first central surface area with a third average angle relative to the first central surface area, the central portion comprising the first transition region, the central region, and the second transition region, and the first average angle is in a range from 170° to 179°, and wherein the foldable substrate comprises a glass-based substrate and has a refractive index of the foldable substrate is from 1.49 to 1.55, a width of the first central surface area between the first transition region and the second transition region is from 2.8 mm to 60 mm, the substrate thickness is from 60 micrometers to 500 micrometers, and the central thickness is from 25 micrometers to 80 micrometers.

11. The method of claim 10, wherein a first transition width of the first transition region is greater than or equal to a first width of the first polymer layer, a second transition width of the second transition region is greater than or equal to a second width of the second polymer layer, the central portion comprising the first transition region, the central region, and the second transition region, and the first width is in a range from about 100 micrometers to about 3 millimeters, and the second width is in a range from about 100 micrometers to about 3 millimeters.

12. The method of claim 10, wherein a thickness of the first transition region smoothly and monotonically decreases between the substrate thickness of the first portion and a central thickness of the central portion.

13. The method of claim 10, wherein disposing the etch mask comprises:

disposing a first tape over the first major surface of the substrate;

creating a first space by removing a first section of the first tape comprising the first width;

disposing a first polymer sheet over the first major surface, a first portion of the first polymer sheet disposed in the first space, and a second portion of the first polymer sheet extending over the first tape;

removing the second portion of the first polymer sheet to form the first polymer layer;

removing the first tape; and then disposing the first barrier layer over the first major surface and the first polymer layer.

14. The method of claim 10, wherein disposing the etch mask comprises:

forming an assembly by disposing a polymer sheet on a barrier sheet and disposing the barrier layer on a backer sheet;

cutting through the polymer sheet and the barrier sheet at a first location and a second location, the first location and the second location are separated by the minimum distance;

cutting through the polymer sheet at a third location separated from the first location by the first width;

cutting through the polymer sheet at a fourth location separated from the second location by the second width;

removing a portion of the polymer sheet and the barrier sheet between the first location and the second location comprising the minimum distance to form the first barrier layer and the second barrier layer from the barrier sheet;

removing a portion of the polymer sheet extending from the third location to form the first polymer layer;

removing a portion of the polymer sheet extending from the fourth location to form the second polymer layer;

disposing the assembly on the first major surface; and removing the backer layer.

15. The method of claim 10, wherein the foldable substrate comprises a maximum fractional intensity in a range from 1.0 to about 1.02 as measured using brightfield transmission.

16. The method of claim 10, wherein the foldable substrate comprises a contrast ratio defined as a difference between a maximum fractional intensity and a minimum fractional intensity divided by the sum of the maximum fractional intensity and the minimum fractional intensity is in a range from 0 to about 0.02 as measured using brightfield transmission.

17. The method of claim 10, wherein the foldable substrate comprises a maximum fractional intensity in a range from 1.0 to about 1.1 as measured using darkfield reflection.

18. The method of claim 10, wherein the foldable substrate comprises a contrast ratio defined as a difference between a maximum fractional intensity and a minimum fractional intensity divided by the sum of the maximum fractional intensity and the minimum fractional intensity is in a range from 0 to about 0.6 as measured using darkfield reflection.

* * * * *